(12) United States Patent
Kawana et al.

(10) Patent No.: US 10,007,208 B2
(45) Date of Patent: *Jun. 26, 2018

(54) IMAGE-FORMING APPARATUS FOR CORRECTING A BRIGHTNESS OF A LASER LIGHT

(71) Applicant: CANON KABUSHIKI KAISHA, Tokyo (JP)

(72) Inventors: Takashi Kawana, Machida (JP); Kazuyuki Ishihara, Nagoya (JP); Yuuji Takayama, Yokohama (JP); Hikaru Uchidate, Yokohama (JP); Yoshihiko Tanaka, Mishima (JP); Hiroyuki Fukuhara, Suntou-gun (JP); Shuichi Kurokawa, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/583,659

(22) Filed: May 1, 2017

(65) Prior Publication Data

US 2017/0235247 A1    Aug. 17, 2017

Related U.S. Application Data

(63) Continuation of application No. 15/065,448, filed on Mar. 9, 2016, now Pat. No. 9,696,651, which is a
(Continued)

(30) Foreign Application Priority Data

Jun. 12, 2014 (JP) .................................. 2014-121882
Jun. 12, 2014 (JP) .................................. 2014-121883

(51) Int. Cl.
*G03G 15/00* (2006.01)
*G03G 15/043* (2006.01)
(Continued)

(52) U.S. Cl.
CPC ....... *G03G 15/043* (2013.01); *H04N 1/02885* (2013.01); *H04N 1/04* (2013.01); *H04N 1/053* (2013.01); *H04N 1/1135* (2013.01)

(58) Field of Classification Search
CPC ............. G03G 15/043; G03G 15/0415; H04N 1/02885; H04N 1/04; H04N 1/053; H04N 1/1135
See application file for complete search history.

(56) References Cited

U.S. PATENT DOCUMENTS 4,532,552 A    7/1985    Uno

FOREIGN PATENT DOCUMENTS

CN    1292510 A    4/2001
CN    103376694 A    10/2013
(Continued)

*Primary Examiner* — Hoang Ngo
(74) *Attorney, Agent, or Firm* — Canon USA, Inc. I.P. Division

(57) ABSTRACT

An image-forming apparatus includes a light-irradiation unit configured to move a spot of laser light on a surface of a photosensitive member at a non-constant scanning velocity in a main scanning direction to form a latent image on the photosensitive member, an image data correcting unit configured to correct a length in the main scanning direction of image data by inserting one or more image data pieces into the image data, the number of the image data pieces increasing as the scanning velocity increases, and/or extracting one or more image data pieces from the image data, the number of the image data pieces increasing as the scanning velocity decreases, and a brightness correcting unit configured to correct a brightness of the laser light so that an emission brightness increases as the scanning velocity increases and/or the emission brightness decreases as the scanning velocity decreases.

15 Claims, 42 Drawing Sheets

Related U.S. Application Data continuation of application No. 14/727,036, filed on Jun. 1, 2015, now Pat. No. 9,319,553.

(51) Int. Cl.
*H04N 1/053* (2006.01)
*H04N 1/113* (2006.01)
*H04N 1/028* (2006.01)
*H04N 1/04* (2006.01)

(56) References Cited

FOREIGN PATENT DOCUMENTS

| | | |
|---|---|---|
| JP | 2743408 B2 | 4/1998 |
| JP | 2005-096351 A | 4/2005 |
| JP | 2008-149471 A | 7/2008 |

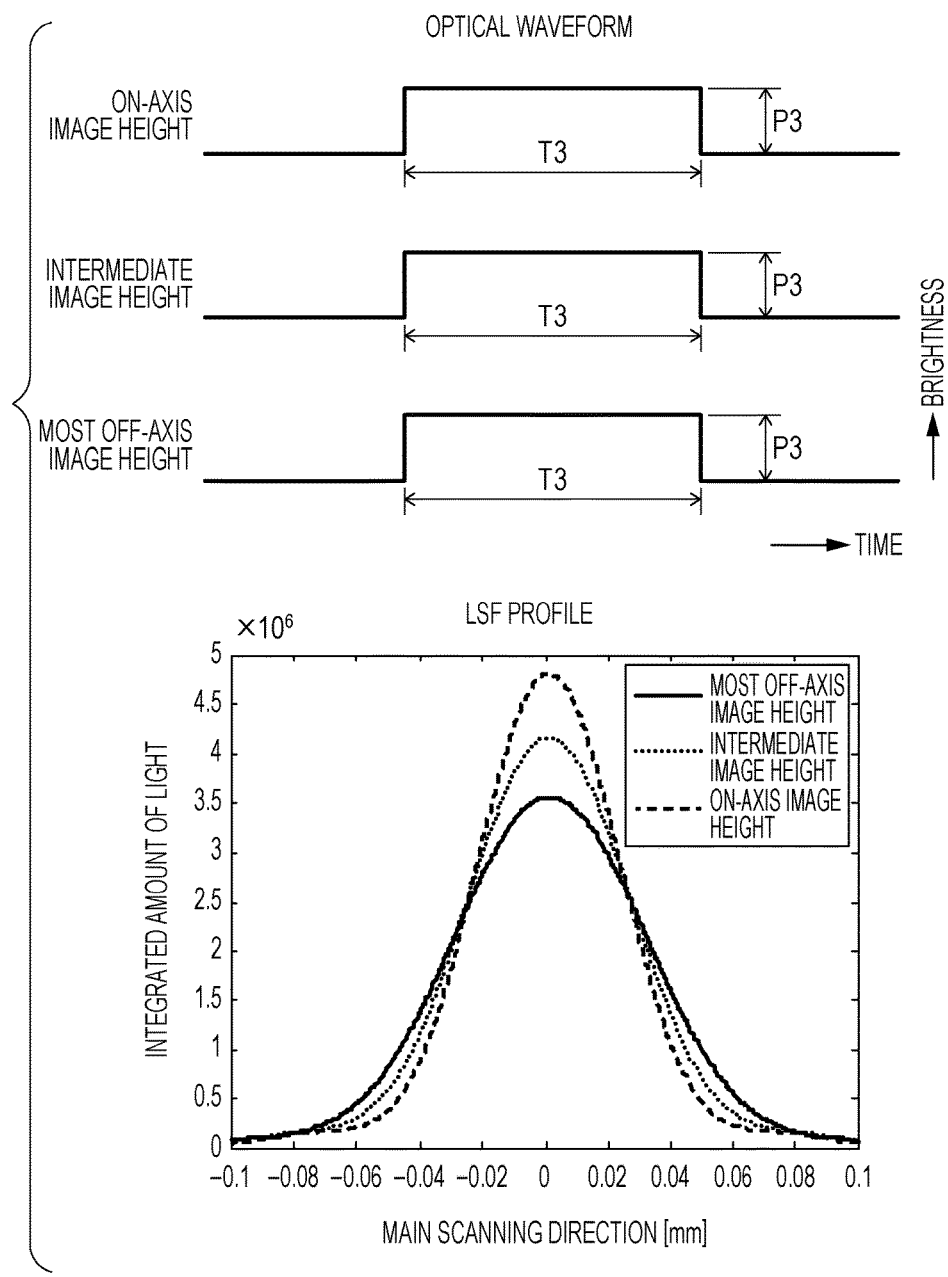

MINIMUM DENSITY

MAXIMUM DENSITY

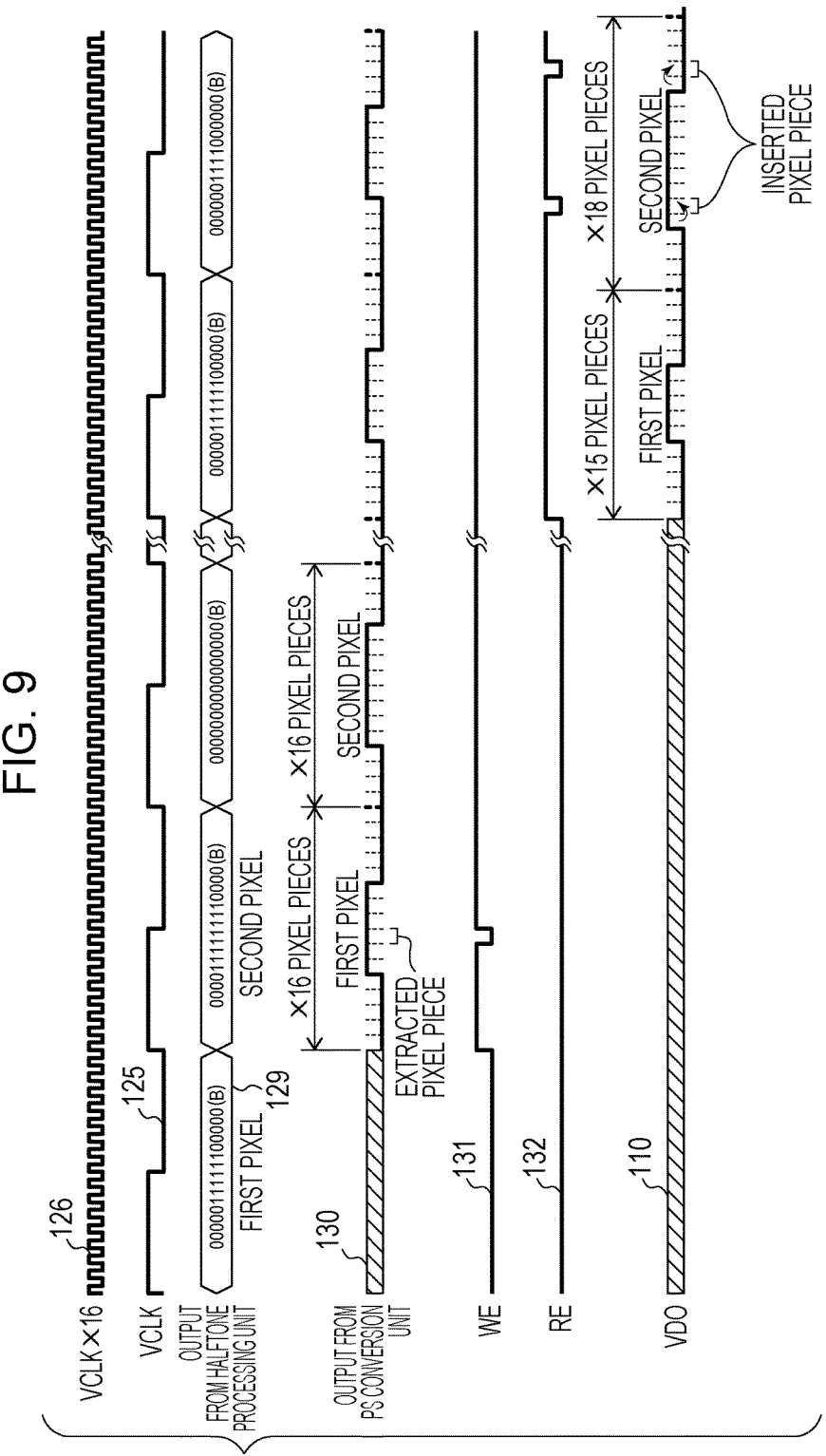

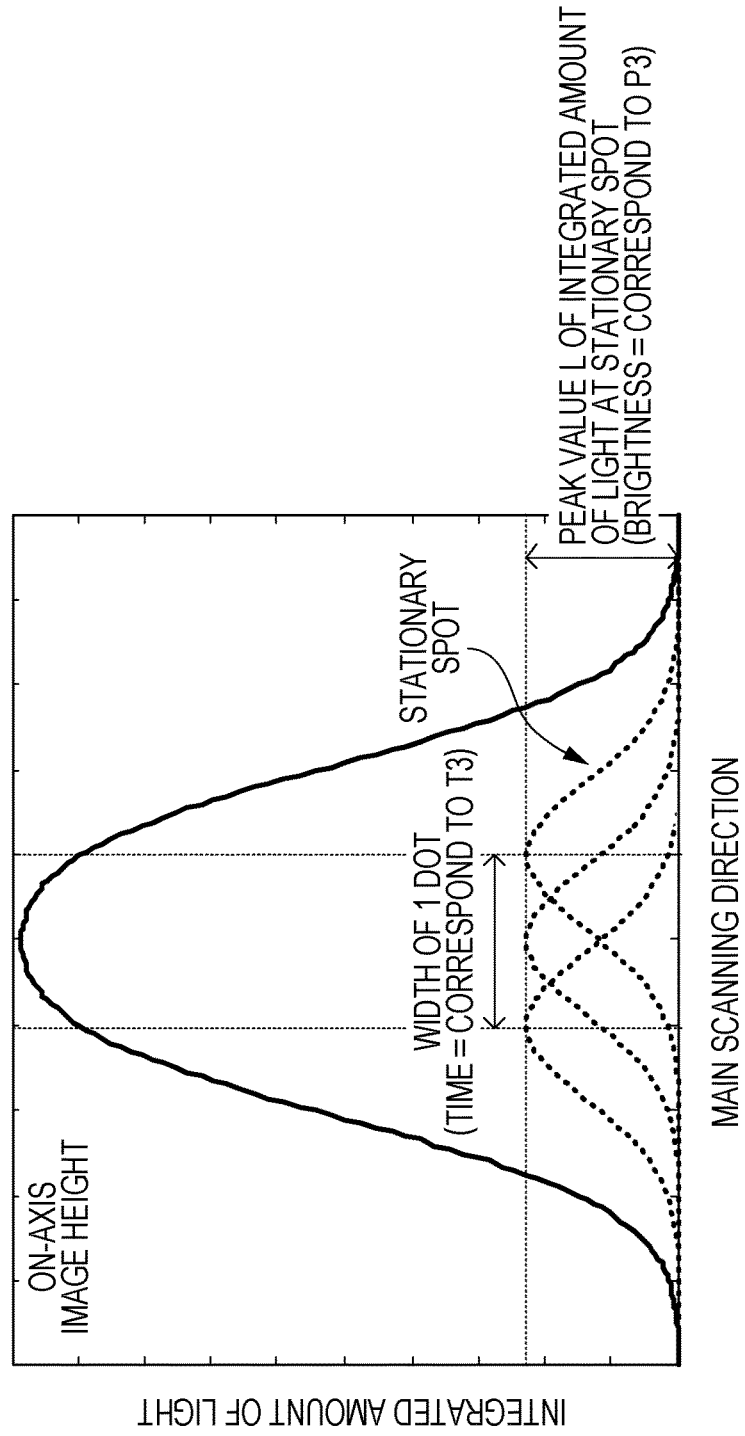

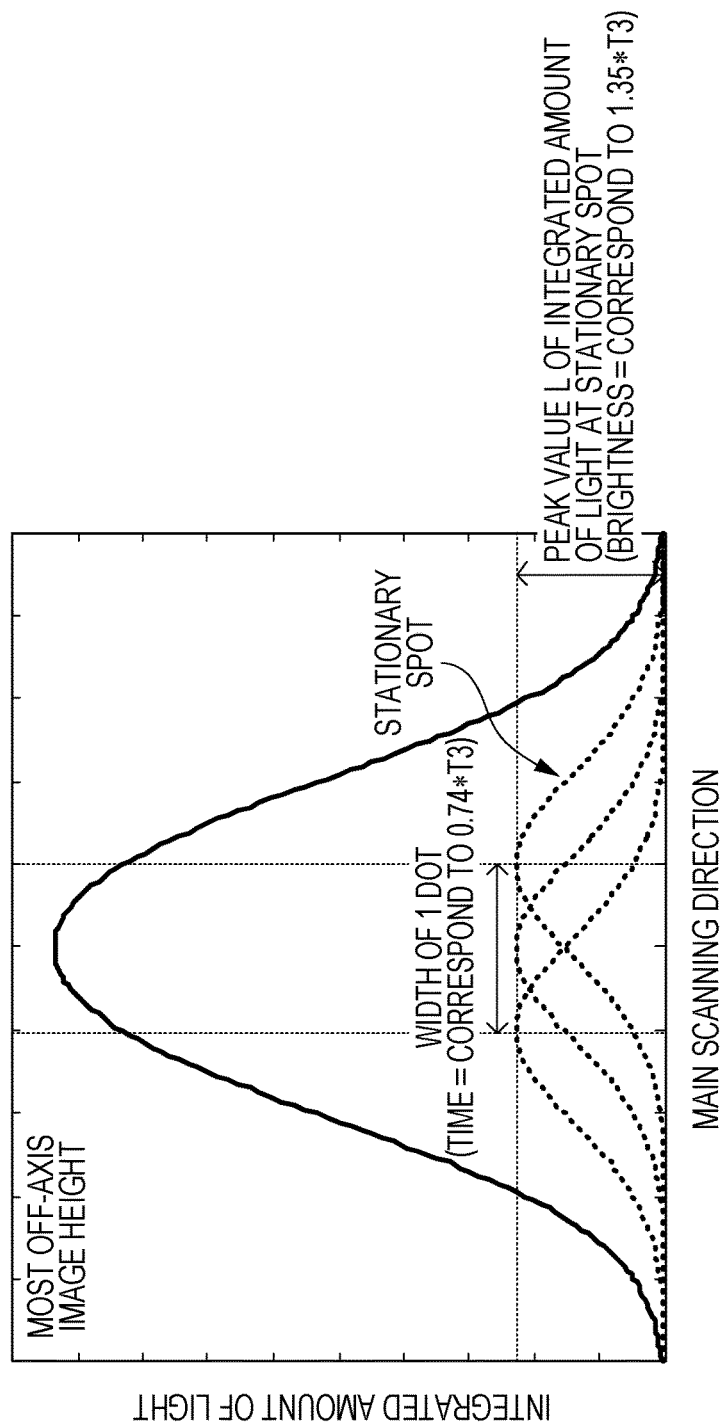

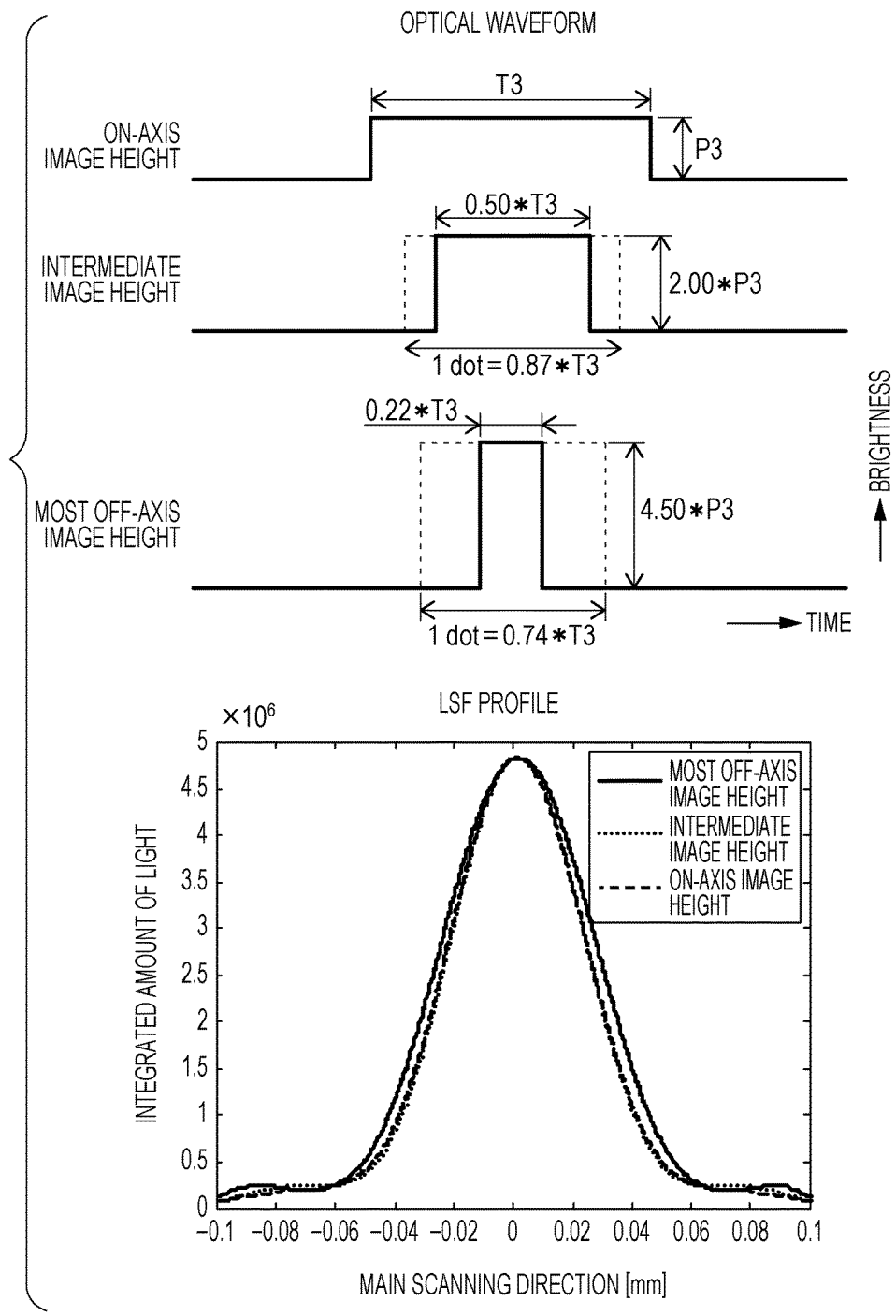

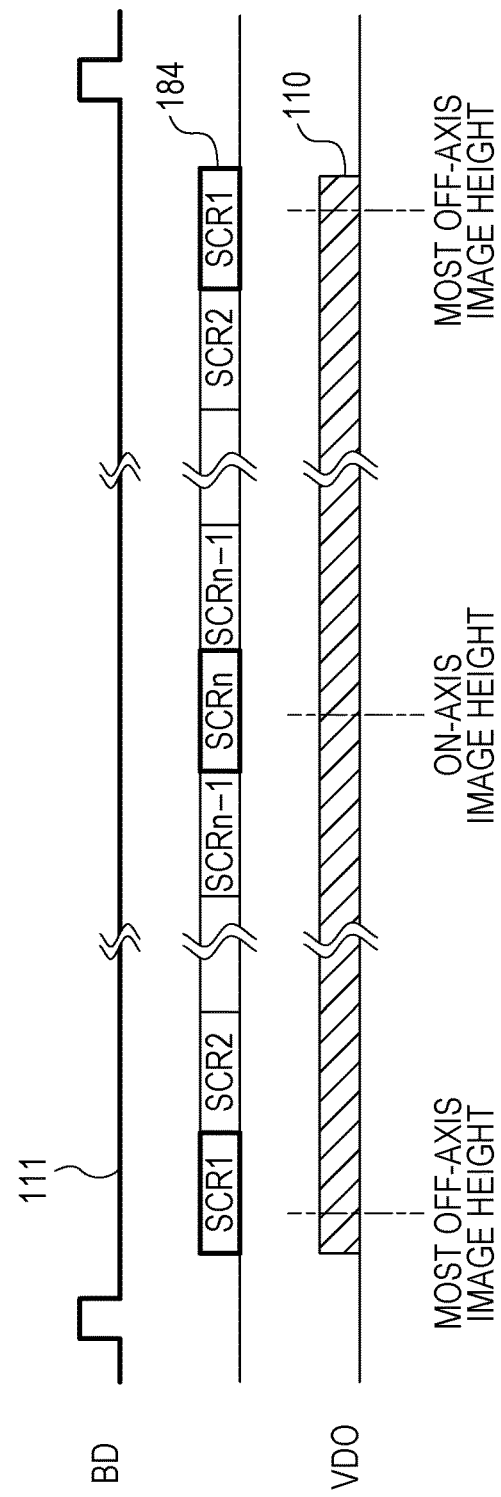

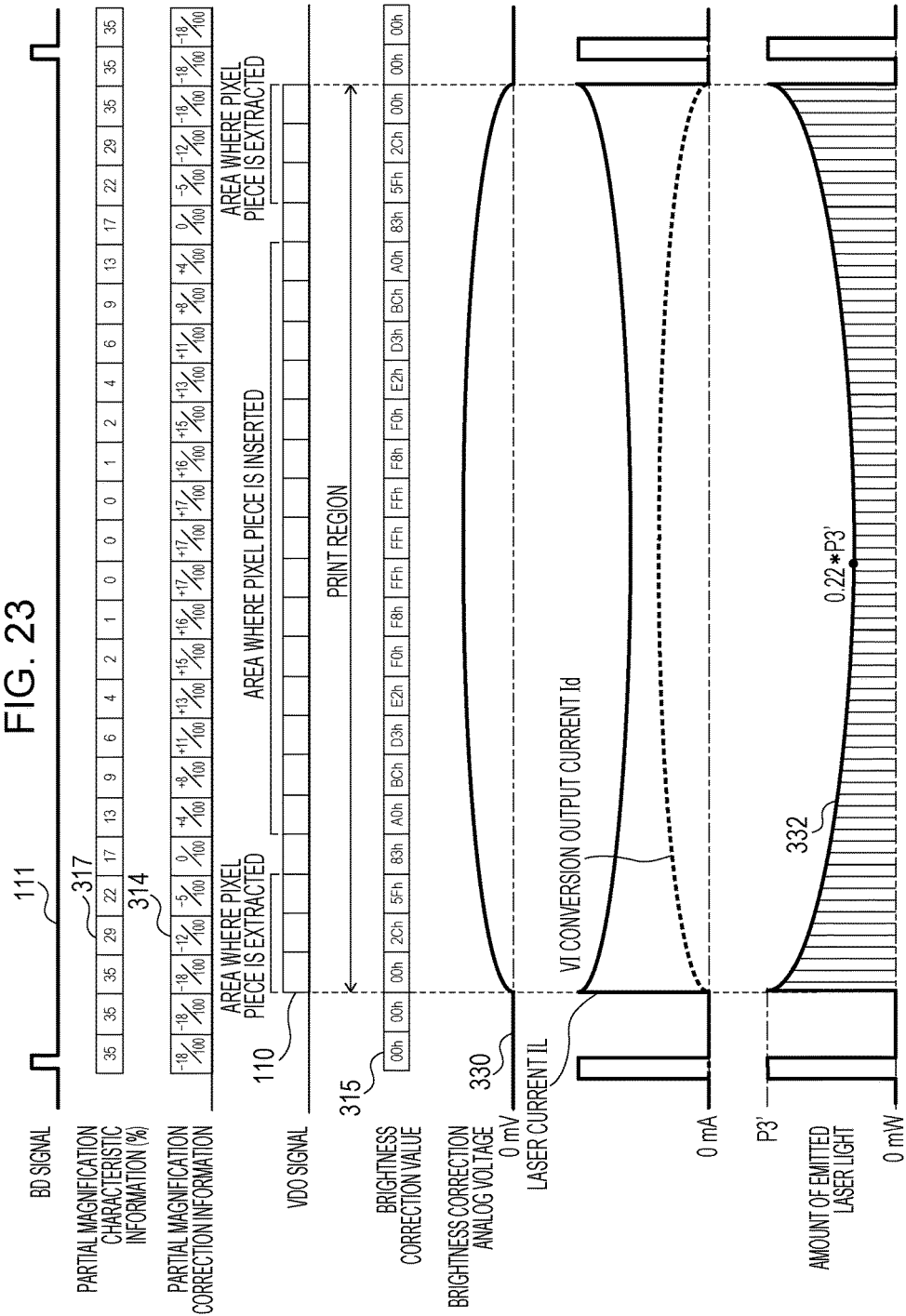

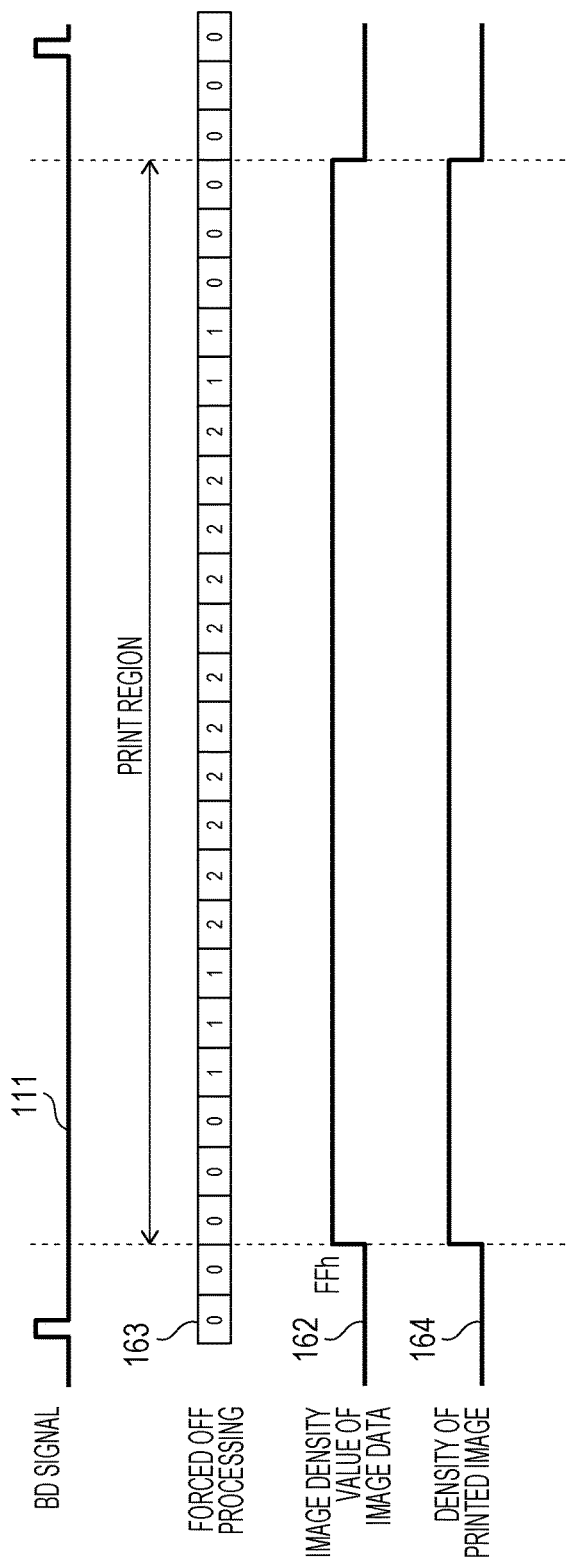

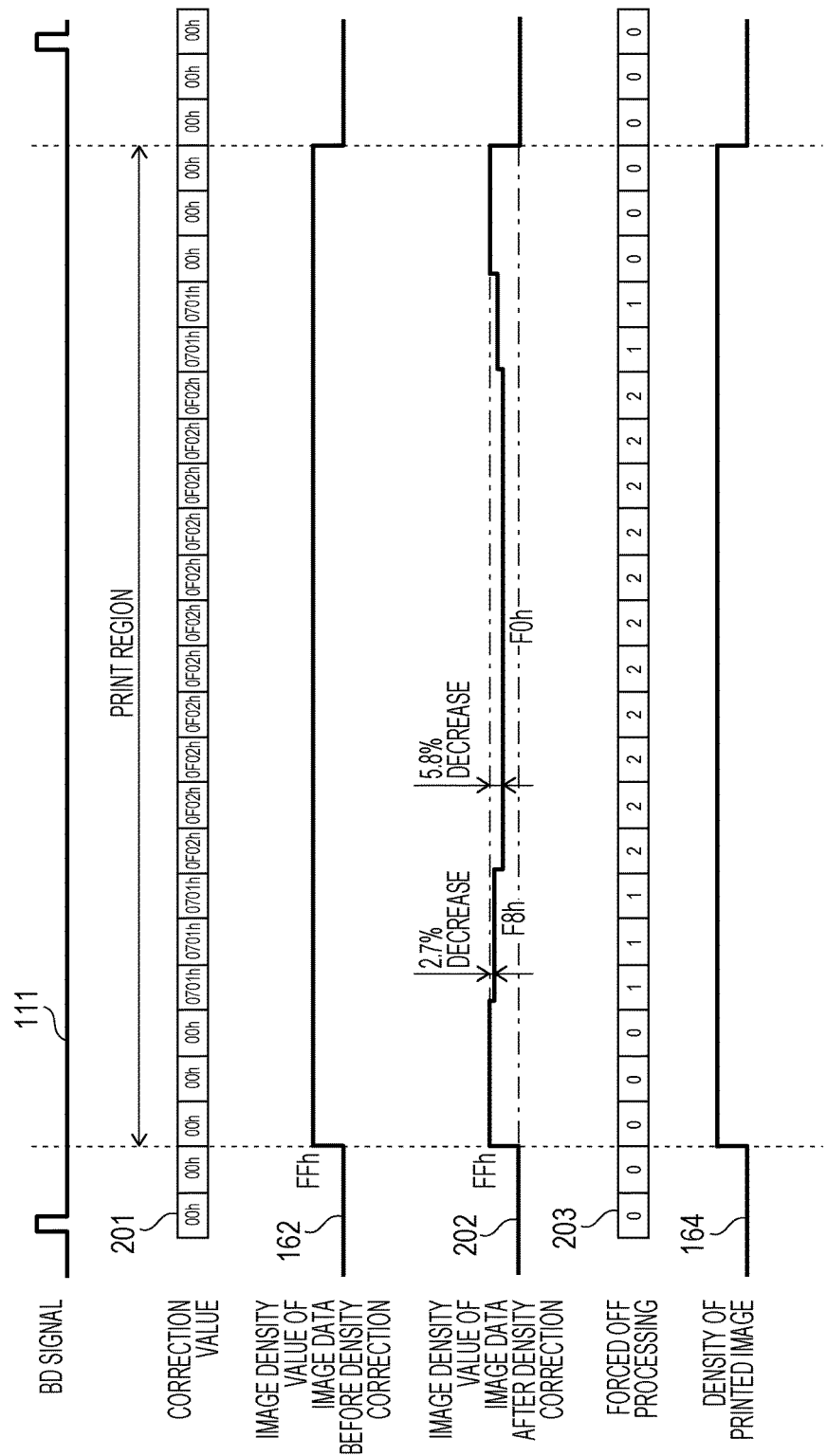

IMAGE-FORMING APPARATUS FOR CORRECTING A BRIGHTNESS OF A LASER LIGHT

CROSS-REFERENCE TO RELATED APPLICATIONS

This application is a continuation, and claims the benefit, of U.S. patent application Ser. No. 15/065,448, presently pending and filed on Mar. 9, 2016, which is a continuation, and claims the benefit, of prior U.S. patent application Ser. No. 14/727,036, filed on Jun. 1, 2015 and issued as U.S. Pat. No. 9,319,553 on Apr. 19, 2016, and claims the benefit of Japanese Patent Application No. 2014-121882, filed Jun. 12, 2014, and of Japanese Patent Application No. 2014-121883 filed Jun. 12, 2014, which applications and patent(s) are hereby incorporated by reference herein in their entireties.

BACKGROUND OF THE INVENTION

Field of the Invention

The present disclosure relates to image-forming apparatuses such as a laser beam printer (LBP), a digital copier, and a digital facsimile. Specifically, the present disclosure relates to an image-forming apparatus that performs optical writing by using a laser beam.

Description of the Related Art

An electrophotographic image-forming apparatus includes an optical scanning unit for exposing a photosensitive member. The optical scanning unit emits laser light on the basis of image data, causes the laser light to be reflected by a rotational polygon mirror, causes the reflected light to be transmitted through a scanning lens, and thereby irradiates the photosensitive member with the transmitted light so that the photosensitive member is exposed. With the rotational polygon mirror being rotated, scanning is performed by moving a spot of laser light formed on the surface of the photosensitive member, and thereby a latent image is formed on the photosensitive member.

A scanning lens is a lens having a so-called fθ characteristic. The fθ characteristic is an optical characteristic in which laser light is focused on the surface of a photosensitive member so that the spot of the laser light moves on the surface of the photosensitive member at a uniform velocity when a rotational polygon mirror is rotating at a uniform angular velocity. With use of a scanning lens having such an fθ characteristic, appropriate exposure can be performed.

The size and cost of a scanning lens having such an fθ characteristic are relatively large. Thus, for the purpose of reducing the size and cost of an image-forming apparatus, it is suggested not to use a scanning lens or to use a scanning lens that does not have an fθ characteristic.

Japanese Patent Laid-Open No. 58-125064 discloses a technique of performing electrical correction to change an image clock frequency during one scanning operation, so that dots formed on the surface of a photosensitive member have a constant width even if the spot of laser light does not move at a uniform velocity on the surface of the photosensitive member.

However, even if a scanning lens having an fθ characteristic is not used and the above-described electrical correction is performed to make the widths of individual dots constant, the time for forming one dot varies at an end portion and a center portion in the main scanning direction, for example. That is, the velocity at which the spot of laser light moves on the surface of the photosensitive member to form a dot varies in the case of forming a dot at an end portion in the main scanning direction and in the case of forming a dot at a center portion in the main scanning direction. Therefore, the amount of exposure per unit area on a drum surface differs between a dot at the end portion in the main scanning direction and a dot at the center portion in the main scanning direction, and the difference in the amount of exposure may cause image failure.

SUMMARY OF THE INVENTION

The present disclosure provides an image-forming apparatus that performs exposure by suppressing the occurrence of image failure without using a scanning lens having an fθ characteristic.

According to an aspect of the present disclosure, there is provided an image-forming apparatus including a light-irradiation unit, an image data correcting unit, and a brightness correcting unit. The light-irradiation unit is configured to irradiate a surface of a charged photosensitive member with laser light emitted by a light source in accordance with image data so that a spot of the laser light on the surface of the photosensitive member moves at a non-constant scanning velocity in a main scanning direction to form a latent image on the surface of the photosensitive member. The image data correcting unit is configured to correct a length in the main scanning direction of the image data by inserting one or more image data pieces into the image data, the number of the image data pieces increasing as the scanning velocity increases, and/or extracting one or more image data pieces from the image data, the number of the image data pieces increasing as the scanning velocity decreases. The brightness correcting unit is configured to correct a brightness of the laser light so that an emission brightness of the light source increases as the scanning velocity increases and/or the emission brightness of the light source decreases as the scanning velocity decreases. The image-forming apparatus forms a toner image by applying toner onto the latent image.

According to another aspect of the present disclosure, there is provided an image-forming apparatus including a light-irradiation unit, an emission timing correcting unit, and an emission ratio correcting unit. The light-irradiation unit is configured to irradiate a surface of a charged photosensitive member with laser light emitted by a light source in accordance with image data so that a spot of the laser light moves on the surface of the photosensitive member at a non-constant scanning velocity in a main scanning direction to form a latent image on the surface of the photosensitive member. The emission timing correcting unit is configured to correct an emission timing of the laser light so that an emission interval of the laser light becomes shorter as the scanning velocity increases, and/or an emission interval of the laser light becomes longer as the scanning velocity decreases. The emission ratio correcting unit is configured to correct an emission ratio of the laser light so that the emission ratio of the laser light increases as the scanning velocity increases, and/or the emission ratio of the laser light decreases as the scanning velocity decreases. The image-forming apparatus forms a toner image by applying toner onto the latent image.

Further features of the present disclosure will become apparent from the following description of exemplary embodiments with reference to the attached drawings.

BRIEF DESCRIPTION OF THE DRAWINGS

FIG. 4A is a diagram illustrating optical waveforms and a main scanning LSF profile according to a first comparative example.

FIG. 9 is a timing chart of an operation of the image modulating unit.

FIGS. 18A to 18C are diagrams for describing a diameter of a static spot and a spot profile of the optical scanning device.

FIG. 19B is a diagram illustrating optical waveforms and a main scanning LSF profile according to a third exemplary embodiment.

FIG. 22A is a timing chart of a synchronization signal, screen switch information, and an image signal.

FIG. 23 is a timing chart for describing partial magnification correction and brightness correction.

FIG. 29 is a timing chart for describing forced OFF processing.

FIG. 33 is a timing chart of density correction processing and forced OFF processing.

DESCRIPTION OF THE EMBODIMENTS

First Exemplary Embodiment

Image-Forming Apparatus

Figure 1:
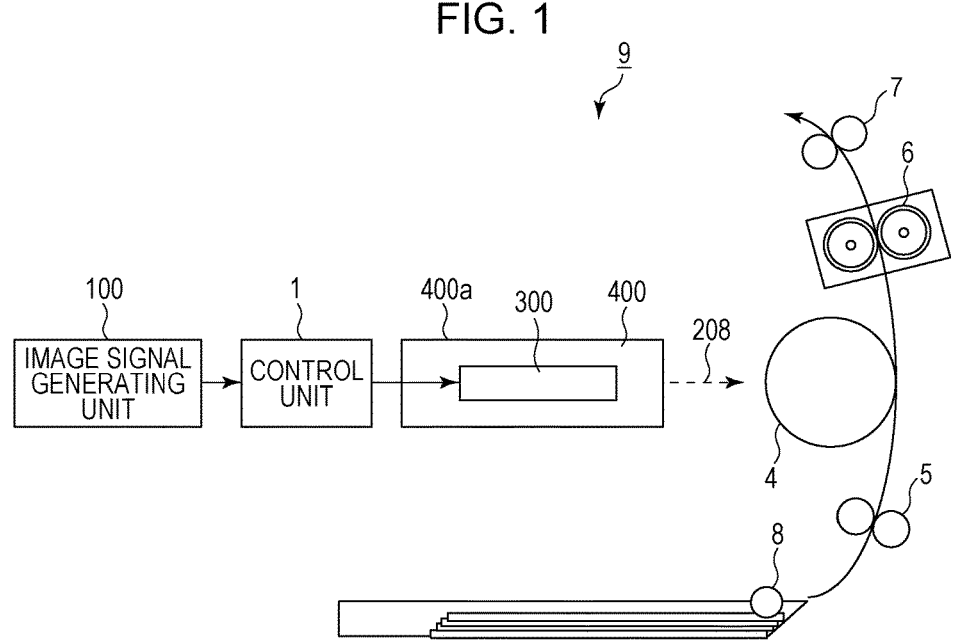
FIG. 1 is a schematic diagram illustrating the configuration of an image-forming apparatus.

FIG. 1 is a schematic diagram illustrating the configuration of an image-forming apparatus 9. A laser driving unit 300 included in an optical scanning device 400, which is an optical scanning unit, generates scanning light (laser light) 208 in response to an image signal output from an image signal generating unit 100 and a control signal output from a control unit 1. A photosensitive drum (photosensitive member) 4 that has been charged by a charge unit (not illustrated) is scanned by using the laser light 208, so that a latent image is formed on the surface of the photosensitive drum 4. A developing unit (not illustrated) applies tonner onto the latent image so as to form a tonner image corresponding to the latent image. The toner image is transferred onto a recording medium, such as paper, that has been fed from a paper feed unit 8 to a position where the recording medium is brought into contact with the photosensitive drum 4 by rollers 5. The toner image that has been transferred onto the recording medium is thermally fixed to the recording medium by a fixing unit 6, and is output to the outside of the apparatus through paper ejection rollers 7.

Optical Scanning Device

Figure 2A:
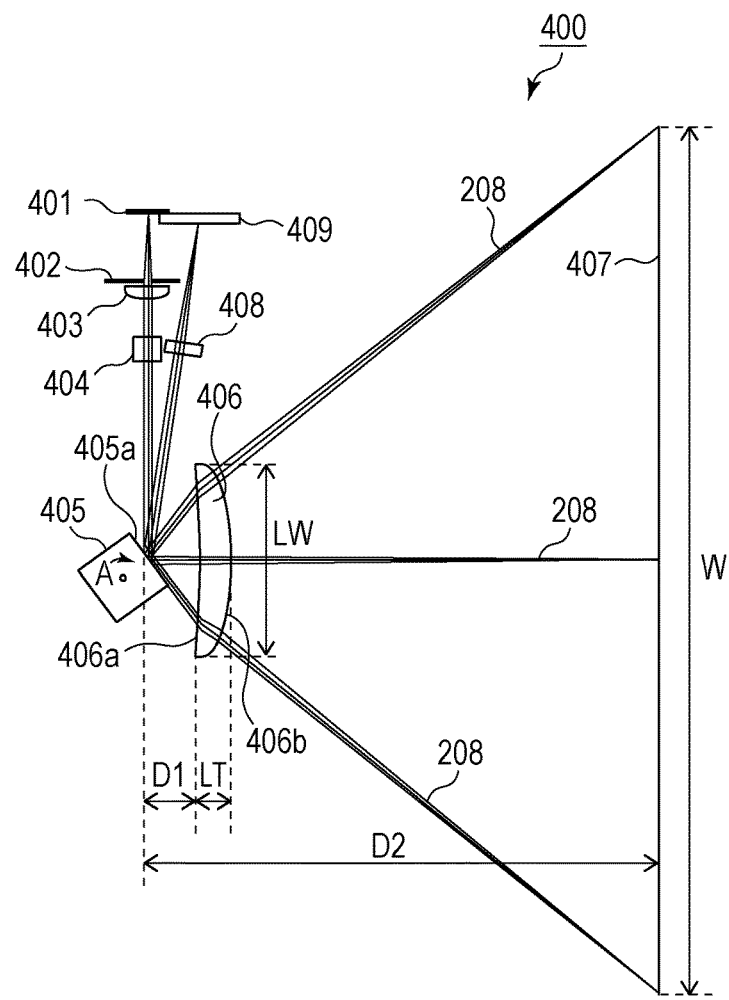
FIG. 2A is a cross-sectional view of an optical scanning device taken along a main scanning direction.
Figure 2B:
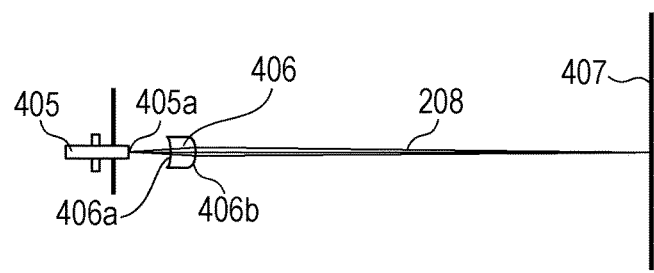
FIG. 2B is a cross-sectional view of the optical scanning device along a sub-scanning direction.

FIGS. 2A and 2B are cross-sectional views of the optical scanning device 400 according to this exemplary embodiment. FIG. 2A is a cross-sectional view taken along the main scanning direction, and FIG. 2B is a cross-sectional view taken along the sub-scanning direction.

In this exemplary embodiment, the laser light (light beam) 208 emitted by a light source 401 is formed into an elliptic shape by an aperture 402 and enters a coupling lens 403. The light beam that has passed through the coupling lens 403 is converted to substantially parallel light and enters an anamorphic lens 404. The substantially parallel light includes weak converged light and weak diverged light. The anamorphic lens 404 has a positive refractive power in the cross section along the main scanning direction, and converts a light beam incident thereon to converged light in the cross section along the main scanning direction. Also, the anamorphic lens 404 collects light beams at the vicinity of a deflection surface 405a of a deflector 405 in the cross section along the sub-scanning direction, so as to form a linear image that is long in the main scanning direction.

The light beam that has passed through the anamorphic lens 404 is reflected by the deflection surface (reflection surface) 405a of the deflector (polygon mirror) 405. The light beam reflected by the reflection surface 405a serves as the scanning light 208 (see FIG. 1), passes through an image formation lens 406, and is applied to the surface of the photosensitive drum 4. The image formation lens 406 is an image formation optical element. In this exemplary embodiment, only a single image formation optical element (image formation lens 406) constitutes an image formation optical system. The surface of the photosensitive drum 4 to which the light beam passed (transmitted) through the image formation lens 406 is applied serves as a scanned surface 407 that is scanned by using a light beam. The image formation lens 406 causes a light beam to be focused on the scanned surface 407, so as to form a certain spot image (spot). With the deflector 405 being rotated by a driving unit (not illustrated) in the direction indicated by an arrow A at a constant angular velocity, the spot moves on the scanned surface 407 in the main scanning direction, so that an electrostatic latent image is formed on the scanned surface 407. The main scanning direction is a direction that is parallel to the surface of the photosensitive drum 4 and that is orthogonal to the movement direction on the surface of the photosensitive drum 4. The sub-scanning direction is a direction that is orthogonal to the main scanning direction and the optical axis of the light beam.

A beam detection (BD) sensor 409 and a BD lens 408 serve as an optical system for synchronization, which determines the timing to write an electrostatic latent image on the scanned surface 407. The light beam that has passed through the BD lens 408 enters and is detected by the BD sensor 409, which includes a photodiode. On the basis of the timing at which the light bema is detected by the BD sensor 409, a write timing is controlled.

The light source 401 is a semiconductor laser chip. In this exemplary embodiment, the light source 401 includes one light emitter 11 (see FIG. 5). Alternatively, the light source 401 may include a plurality of light emitters each of which can be independently controlled to emit light. Also in a case where the light source 401 includes a plurality of light emitters, a plurality of light beams generated thereby reach the scanned surface 407 through the coupling lens 403, the anamorphic lens 404, the deflector 405, and the image formation lens 406. On the scanned surface 407, spots corresponding to the individual light beams are formed at positions displaced in the sub-scanning direction.

The above-described optical members of the optical scanning device 400, such as the light source 401, the coupling lens 403, the anamorphic lens 404, the deflector 405, and the image formation lens 406, are accommodated in a casing (optical housing) 400a (see FIG. 1).

Image Formation Lens

As illustrated in FIGS. 2A and 2B, the image formation lens 406 has two optical surfaces (lens surfaces): an incident surface (first surface) 406a and an exit surface (second surface) 406b. The image formation lens 406 is configured so that, in the cross section along the main scanning direction, scanning is performed on the scanned surface 407 by using the light beam deflected on the deflection surface 405a with a desired scanning characteristic. Also, the image formation lens 406 is configured to allow the spot of the laser light 208 on the scanned surface 407 to have a desired shape. Further, with the image formation lens 406, the vicinity of the deflection surface 405a and the vicinity of the scanned surface 407 have a conjugated relationship in the cross section along the sub-scanning direction. Accordingly, face tangle is compensated for (deviation of a scanning position in the sub-scanning direction on the scanned surface 407 when the deflection surface 405a is tangled is reduced).

The image formation lens 406 according to this exemplary embodiment is a plastic mold lens formed through injection molding. Alternatively, a glass mold lens may be used as the image formation lens 406. A mold lens has an aspherical surface, which can be easily formed, and is suitable for mass production. Thus, as a result of using a mold lens as the image formation lens 406, the productivity and optical performance of the image formation lens 406 can be enhanced.

The image formation lens 406 does not have a so-called fθ characteristic. In other words, the image formation lens 406 does not have a scanning characteristic for moving the spot of a light beam that has passed through the image formation lens 406 on the scanned surface 407 at a uniform velocity when the deflector 405 is rotating at a uniform angular velocity. In this way, with use of the image formation lens 406 that does not have an fθ characteristic, the image formation lens 406 can be placed close to the deflector 405 (at a position where a distance D1 is short). Further, the image formation lens 406 that does not have an fθ characteristic can be smaller than an image formation lens that has an fθ characteristic in the main scanning direction (width LW) and the optical axis direction (thickness LT). Accordingly, a decreased size of the casing 400a of the optical scanning device 400 (see FIG. 1) is achieved. In the case of a lens that has an fθ characteristic, the shape of the incident surface and exit surface of the lens in the cross section along the main scanning direction may have an abrupt change. Such a constraint on the shape may cause the probability that a favorable image formation performance is not obtained. In contrast, the image formation lens 406 does not have an fθ characteristic, and thus the shape of the incident surface and exit surface of the lens in the cross section along the main scanning direction has a small change. Accordingly, a favorable image formation performance can be obtained.

The scanning characteristic of the image formation lens 406 according to this exemplary embodiment is expressed by the following Equation (1).

$$Y = \frac{K}{B} \tan(B\theta) \tag{1}$$

In Equation (1), θ represents a scanning angle (scanning angle of view) of the deflector 405, Y (mm) represents a light collection position (image height) in the main scanning direction where a light beam is collected on the scanned surface 407, K (mm) represents an image formation coefficient at an on-axis image height, and B represents a coefficient for determining the scanning characteristic of the image formation lens 406 (scanning characteristic coefficient). In this exemplary embodiment, an on-axis image height is an image height on an optical axis (Y=0=Ymin), and corresponds to a scanning angle θ=0. An off-axis image height is an image height (Y≠0) on the outer side of a central optical axis (scanning angle θ=0), and corresponds to a scanning angle θ≠0. Further, a most off-axis image height is an image height (Y=+Ymax, −Ymax) in a case where the scanning angle θ is the largest (the largest scanning angle of view). A scanning width W, which is the width in the main scanning direction of a certain region (scanning region) where a latent image on the scanned surface 407 can be formed is expressed by W=|+Ymax|+|−Ymax|. A center portion of the certain region corresponds to the on-axis image height, and an end portion of the certain region corresponds to a most off-axis image height.

Here, the image formation coefficient K is a coefficient corresponding to f of a scanning characteristic (fθ characteristic) Y=fθ in a case where parallel light enters the image formation lens 406. That is, the image formation coefficient K is a coefficient for establishing a proportional relationship between the light collection position Y and the scanning angle θ in a case where a light beam other than parallel light enters the image formation lens 406, like the fθ characteristic.

In addition, when B=0, Equation (1) is Y=Kθ, and thus the scanning characteristic coefficient corresponds to the scanning characteristic Y=fθ of an image formation lens used for an optical scanning device according to the related art. When B=1, Equation (1) is Y=K tan θ, and thus the scanning characteristic coefficient corresponds to a projection characteristic Y=f tan θ of a lens used for an image capturing apparatus (camera) or the like. That is, with the scanning characteristic coefficient B in Equation (1) being set in the range of 0≤B≤1, a scanning characteristic between a projection characteristic Y=f tan θ and an fθ characteristic Y=fθ can be obtained.

Now, Equation (1) is differentiated by using a scanning angle θ, and accordingly a scanning velocity of a light beam on the scanned surface 407 with respect to the scanning angle θ is obtained as expressed by Equation (2).

$$\frac{dY}{d\theta} = \frac{K}{\cos^2(B\theta)} \quad (2)$$

Further, Equation (2) is divided by a velocity dY/dθ=K at the on-axis image height, and accordingly the following Equation (3) is obtained.

$$\frac{\frac{dY}{d\theta}}{K} - 1 = \frac{1}{\cos^2(B\theta)} - 1 = \tan^2(B\theta) \quad (3)$$

Equation (3) expresses the amount of deviation of the scanning velocity at each off-axis image height relative to the scanning velocity at the on-axis image height (partial magnification). In the optical scanning device 400 according to this exemplary embodiment, the scanning velocity of a light beam differs between the on-axis image height and the off-axis image height in a case other than the case where B=0.

Figure 3:
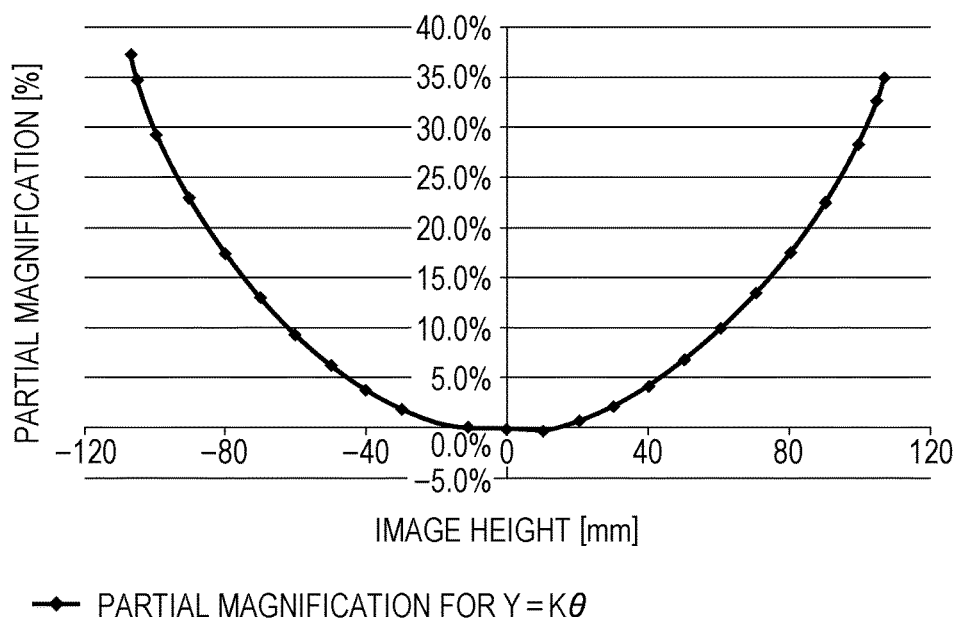
FIG. 3 is a characteristic graph of partial magnification with respect to an image height of the optical scanning device.

FIG. 3 illustrates the relationship between image heights and partial magnifications in a case where the scanning position on the scanned surface 407 according to this exemplary embodiment is fit with a characteristic Y=Kθ. In this exemplary embodiment, the scanning characteristic expressed by Equation (1) is given to the image formation lens 406. Thus, as illustrated in FIG. 3, the scanning velocity gradually increases and thus the partial magnification gradually increases from the on-axis image height toward the off-axis image height. A partial magnification of 30% indicates that, in a case where irradiation with light is performed for a unit time, the irradiation length in the main scanning direction on the scanned surface 407 becomes 1.3 times. Thus, if a pixel width in the main scanning direction is determined at a constant time interval that has been determined by a period of an image clock, a pixel density differs between the on-axis image height and the off-axis image height.

The scanning velocity gradually increases as the image height Y reaches the most off-axis image height from the on-axis image height (as the absolute value of the image height Y increases). Accordingly, the time period for scanning of a unit length when the image height is around the most off-axis image height is shorter than the time period for scanning of a unit length when the image height on the scanned surface 407 is around the on-axis image height. This means that, in a case where the emission brightness of the light source 401 is constant, the total amount of exposure per unit length when the image height is around the most off-axis image height is smaller than the total amount of exposure per unit length when the image height is around the on-axis image height.

In the case of the above-described optical configuration, there is a probability that the partial magnification in the main scanning direction and variations of the total amount of exposure per unit length are not appropriate for maintaining good image quality. Accordingly, in this exemplary embodiment, correction of the above-described partial magnification and brightness correction for correcting the total amount of exposure per unit length are performed to obtain good image quality.

In particular, as the optical path length from the deflector 405 to the photosensitive drum 4 decreases, the angle of view increases, and thus the difference in scanning velocity between the on-axis image height and the most off-axis image height increases. According to earnest consideration made by the inventors, an optical configuration is obtained in which the rate of change in scanning velocity is 20% or more, that is, the scanning velocity at the most off-axis image height is 120% or more of the scanning velocity at the on-axis image height. In the case of such an optical configuration, it is difficult to maintain good image quality due to an influence of partial magnification in the main scanning direction and variations in the total amount of exposure per unit length.

The rate of change in scanning velocity C (%) is a value expressed by C=((Vmax−Vmin)/Vmin)*100, in which Vmin represents the lowest scanning velocity and Vmax represents the highest scanning velocity. In the optical configuration according to this exemplary embodiment, the scanning velocity is the lowest at the on-axis image height (a center portion of a scanning region) and the scanning velocity is the highest at the most off-axis image height (an end portion of the scanning region).

It has been found that, on the basis of earnest consideration made by the inventors, the rate of change in scanning velocity is 35% or more in an optical configuration having an angle of view of 52° or more. The conditions for obtaining an angle of view of 52° or more are as follows. For example, in the case of an optical configuration for forming a latent image having a width corresponding to the shorter side of an A4 sheet in the main scanning direction, an optical path length D2 (see FIG. 2A) from the deflection surface 405a to the scanned surface 407 is 125 mm or less when the scanning width W is 213 mm and the scanning angle of view is 0°. In the case of an optical configuration for forming a latent image having a width corresponding to the shorter side of an A3 sheet in the main scanning direction, the optical path length D2 (see FIG. 2A) from the deflection surface 405a to the scanned surface 407 is 247 mm or less when the scanning width W is 300 mm and the scanning angle of view is 0°. With the image-forming apparatus having such an optical configuration, good image quality can be obtained by using the configuration according to this exemplary embodiment described below, even if an image formation lens that does not have an fθ characteristic is used.

Exposure Control Configuration

Figure 5:
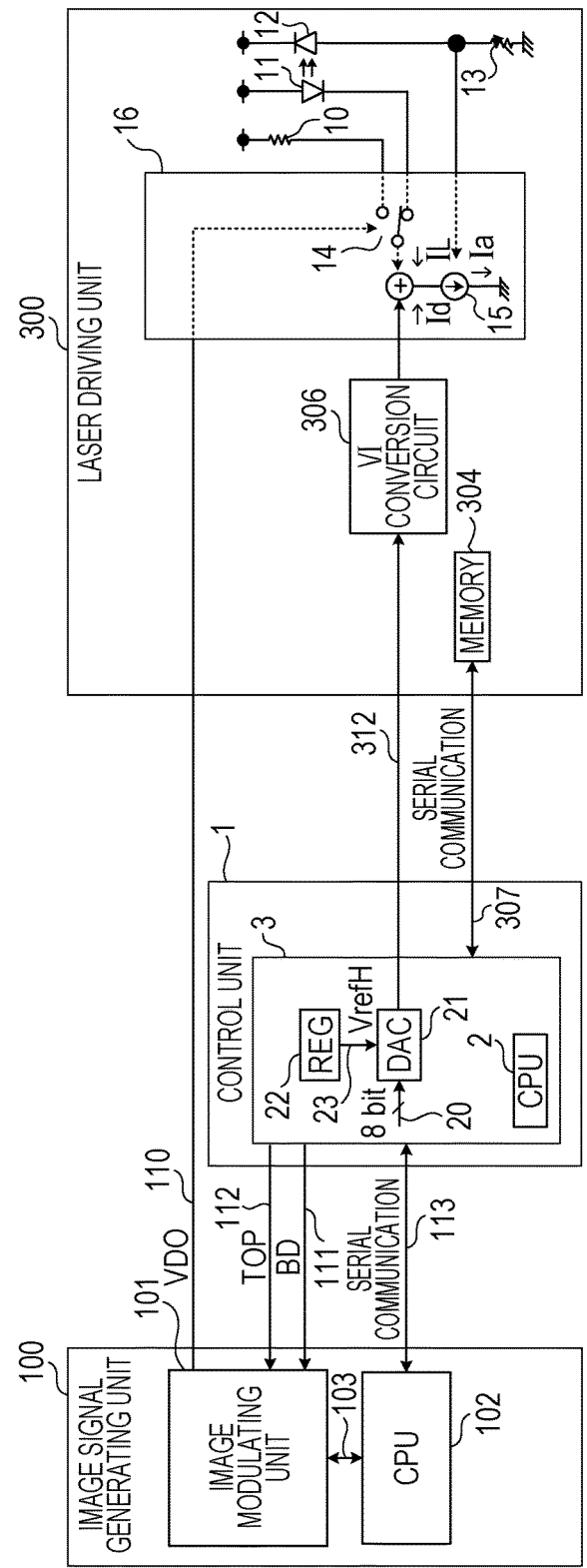
FIG. 5 is an electric block diagram illustrating an exposure control configuration.

FIG. 5 is an electric block diagram illustrating a configuration for controlling exposure in the image-forming apparatus 9. The image signal generating unit 100 receives print information from a host computer (not illustrated) and generates a VDO signal 110 corresponding to image data (image signal). Also, the image signal generating unit 100 has a function of a pixel width correction function. The control unit 1 controls the image-forming apparatus 9. Also, the control unit 1 functions as a brightness correcting unit to control the amount of light emitted by the light source 401. The laser driving unit 300 supplies a current to the light source 401 in response to the VDO signal 110 so as to cause the light source 401 to emit light.

When the image signal generating unit 100 becomes ready for outputting an image signal for forming an image, the image signal generating unit 100 instructs the control unit 1 to start printing through serial communication 113. When the control unit 1 becomes ready for printing, the control unit 1 transmits, to the image signal generating unit 100, a TOP signal 112 serving as a sub-scanning synchronization signal and a BD signal 111 serving as a main-scanning synchronization signal. In response to receipt of the synchronization signals, the image signal generating unit 100 outputs the VDO signal 110, which is an image signal, to the laser driving unit 300 at a certain timing.

The configurations of the image signal generating unit 100, the control unit 1, and the laser driving unit 300 will be described below.

Figure 6A:
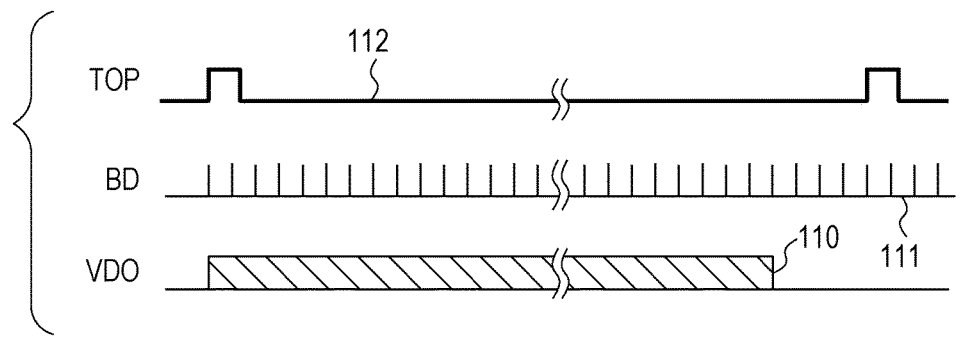
FIG. 6A is a timing chart of synchronization signals and an image signal, and FIG. 6B includes a timing chart of a BD signal and an image signal and a diagram illustrating a dot image on a scanned surface.

FIG. 6A is a timing chart of individual synchronization signals and an image signal in a case where an image formation operation for one page of a recording medium is performed. In FIG. 6A, the time elapses in the direction from the left to the right. "High" of the TOP signal 112 indicates that a head of the recording medium reaches a certain position. In response to receipt of "HIGH" of the TOP signal 112, the image signal generating unit 100 transmits the VDO signal 110 in synchronization with the BD signal 111. In response to the VDO signal 110, the light source 401 emits light, and a latent image is formed on the photosensitive drum 4.

In FIG. 6A, the VDO signal 110 is continuously output over a plurality of BD signals 111 for simplifying the illustration. Actually, however, the VDO signal 110 is output in a certain period during a period from when a BD signal 111 is output to when the next BD signal 111 is output.

Partial Magnification Correction Method

Figure 6B:
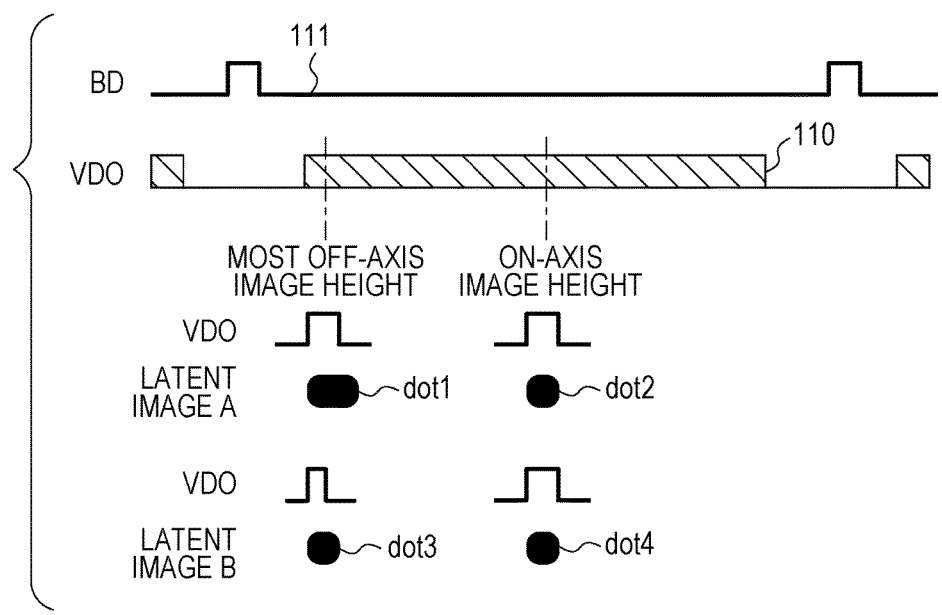

Next, a partial magnification correction method will be described. Before describing the partial magnification correction method, a factor and a correction principle of partial magnification will be described with reference to FIG. 6B. FIG. 6B is a diagram illustrating the timings of the BD signal 111 and the VDO signal 110 and dot images formed by using a latent image on the scanned surface 407. In FIG. 6B, the time elapses in the direction from the left to the right.

In response to receipt of a rising edge of the BD signal 111, the image signal generating unit 100 transmits the VDO signal 110 after a certain time period so that a latent image can be formed at a position distant from the left end of the photosensitive drum 4 by a desired distance. In response to the VDO signal 110, the light source 401 emits light, and a latent image corresponding to the VDO signal 110 is formed on the scanned surface 407.

Here, a description will be given of the case of forming a dot latent image by causing the light source 401 to emit light for the same period at the on-axis image height and the most off-axis image height in response to the VDO signal 110. The size of the dot corresponds to one dot of 600 dpi (a width of 42.3 μm in the main scanning direction). As described above, the optical scanning device 400 has an optical configuration in which the scanning velocity at an end portion (the most off-axis image height) is higher than that at a center portion (the on-axis image height) on the scanned surface 407. As can be seen in a latent image A, a latent image "dot 1" at the most off-axis image height is larger than a latent image "dot 2" at the on-axis image height in the main scanning direction. Thus, in this exemplary embodiment, the period and time width of the VDO signal 110 are corrected in accordance with the position in the main scanning direction, as partial magnification correction. That is, partial magnification correction is performed to make the light emission time interval for the most off-axis image height shorter than the light emission time interval for the on-axis image height, so that a latent image "dot 3" at the most off-axis image height and a latent image "dot 4" at the on-axis image height have substantially the same size as can be seen in a latent image B. With such correction, latent images of a dot shape corresponding to individual pixels can be formed with a substantially uniform interval in the main scanning direction.

Figure 7:
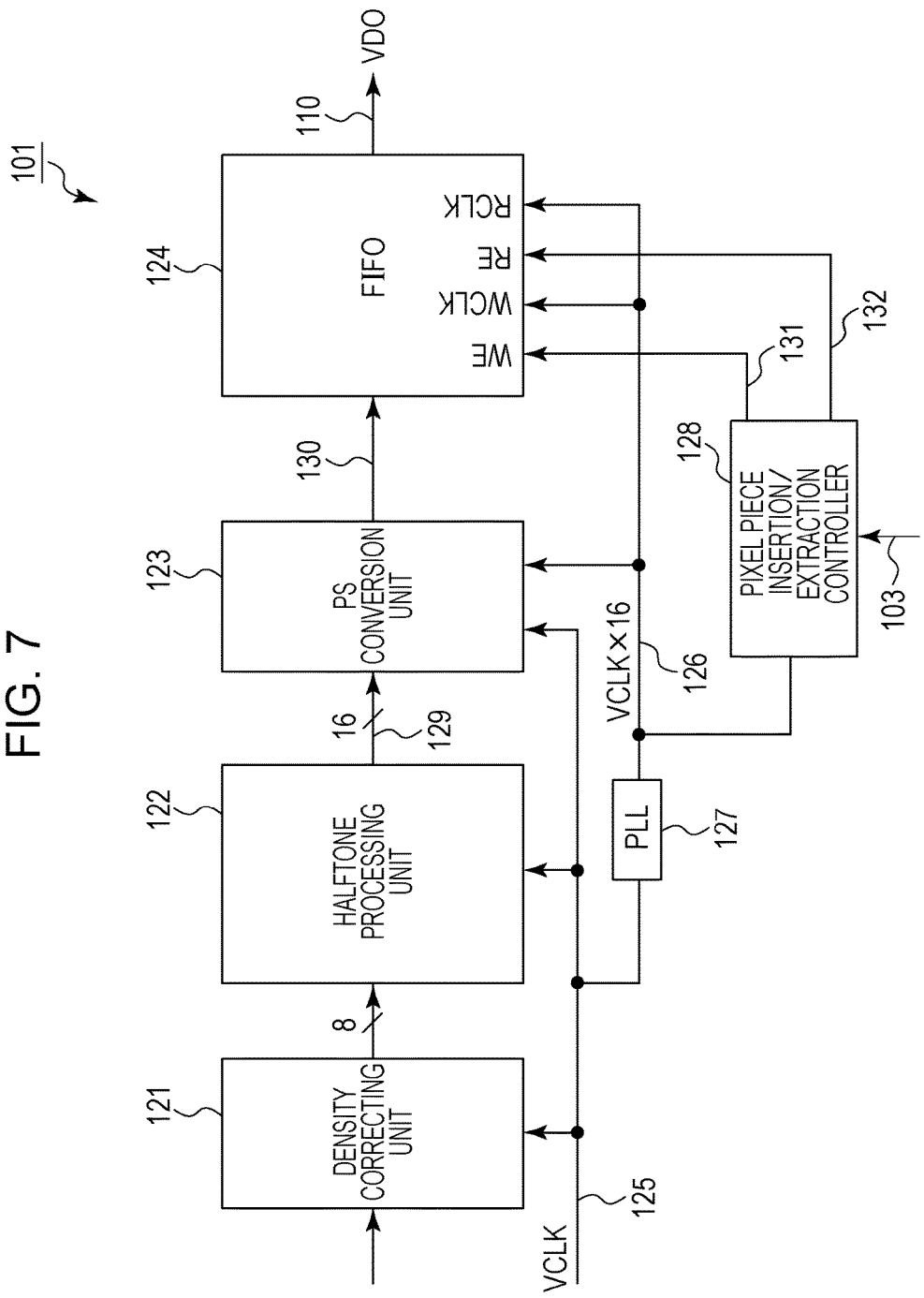
FIG. 7 is a block diagram illustrating an image modulating unit.

Next, a description will be given of specific processing of partial magnification correction for shortening the irradiation period of the light source 401 by a time period corresponding to an increase in partial magnification in accordance with transition from the on-axis image height to the off-axis image height, with reference to FIGS. 7 to 11B. FIG. 7 is a block diagram illustrating an example of the image modulating unit 101. A density correcting unit 121 stores a density correction table, which is used for printing an image signal received from the host computer (not illustrated) with an appropriate density. A halftone processing unit 122 performs screen (dithering) processing on an 8-bit multivalued parallel image signal input thereto, and performs conversion processing for expressing density in the image-forming apparatus 9.

Figure 8A:
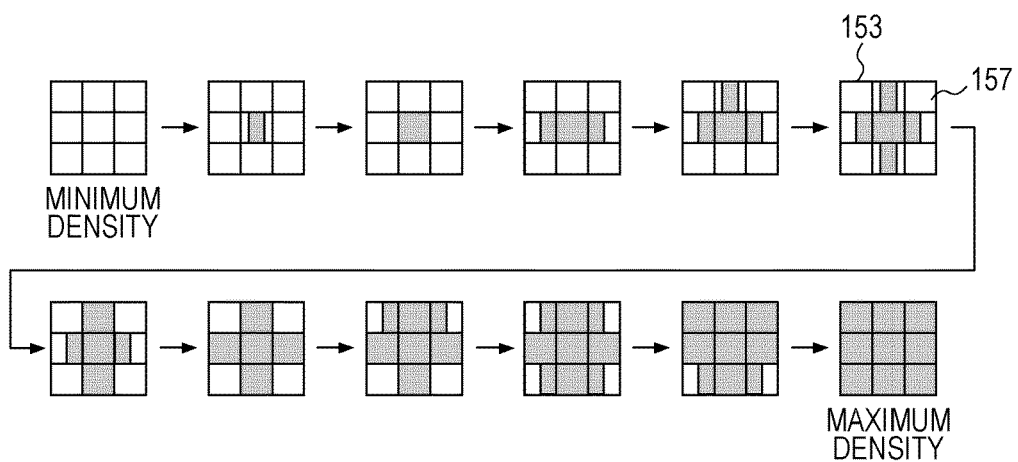
FIG. 8A is a diagram illustrating an example of screens.
Figure 8B:
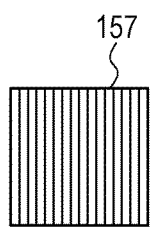
FIG. 8B is a diagram illustrating a pixel and pixel pieces.

FIG. 8A illustrates an example of a screen, in which density is expressed in a matrix 153 including three pixels in the main scanning direction and three pixels in the sub-scanning direction and 200 lines. In FIG. 8A, a white region is a region for which the light source 401 does not emit light (OFF), and a black region is a region for which the light source 401 emits light (ON). The matrix 153 is provided for each level of gradation, and the level of gradation (density) increases in the order indicated by arrows. In this exemplary embodiment, one pixel 157 is a unit of dividing image data to form one dot of 600 dpi on the scanned surface 407. As illustrated in FIG. 8B, in a state before a pixel width is corrected, one pixel is constituted by sixteen pixel pieces, each having a width corresponding to 1/16 of one pixel. ON/Off of the light source 401 can be switched for each pixel piece. That is, sixteen steps of gradation can be expressed in one pixel. A PS conversion unit 123 is a parallel-serial conversion unit, and converts a 16-bit parallel signal 129 received from the halftone processing unit 122 to a serial signal 130. A FIFO 124 receives the serial signal 130, stores the serial signal 130 in a line buffer (not illustrated), and outputs the serial signal 130 as the VDO signal 110 to the laser driving unit 300 in the subsequent stage after a certain time. The read/write control of the FIFO 124 is performed by a pixel piece insertion/extraction controller 128 by controlling a write enable signal WE 131 and a read enable signal RE 132 on the basis of partial magnification characteristic information received from a central processing unit (CPU) 102 via a CPU bus 103. A phase-locked loop (PLL) unit 127 supplies, to the PS conversion unit 123 and the FIFO 124, a clock signal 126 obtained by multiplying the frequency of a clock signal (VCLK) 125 corresponding to one pixel by 16 (VCLK×16). The frequencies of the clock signal 125 and the clock signal 126 are constant.

Next, a description will be given of an operation that is performed after the halftone processing described above with reference to FIG. 7, with reference to the timing chart in FIG. 9, which illustrates the operation of the image modulating unit 101. As described above, the PS conversion unit 123 captures the 16-bit multivalued signal 129 from the halftone processing unit 122 in synchronization with the clock signal 125, and transmits the serial signal 130 to the FIFO 124 in synchronization with the clock signal 126.

The FIFO 124 captures the serial signal 130 only in a case where the WE signal 131 is valid ("HIGH"). In the case of shortening an image in the main scanning direction to correct partial magnification, the pixel piece insertion/extraction controller 128 partially invalidates ("LOW") the WE signal 131, so as to cause the FIFO 124 not to capture the serial signal 130. That is, a pixel piece is extracted. FIG. 9 illustrates an example in which, in a case where one pixel is constituted by sixteen pixel pieces, one pixel piece is extracted from the first pixel so that the first pixel is constituted by fifteen pixel pieces.

The FIFO 124 reads accumulated data only in a case where the RE signal 132 is valid ("HIGH") in synchronization with the clock signal 126 (VCLK×16) and outputs the VDO signal 110. In the case of elongating an image in the main scanning direction to correct partial magnification, the pixel piece insertion/extraction controller 128 partially invalidates ("LOW") the RE signal 132, and thereby the FIFO 124 does not update read data, so that data corresponding to one clock before of the clock signal 126 is continuously output. That is, a pixel piece having identical data to the data of the pixel piece that is adjacent on the upstream side in the main scanning direction and that is previously processed is inserted. FIG. 9 illustrates an example in which, in a case where one pixel is constituted by sixteen pixel pieces, two pixel pieces are inserted into the second pixel so that the second pixel is constituted by eighteen pixel pieces. The FIFO 124 according to this exemplary embodiment has a configuration in which, in a case where the RE signal is invalid ("LOW"), an output is not in a Hi-Z state but the previous output is continued.

FIGS. 10A to 11B are diagrams for describing, using images, the 16-bit parallel signal 129, which is an input image of the halftone processing unit 122, to the VDO signal 110, which is an output of the FIFO 124.

Figure 10A:
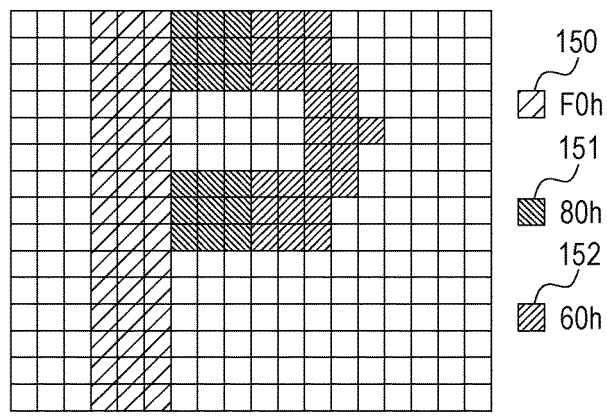
FIG. 10A is a diagram illustrating an example of an image signal input to a halftone processing unit.
Figure 10B:
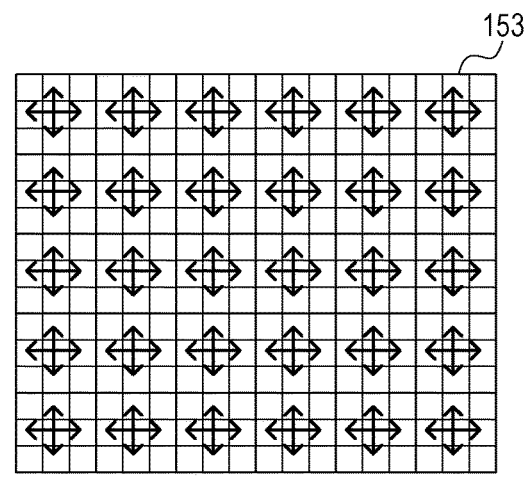
FIG. 10B is a diagram illustrating a screen.
Figure 10C:
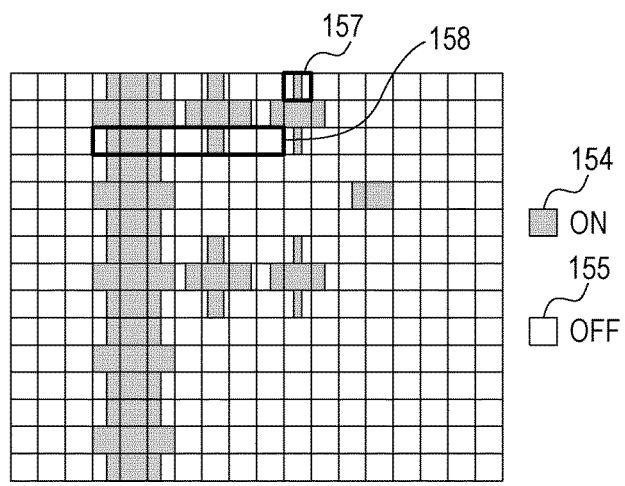
FIG. 10C is a diagram illustrating an example of an image signal on which halftone processing has been performed.

FIG. 10A illustrates an example of an 8-bit multivalued parallel image signal input to the halftone processing unit 122. Each pixel has 8-bit density information. A pixel 150 has density information F0h, a pixel 151 has density information 80h, a pixel 152 has density information 60h, and a white region has density information 00h. FIG. 10B illustrates a screen, which includes 200 lines and grows from the center, as described above with reference to FIGS. 8A and 8B. FIG. 10C illustrates an image of an image signal, which is the 16-bit parallel signal 129 on which halftone processing has been performed. As described above, each pixel 157 is constituted by sixteen pixel pieces.

Figure 11A:
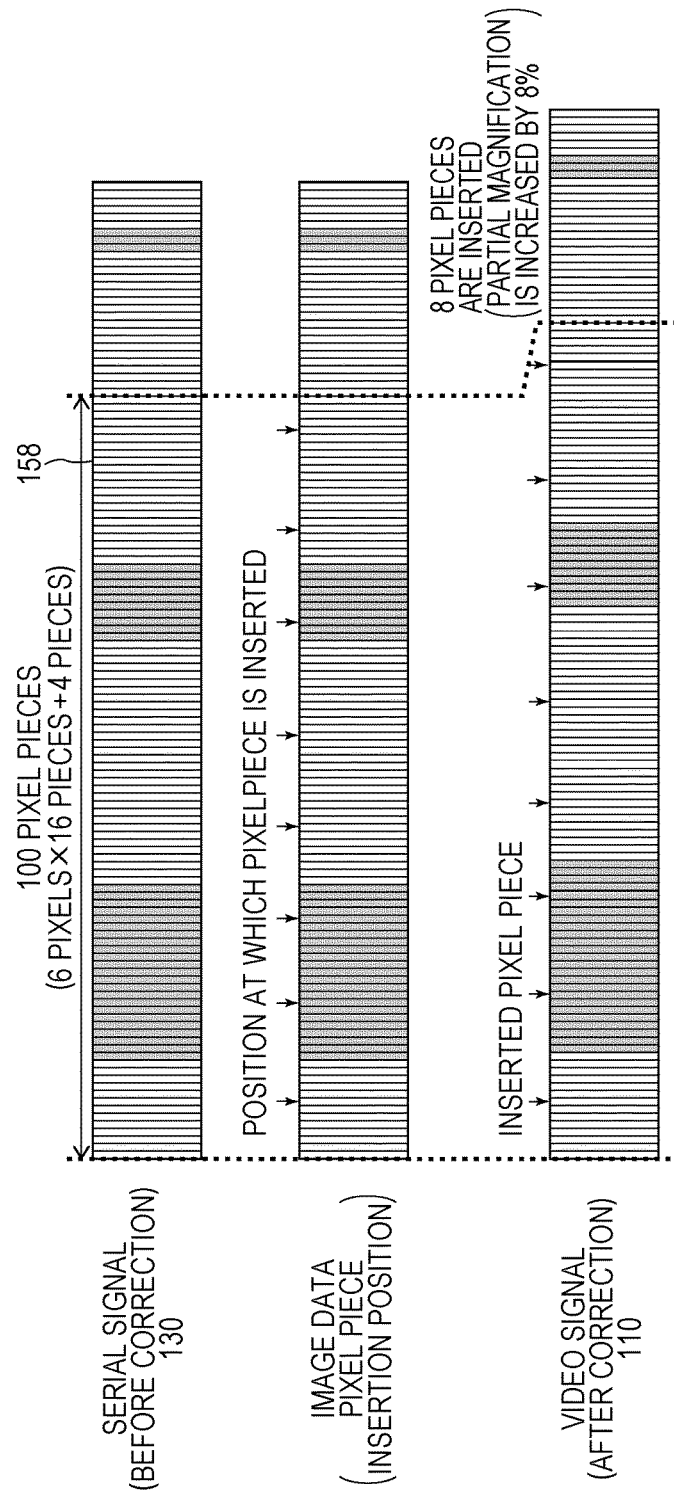
FIG. 11A is a diagram for describing insertion of pixel pieces.
Figure 11B:
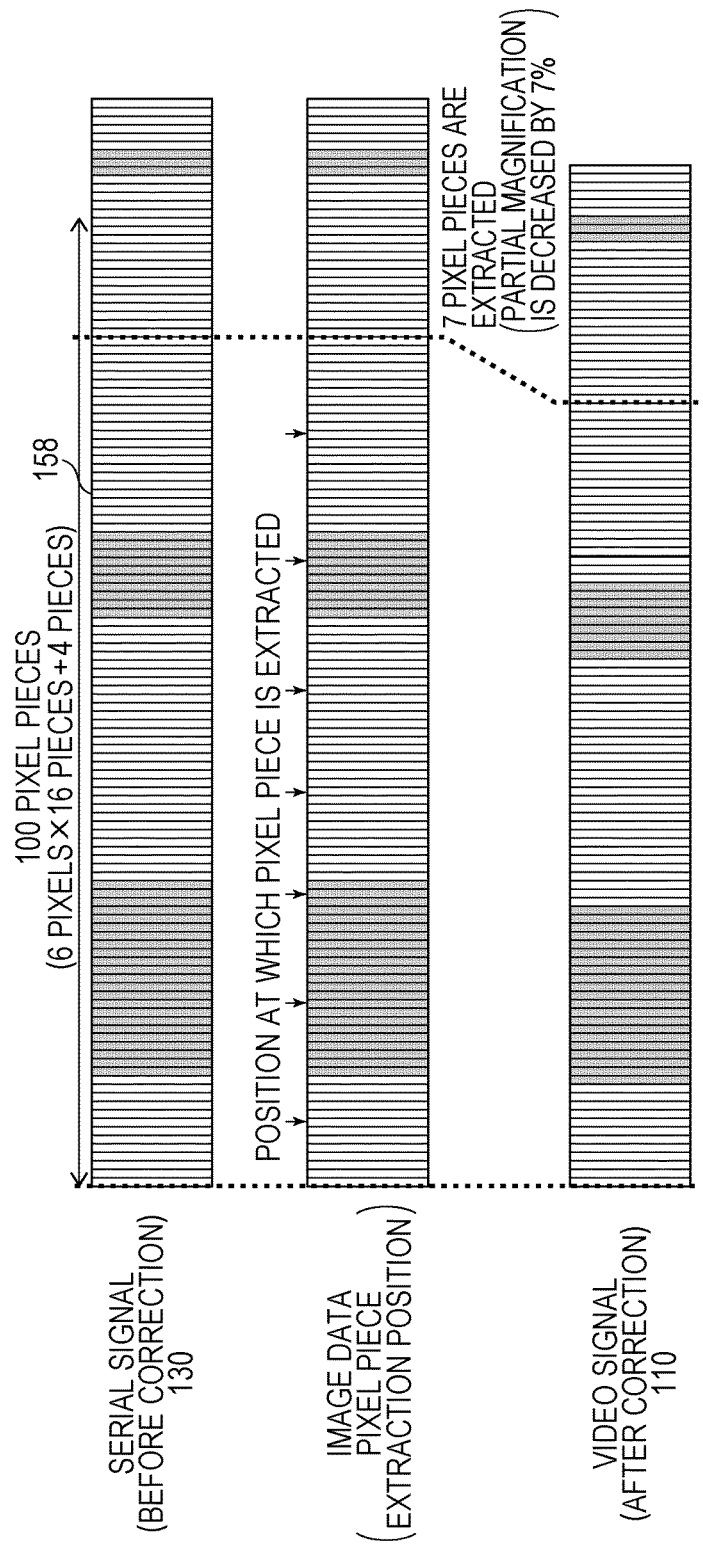
FIG. 11B is a diagram for describing extraction of pixel pieces.

FIGS. 11A and 11B illustrate, by focusing on an area 158 constituted by seven pixels arranged in the main scanning direction in FIG. 10C, an example of elongating the image by inserting pixel pieces thereinto and an example of shortening the image by extracting pixel pieces therefrom in the serial signal 130. FIG. 11A illustrates an example of increasing partial magnification by 8%. Eight pixel pieces are inserted, with a uniform interval or substantially uniform interval, into a group of one hundred contiguous pixel pieces, and thereby the pixel width can be changed to increase the partial magnification by 8% and a latent image can be elongated in the main scanning direction. FIG. 11B illustrates an example of decreasing partial magnification by 7%. Seven pixel pieces are extracted, with a uniform interval or substantially uniform interval, from a group of one hundred contiguous pixel pieces, and thereby the pixel width can be changed to decrease the partial magnification by 7% and a latent image can be shortened in the main scanning direction. In this way, with partial magnification correction, a pixel width whose length in the main scanning direction is less than one pixel is changed, so that dot-like latent images corresponding to individual pixels of image data can be formed with a substantially uniform interval in the main scanning direction. Note that the substantially uniform interval in the main scanning direction includes an imperfectly uniform interval in the main scanning direction. In other words, as a result of partial magnification correction, some variations of a pixel interval may be accepted, and it is sufficient that the pixels are arranged with a uniform interval on average within a certain range of image height. As described above, in a case where pixel pieces are inserted or extracted with a uniform or substantially uniform interval, when the number of pixel pieces constituting a pixel is compared between two adjacent pixels, the difference in the number of pixel pieces constituting the pixel is 0 or 1. Thus, compared to original image data, variations in image density in the main scanning direction can be suppressed, and thus good image quality can be obtained. The position at which a pixel piece is inserted or extracted may be the same or different in each scanning line in the main scanning direction.

As described above, the scanning velocity increases as the absolute value of the image height Y increases. Thus, in partial magnification correction, a pixel piece is inserted and/or extracted so that the length of an image decreases (the length of one pixel decreases) as the absolute value of the image height Y increases. In this way, latent images corresponding to individual pixels can be formed with a substantially uniform interval in the main scanning direction, and partial magnification can be appropriately corrected.

Brightness Correction

Next, brightness correction will be described with reference to FIGS. 5, 12, and 13. Brightness correction is performed for the following reason. That is, with partial magnification correction, correction is performed so that the length of one pixel decreases as the absolute value of the image height Y increases, and thus the total amount of exposure (the integrated amount of light) for one pixel given by the light source 401 decreases as the absolute value of the image height Y increases. In brightness correction, the brightness of the light source 401 is corrected so that the total amount of exposure (the integrated amount of light) for one pixel becomes constant at each image height.

The control unit 1 illustrated in FIG. 5 includes an integrated circuit (IC) 3 that includes a CPU core 2, an 8-bit digital-to-analog (DA) converter 21, and a regulator 22. The control unit 1 cooperates with the laser driving unit 300 to function as the brightness correcting unit. The laser driving unit 300 includes a memory (nonvolatile memory) 304, a VI conversion circuit 306 that converts a voltage to a current, and a laser driver IC 16, and supplies a drive current to the light emitter 11, which is a laser diode, in the light source 401. The memory 304 stores partial magnification characteristic information and information about a correction current to be supplied to the light emitter 11. The partial magnification characteristic information is partial magnification information corresponding to a plurality of image heights in the main scanning direction. Instead of the partial magnification information, characteristic information about a scanning velocity on the scanned surface may be stored.

Next, the operation of the laser driving unit 300 will be described. On the basis of the information about a correction current for the light emitter 11 stored in the memory 304, the IC 3 adjusts and outputs a voltage 23 that is output from the regulator 22. The voltage 23 serves as a reference voltage for the DA converter 21. Subsequently, the IC 3 sets input data 20 for the DA converter 21, and outputs a brightness correction analog voltage 312, which is increased or decreased in main scanning, in synchronization with the BD signal 111. The brightness correction analog voltage 312 is converted to a current value Id 313 by the VI conversion circuit 306 in the subsequent stage, and the current value Id 313 is output to the laser driver IC 16. In this exemplary embodiment, the IC 3 in the control unit 1 outputs the brightness correction analog voltage 312. Alternatively, a DA converter may be provided in the laser driving unit 300, and the brightness correction analog voltage 312 may be generated near the laser driver IC 16.

The laser driver IC 16 switches the supply of a current IL to the light emitter 11 or a dummy resistor 10 in accordance with the VDO signal 110, and thereby controls ON/OFF of light emission of the light source 401. The laser current value IL (third current) supplied to the light emitter 11 is obtained by subtracting a current Id (second current) output from the VI conversion circuit 306 from a current Ia (first current) set in a constant current circuit 15. The current Ia that flows through the constant current circuit 15 is automatically adjusted by performing, with a circuit included in the laser driver IC 16, feedback control so that the brightness detected by a photodetector 12, which is provided in the light source 401 and which monitors the amount of light emitted by the light emitter 11, becomes a desired brightness Papc1. The automatic adjustment is so-called auto power control (APC). The automatic adjustment of the brightness of the light emitter 11 is performed while the light emitter 11 is caused to emit light to detect a BD signal outside a print region for each main scanning operation of an amount of emitted laser light 316 (see FIG. 13). A method for setting the current Id output by the VI conversion circuit 306 will be described below. The value of a variable resistor 13 is adjusted at the assembly in a factory so that the value is input as a desired voltage to the laser driver IC 16 in a case where the light emitter 11 emits light with a certain brightness.

As described above, a current obtained by subtracting the current Id output from the VI conversion circuit 306 from the current Ia that is necessary to emit light with a desired brightness is supplied as a laser drive current IL to the light emitter 11. With this configuration, the laser drive current IL does not flow with a value of Ia or more. Note that the VI conversion circuit 306 serves as a part of the brightness correcting unit.

Figure 12:
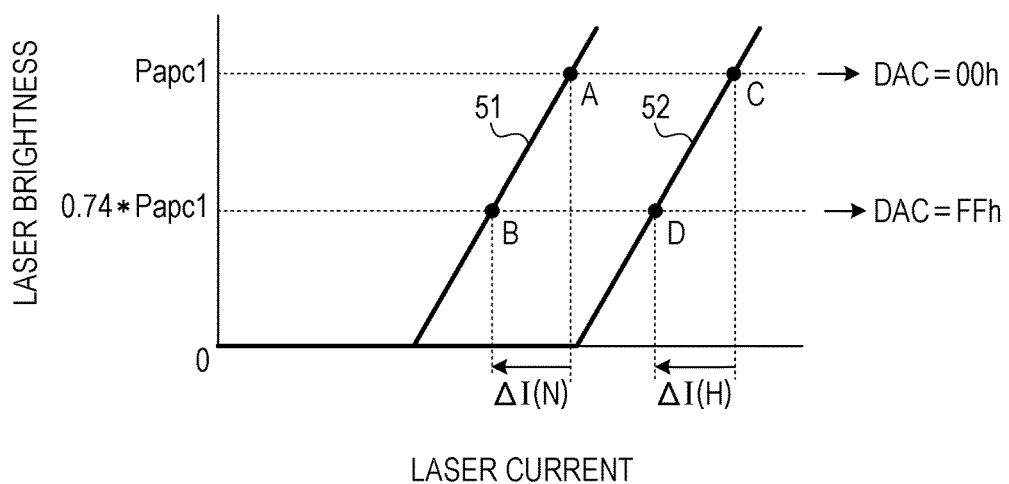
FIG. 12 is a graph illustrating a current-brightness characteristic of a light emitter.

FIG. 12 is a graph showing the characteristics of the current and brightness of the light emitter 11. The current Ia that is necessary for the light emitter 11 to emit light with a certain brightness is changed in accordance with an ambient temperature. In FIG. 12, a graph 51 is an example of a graph of a current-brightness characteristic under a standard-temperature environment, whereas a graph 52 is an example of a graph of a current-brightness characteristic under a high-temperature environment. Typically, the current Ia that is necessary to output a certain brightness of laser changes in a case where an environmental temperature changes, but the efficiency (the slope in the figure) hardly changes. That is, to emit laser light with a certain brightness Papc1, the current value indicated by point A is necessary as the current Ia under a standard-temperature environment, whereas the current value indicated by point C is necessary as the current Ia under a high-temperature environment. As described above, the laser driver IC 16 automatically adjusts the current Ia to be supplied to the light emitter 11 so as to obtain the certain brightness Papc1 by monitoring the brightness by using the photodetector 12, even if the environmental temperature changes. The efficiency hardly changes even if the environmental temperature changes. Thus, the brightness can be decreased to 0.74 times the certain brightness Papc1 by subtracting certain currents ΔI (N) and ΔI (H) from the current Ia for emitting light with the certain brightness Papc1. The efficiency hardly changes even if the environmental temperature changes, and thus the currents ΔI (N) and ΔI (H) are substantially equal to each other. In this exemplary embodiment, the brightness of the light emitter 11 gradually increases from the center portion (on-axis image height) to the end portion (most off-axis image height), that is, as the absolute value of the image height Y increases. Thus, light is emitted with the brightness indicated by point B or point D in FIG. 12 in the center portion, and light is emitted with the brightness indicated by point A or point C in the end portion.

Brightness correction is performed by subtracting the current Id corresponding to the certain currents ΔI (N) and ΔI (H) from the current Ia that has been automatically adjusted to emit light with the certain brightness. As described above, the scanning velocity increases as the absolute value of the image height Y increases. The total amount of exposure (the integrated amount of light) for one pixel decreases as the absolute value of the image height Y increases. Thus, in brightness correction, correction is performed so that the brightness increases as the absolute value of the image height Y increases. Specifically, a setting is made so that the current value Id decreases as the absolute value of the image height Y increases, so that the current IL increases as the absolute value of the image height Y increases. In this way, partial magnification can be appropriately corrected.

Description of Operation

Figure 13:
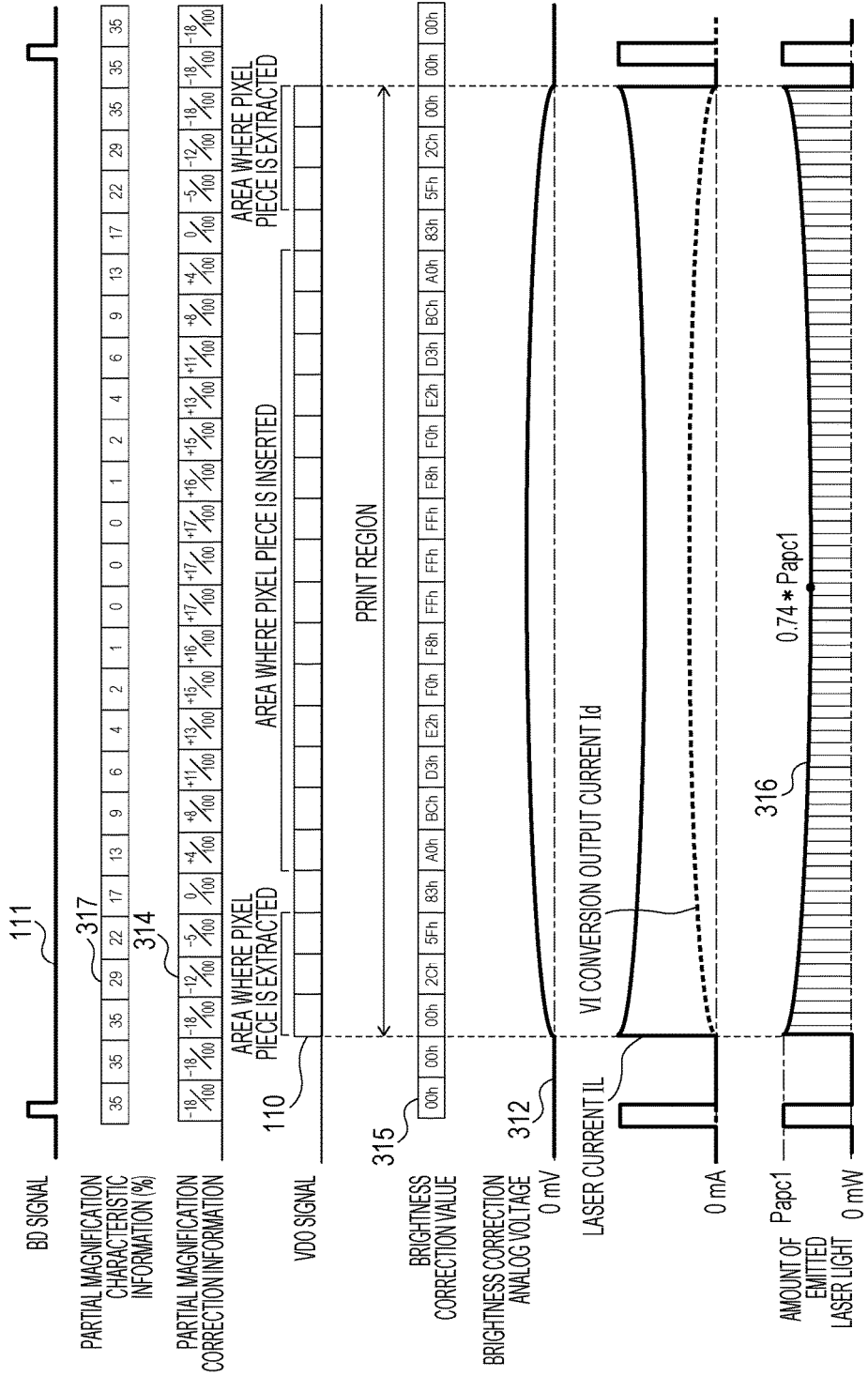
FIG. 13 is a timing chart for describing partial magnification correction and brightness correction.

FIG. 13 is a timing chart illustrating the above-described partial magnification correction and brightness correction. The memory 304 illustrated in FIG. 5 stores partial magnification characteristic information 317 about the optical scanning device 400. The partial magnification characteristic information may be measured and stored for each device after the optical scanning device 400 has been assembled. In a case where there is a small variation among the individual devices, a representative characteristic may be stored without measurement of information for the individual devices.

The CPU core 2 reads the partial magnification characteristic information 317 from the memory 304 through serial communication 307, and transmits it to the CPU 102 in the image signal generating unit 100. On the basis of the information, the CPU core 2 generates partial magnification correction information 314, and transmits it to the pixel piece insertion/extraction controller 128 in the image modulating unit 101 illustrated in FIG. 5. FIG. 13 illustrates an example in which the rate of change in scanning velocity C is 35% and thus a partial magnification of 35% is generated at the most off-axis image height when the on-axis image height is a reference. In this example, the partial magnification correction information 314 indicates that the point of 17% corresponds to zero magnification correction, the most off-axis image height corresponds to −18% (−18/100), and the on-axis image height corresponds to +17% (+17/100). Thus, as illustrated in FIG. 13, in the main scanning direction, pixel pieces are extracted to decrease an image length near the end portion where the absolute value of the image height is large, and pixel pieces are inserted to increase an image length near the center portion where the absolute value of the image height is small. As described above with reference to FIGS. 11A and 11B, to perform correction of −18% at the most off-axis image height, eighteen pixel pieces are extracted from one hundred pixel pieces. To perform correction of +17% at the on-axis image height, seventeen pixel pieces are inserted into one hundred pixel pieces. Accordingly, when the vicinity of the on-axis image height (center portion) is regarded as a reference, the state near the most off-axis image height (end portion) is substantially the same as a state where thirty-five pixel pieces are extracted from one hundred pixel pieces, and accordingly partial magnification of 35% can be corrected. That is, the time period over which the spot of the laser light 208 is moved a distance corresponding to the width of one pixel (42.3 μm (600 dpi)) on the scanned surface 407 at the most off-axis image height is 0.74 times that at the on-axis image height.

The ratio of a scanning period for the width of one pixel at the most off-axis image height relative to the on-axis image height can be expressed by the following expression by using the rate of change in scanning velocity C.

$$100\,[\%] / (100\,[\%] + C\,[\%]) = 100\,[\%] / (100\,[\%] + 35\,[\%])$$
$$= 0.74$$

With the insertion or extraction of pixel pieces having a width smaller than that of one pixel, the pixel width can be corrected, and latent images corresponding to individual pixels can be formed with a substantially uniform interval in the main scanning direction.

Alternatively, the on-axis image height may be regarded as a reference, neither insertion nor extraction of a pixel piece may be performed near the on-axis image height, and the rate of extracting pixel pieces may be increased as the image height approaches the most off-axis image height. Conversely, the most off-axis image height may be regarded as a reference, neither insertion nor extraction of a pixel piece may be performed near the most off-axis image height and the pixel width may remain reference, and the rate of inserting pixel pieces may be increased as the image height approaches the on-axis image height. Note that, as described above, higher image quality can be obtained by inserting or extracting pixel pieces so that the pixel at the intermediate image height between the on-axis image height and the most off-axis image height has a reference pixel width (the width corresponding to sixteen pixel pieces). That is, as the absolute value of the difference between the reference pixel width and a pixel width of a pixel to/from which pixel pieces have been inserted/extracted decreases, the image density in the main scanning direction is more faithful to original image data, and thus higher image quality can be obtained. This is particularly significant in the case of correcting partial magnification of 20% or more.

To perform brightness correction, the CPU core 2 in the IC 3 reads the partial magnification characteristic information 317 and the correction current information from the memory 304 before performing a printing operation. Subsequently, the CPU core 2 in the IC 3 generates a brightness correction value 315 for one scanning operation and stores the brightness correction value 315 in a register (not illustrated) in the IC 3. Also, the CPU core 2 in the IC 3 determines the output voltage 23 for the regulator 22 and inputs it as a reference voltage to the DA converter 21. The CPU core 2 in the IC 3 reads the stored brightness correction value 315 in synchronization with the BD signal 111, and outputs, from an output port of the DA converter 21, the brightness correction analog voltage 312 on the basis of the brightness correction value 315. The output brightness correction analog voltage 312 is supplied to the VI conversion circuit 306 in the subsequent stage and is converted to a current value Id for correction. The current value Id is input to the laser driver IC 16 and is subtracted from the current Ia. As illustrated in FIG. 13, the brightness correction value 315 varies in accordance with change of an irradiation position (image height) of laser light on the scanned surface, and thus the current value Id is also changed in accordance with the irradiation position of laser light. Accordingly, the current IL is controlled.

The brightness correction value 315 that is generated by the CPU core 2 on the basis of the partial magnification characteristic information 317 and the correction current information is set so that the current value Id decreases as the absolute value of the image height Y increases. Thus, as illustrated in FIG. 13, the current IL increases as the absolute value of the image height Y increases. In other words, during one scanning operation, the current value Id changes, and the current IL decreases toward the center portion of the image (as the absolute value of the image height Y decreases). As a result, the amount of laser light output from the light emitter 11 is corrected so that the light emitter 11 emits light with the brightness Papc1 at the most off-axis image height and emits light with a brightness 0.74 times the brightness Papc1, as illustrated in FIG. 13. In other words, the laser light is attenuated at an attenuation ratio of 26%. That is, the brightness at the most off-axis image height is 1.35 times the brightness at the on-axis image height. An attenuation ratio R % can be expressed by the following expression by using the rate of change in scanning velocity C.

$$R = (C / (100 + C)) * 100$$
$$= 35\,[\%] / (100\,[\%] + 35\,[\%]) * 100$$
$$= 26\,[\%]$$

An input of the DA converter 21 and the rate of decrease in brightness have a proportional relationship. For example, in a case where a setting is made so that an input of the DA converter 21 in the CPU core 2 is FFh and the amount of light decreases by 26%, the amount of light decreases by 13% at 80h.

Instead of controlling the current IL by subtracting the current Id from the current Ia, the current IL may be obtained by adding a current I to the current Ia in accordance with the irradiation position of laser light. Alternatively, when the irradiation position of laser light is a certain irradiation position, the current I may be added to the current Ia, and, when the irradiation position is another irradiation position, the current Id may be subtracted to obtain the current IL. That is, whether a current for correction is to be added or subtracted can be appropriately selected on the basis of the value of the reference current Ia for the current IL that is necessary at each image height.

Description of Effect

Figure 4B:
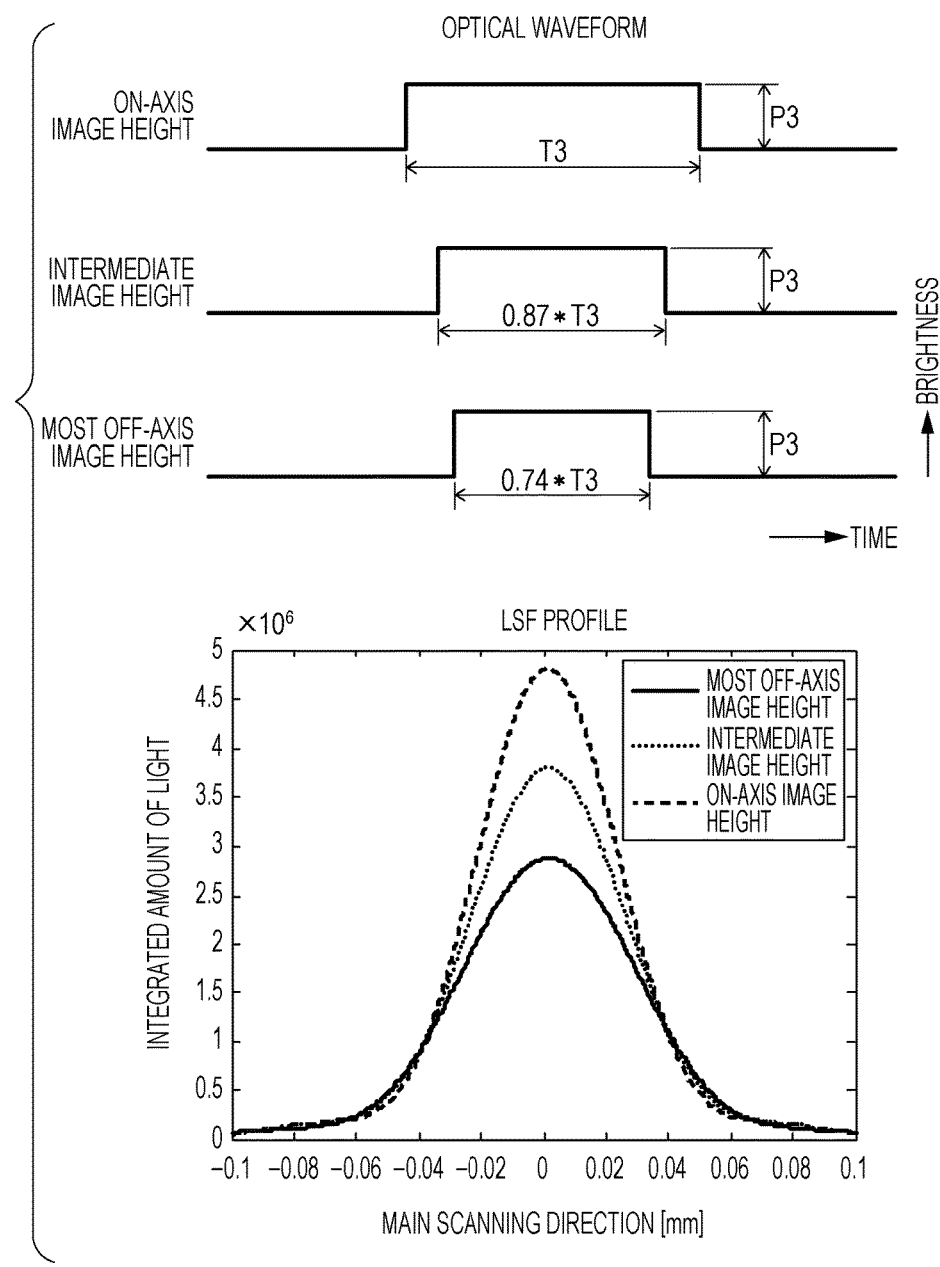
FIG. 4B is a diagram illustrating optical waveforms and a main scanning LSF profile according to a second comparative example.
Figure 4C:
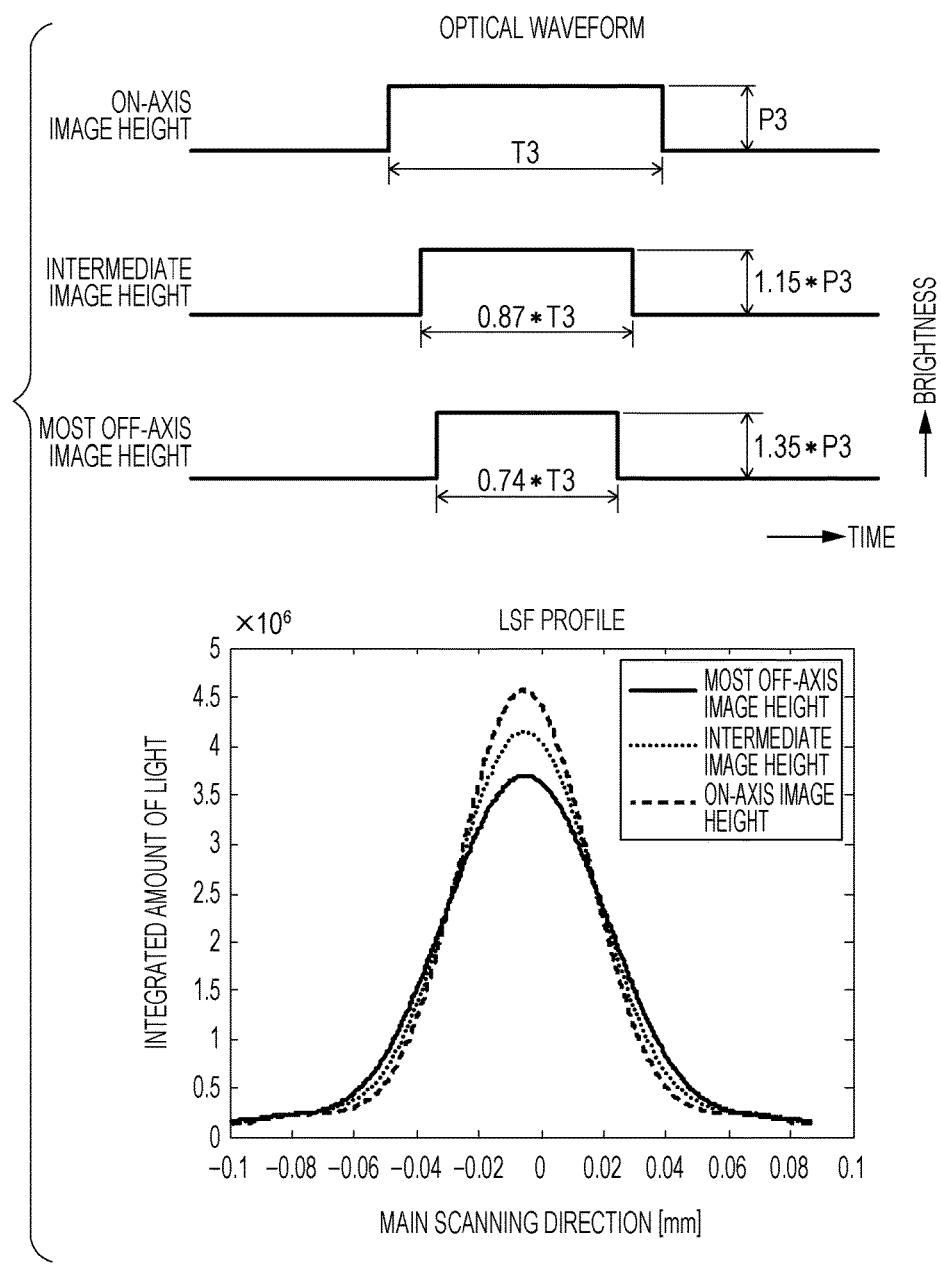
FIG. 4C is a diagram illustrating optical waveforms and a main scanning LSF profile according to a first exemplary embodiment.

FIGS. 4A to 4C are diagrams illustrating optical waveforms and main scanning line spread function (LSF) profiles. These optical waveforms and main scanning LSF profiles are obtained in a case where the light source 401 emits light with a certain brightness for a certain period at the on-axis image height, the intermediate image height, and the most off-axis image height. In the optical configuration according to this exemplary embodiment, the scanning velocity at the most off-axis image height is 135% of that at the on-axis image height, and the partial magnification of the most off-axis image height with respect to the on-axis image height is 35%. The optical waveforms illustrated here are emission waveforms of the light source 401. Each of the main scanning LSF profiles illustrated here is obtained by integrating, in the sub-scanning direction, spot profiles formed on the scanned surface 407 by emitting light with the above-described optical waveforms while moving the spot in the main scanning direction. This indicates the total amount of exposure (the integrated amount of light) on the scanned surface 407 when the light source 401 is caused to emit light with the above-described optical waveforms.

FIG. 4A illustrates a first comparative example in which the above-described partial magnification correction and brightness correction are not performed in an optical configuration similar to the optical configuration according to this exemplary embodiment. In the first comparative example, a light source emits light with a brightness P3 for a period T3 that is necessary for main-scanning one pixel (42.3 μm) at the on-axis image height. Thus, from the on-axis image height to the most off-axis image height, the main scanning LSF profile is enlarged and the peak of the integrated amount of light is lowered.

FIG. 4B illustrates a second comparative example in which the above-described partial magnification correction is performed and the above-described brightness correction is not performed. In the partial magnification correction, with reference to the period T3 that is necessary for main-scanning one pixel (42.3 μm) at the on-axis image height, the period corresponding to one pixel is shortened by a period corresponding to an increase in the partial magnification from the on-axis image height to the off-axis image height. The brightness is constant at P3. Enlargement of the main scanning LSF profile is suppressed from the on-axis image height to the most off-axis image height. However, the irradiation period is shortened, that is, the irradiation period at the intermediate image height is 0.87 times T3, and the irradiation period at the most off-axis image height is 0.74 times T3, and thus the peak of the integrated amount of light is further lowered compared to FIG. 4A.

FIG. 4C illustrates this exemplary embodiment in which the above-described partial magnification correction and brightness correction are performed. Processing similar to that in the second comparative example is performed for partial magnification correction. As the brightness correction, the integrated amount of light that has been reduced by shortening the emission period of the light source 401 facing one pixel from the on-axis image height to the most off-axis image height in the partial magnification correction is compensated for. That is, correction is performed to increase the brightness of the light source 401 from the on-axis image height to the most off-axis image height with reference to the brightness P3. In FIG. 4C, the brightness at the most off-axis image height is 1.35 times P3. Compared to the main scanning LSF profile in FIG. 4B, lowering of the peak of the integrated amount of light is suppressed, and also enlargement of the profile is suppressed from the on-axis image height to the most off-axis image height. The LSF profiles of the on-axis image height, intermediate image height, and most off-axis image height in FIG. 4C are not completely the same, but the total amounts of exposure for individual pixels are substantially the same, and correction is performed so that the image to be formed is not affected.

As described above, according to this exemplary embodiment, partial magnification correction and brightness correction are performed, and accordingly exposure can be performed while suppressing the occurrence of image failure without using a scanning lens having an fθ characteristic.

In the above-described exemplary embodiment, partial magnification correction is performed by inserting or extracting pixel pieces. In the case of correcting partial magnification by using such a method, the following advantages are obtained compared to the case of changing a clock frequency in the main scanning direction as disclosed in Japanese Patent Laid-Open No. 58-125064. In the configuration disclosed in Japanese Patent Laid-Open No. 58-125064, a clock generating unit capable of outputting clock signals of a plurality of different frequencies is necessary to change a clock frequency in the main scanning direction, and the cost is increased by the clock generating unit. In particular, in the case of correcting partial magnification of 20% or more by using change in the clock frequency, the cost increases significantly. Further, in the case of changing the clock frequency, the accuracy of changing the clock frequency is limited, and also the accuracy of partial magnification correction is limited. However, in this exemplary embodiment, partial magnification correction can be performed without changing the clock frequencies of the clock signal 125 and the clock signal 126. Thus, in this exemplary embodiment, partial magnification correction can be performed only by providing one clock generating unit, and an increase in the cost of a clock generating unit can be suppressed. Further, in this exemplary embodiment, partial magnification correction can be performed by inserting or extracting pixel pieces, and thus a relatively high accuracy of partial magnification correction can be achieved.

Second Exemplary Embodiment

FIGS. 14 to 17 are diagrams for describing a second exemplary embodiment. In the second exemplary embodiment, brightness correction is performed by using a method different from the method according to the first exemplary embodiment. Specifically, in the first exemplary embodiment, control is performed to decrease the brightness toward the on-axis image height, with the maximum brightness (at the most off-axis image height) being the reference. In contrast, in the second exemplary embodiment, control is performed to increase the brightness toward the most off-axis image height, with the minimum brightness (near the on-axis image height) being the reference. Also, in the first exemplary embodiment, the memory 304 stores partial magnification characteristic information and correction current information for the light emitter 11 to be used for brightness correction. In contrast, in the second exemplary embodiment, the memory 304 stores only partial magnification characteristic information. The correction current for the light emitter 11, which is calculated by using the partial magnification characteristic information and is used to obtain target brightness is calculated by using a laser brightness monitoring unit of the laser driving unit 300 under control by the apparatus. The partial magnification correction and the other configuration are the same as those in the first exemplary embodiment, and thus the same reference numerals are assigned and the description thereof is omitted.

Figure 14:
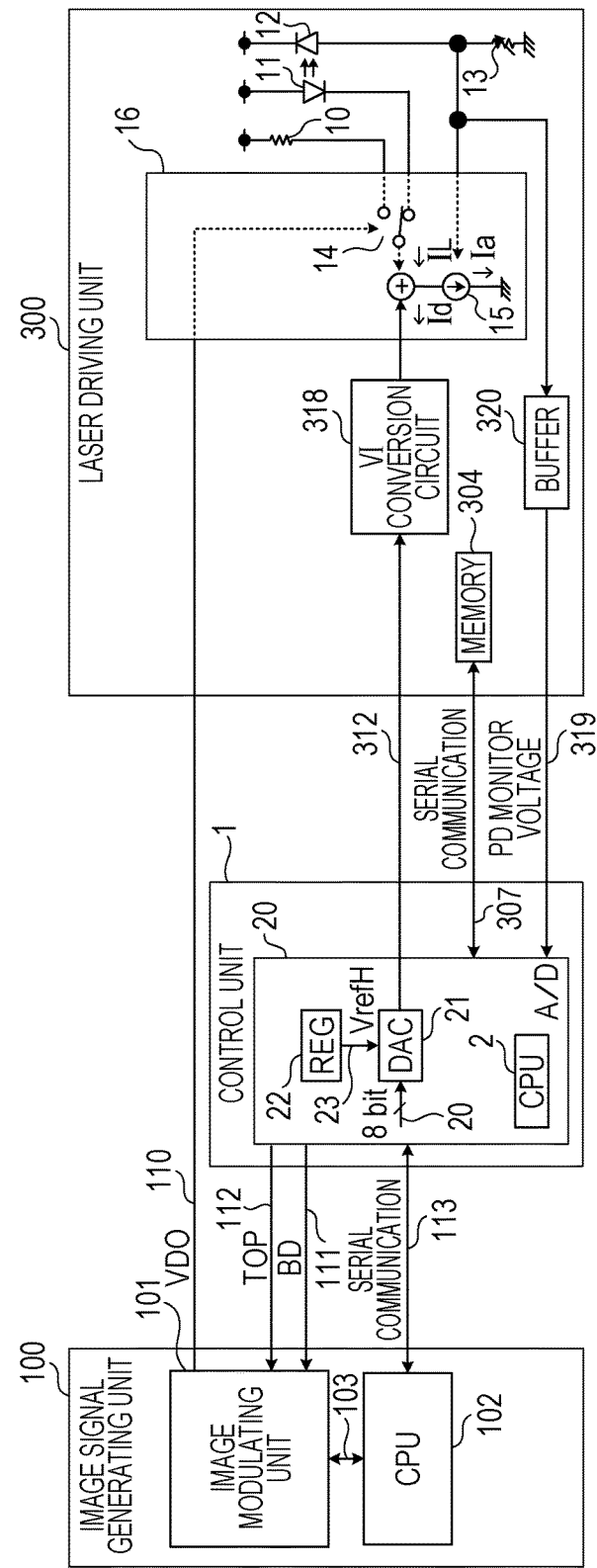
FIG. 14 is an electric block diagram illustrating an exposure control configuration.

FIG. 14 is an electric block diagram illustrating an exposure control configuration. The laser driving unit 300 according to this exemplary embodiment (FIG. 14) is different from the laser driving unit 300 according to the first exemplary embodiment (FIG. 5) in that a VI conversion circuit 318 has a different function from that of the VI conversion circuit 306 and that a buffer circuit 320 is provided. Further, an IC 20 of the control unit 1 includes an AD converter.

The buffer circuit 320 is used to buffer a voltage obtained by converting, with the variable resistor 13, a current generated at the photodetector 12 in accordance with the emission brightness of the light emitter 11, and transmit the buffered voltage to the IC 20 of the control unit 1. The VI conversion circuit 318 has a characteristic in which the direction of a current output therefrom is opposite to that in the first exemplary embodiment.

The memory 304 stores only partial magnification characteristic information. The elements other than the above-described circuit and device are the same as those in the first exemplary embodiment, and are thus denoted by the same reference numerals and the description thereof is omitted. On the basis of the partial magnification characteristic information stored in the memory 304, the IC 20 including the CPU core 2 calculates a brightness correction value, and outputs the brightness correction analog voltage 312 that increases/decreases in the main scanning in synchronization with the BD signal 111 as a horizontal synchronization signal. The brightness correction analog voltage 312 is determined by the brightness correction value 315 generated by the CPU core 2 in the IC 20 and the reference voltage 23 of the DA converter 21 output from the regulator 22.

The brightness correction analog voltage 312 is converted to a current value Id (second current) by the VI conversion circuit 318 in the subsequent stage, and the current value Id flows in the direction of drawing a current from the laser driver IC 16. That is, the direction in which the current value Id flows is opposite to that in the first exemplary embodiment. In other words, the laser current value IL (third current) supplied to the light emitter 11 is a current obtained by adding the current Id drawn by the VI conversion circuit 318 to the current Ia (first current) output from the constant current circuit 15. The current Ia that flows through the constant current circuit 15 is automatically adjusted by the circuit in the laser driver IC 16 so that the photodetector 12 for monitoring the brightness of the light emitter 11 detects a desired brightness Papc2. Automatic adjustment of the brightness of the light emitter 11 is performed while the light emitter 11 is emitting light to detect the BD signal 111 outside the print region for each main scanning operation of the amount of emitted laser light 316 illustrated in FIG. 16.

Figure 15:
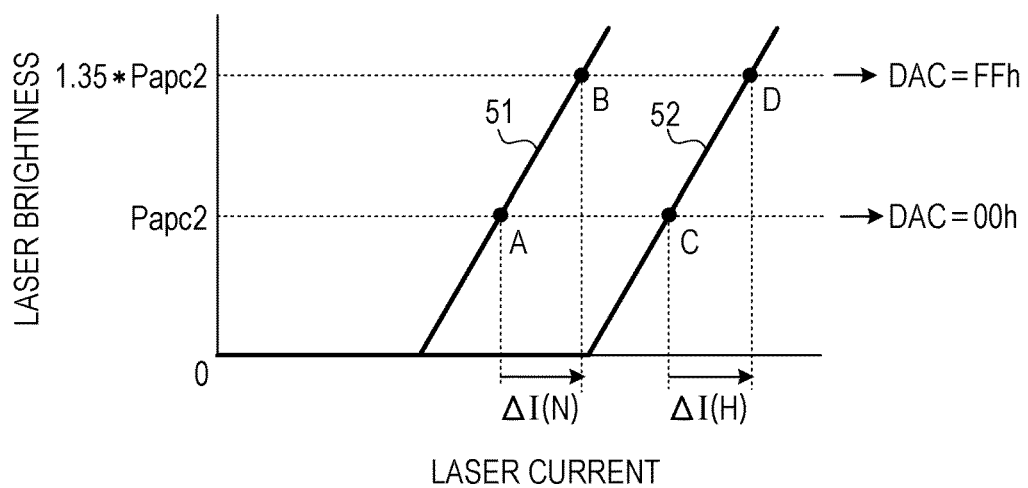
FIG. 15 is a graph illustrating a current-brightness characteristic of the light emitter.
Figure 16:
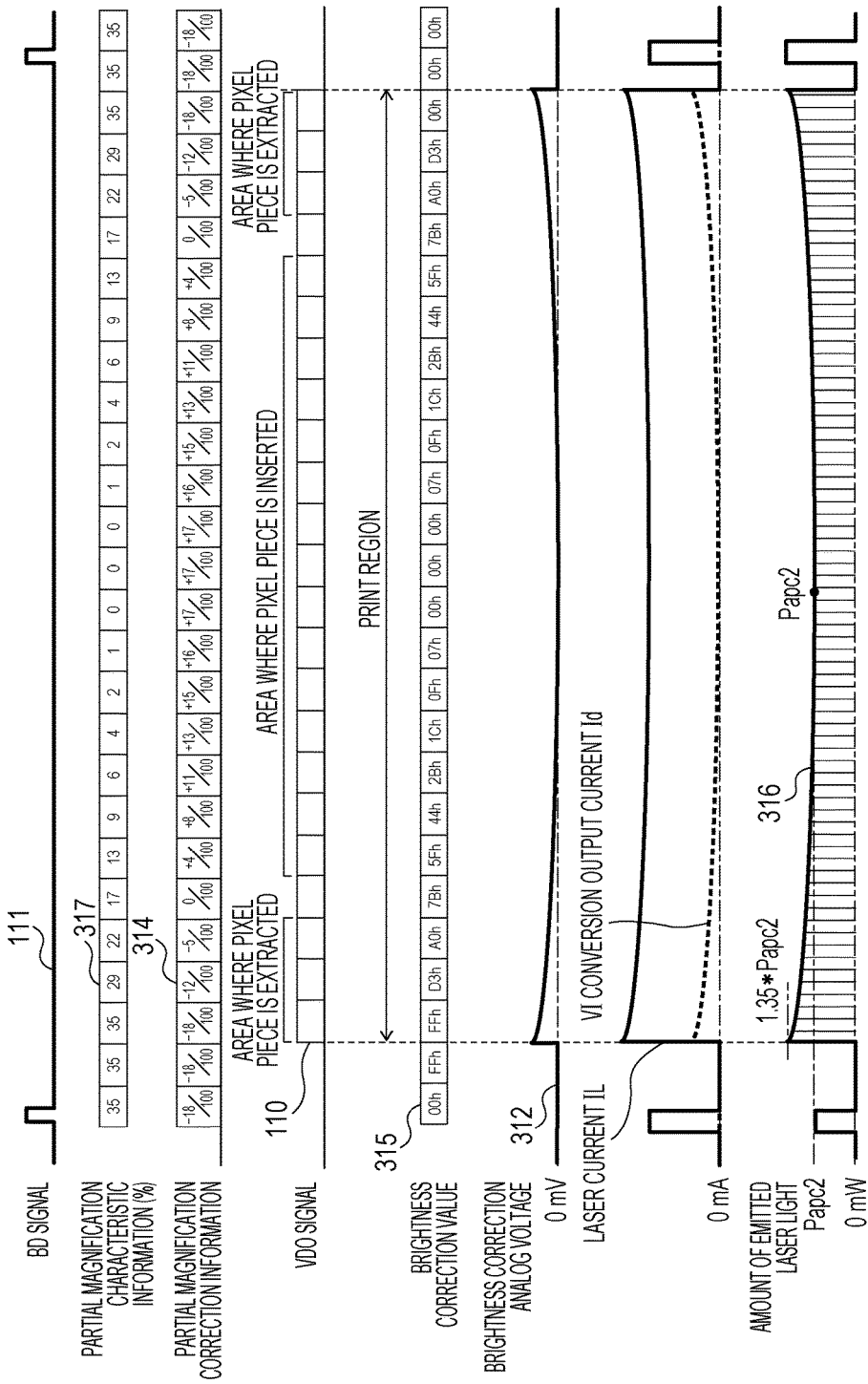
FIG. 16 is a timing chart for describing partial magnification correction and brightness correction.

FIG. 15 is a graph showing the characteristics of the current and brightness of the light emitter 11. In this example, when the DA converter 21 has 00h, that is, when the current value Id 313 is zero, the laser driver IC 16 performs automatic adjustment so that light is emitted with the desired brightness Papc2 (points A and C). Papc2 is regarded as a brightness that is necessary for an electrophotographic process at the position where the main scanning velocity is the lowest, that is, near the on-axis image height where the partial magnification is 0%. With certain currents ΔI (N) and ΔI (H) being added to the current IL for emitting light at the certain brightness Papc2 by increasing the brightness correction value 315 to FFh, the brightness can be increased to 1.35 times Papc2 (points B and D in FIG. 15). In this exemplary embodiment, as can be seen in the amount of emitted laser light 316 illustrated in FIG. 16, the output current 313 of the VI conversion circuit 318 gradually increases in accordance with change of a laser light irradiation position from the center portion (on-axis image height) to the end portion (most off-axis image height), so that a laser current is increased and the brightness of the light emitter 11 is increased.

Figure 17:
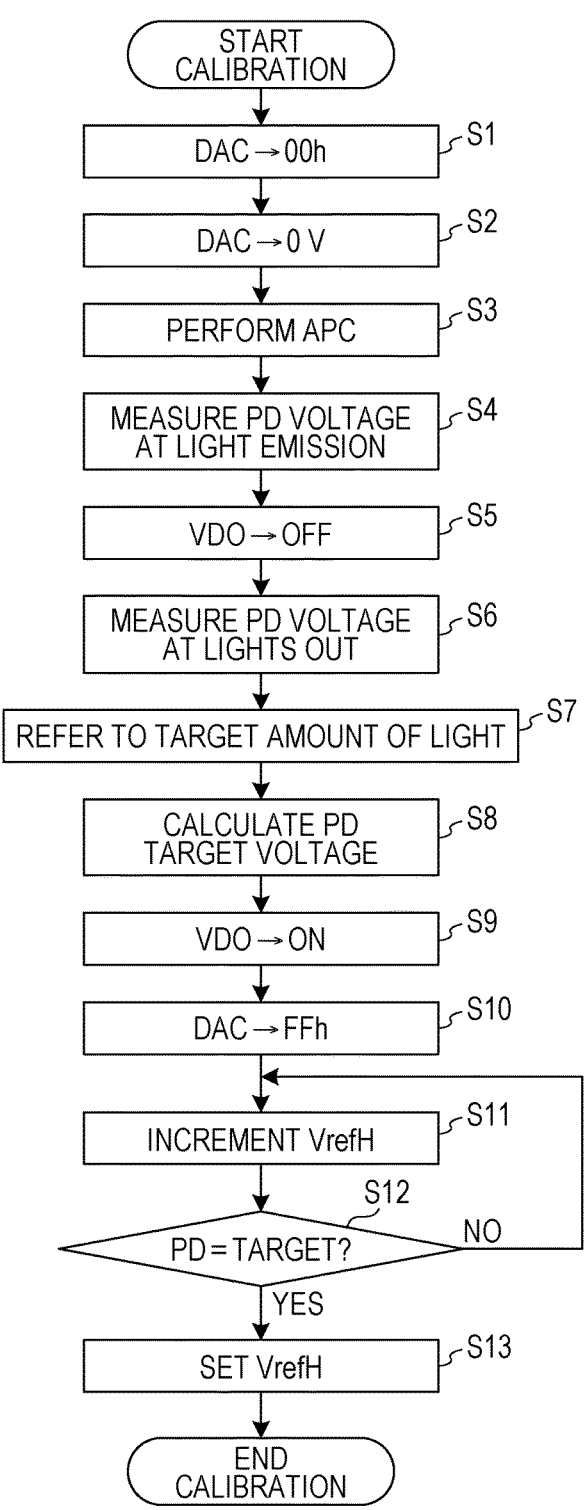
FIG. 17 is a flowchart illustrating processing of obtaining a brightness correction current.

Next, a description will be given of a processing flow for obtaining a laser current ΔI (N) to be added to increase the laser brightness from Papc2 to 1.35 times Papc2, in other words, a processing flow for determining the reference voltage 23 of the DA converter 21, with reference to the flowchart illustrated in FIG. 17. This processing flow is performed by the CPU core 2 when the power of the image-forming apparatus 9 is turned on for the first time and is stored in the memory 304. When the power is turned on thereafter, the CPU core 2 refers to a value stored in the memory 304. Alternatively, the CPU core 2 may perform the processing flow every time the power is turned on or may perform the processing flow at a recovery from a standby mode.

First, the CPU core 2 of the IC 20 inputs 00h to the DA converter 21 so that an output voltage is 0 V (steps S1 and S2). In this state, the laser driver IC 16 automatically adjusts the laser current IL so that laser light is output with a certain brightness (step S3). Subsequently, the image modulating unit 101 continuously keeps the VDO signal 110 in an ON-state, and the CPU core 2 captures a voltage Von as a PD monitor voltage 319 (step S4). Subsequently, the image modulating unit 101 continuously keeps the VDO signal 110 in an OFF-state, and the CPU core 2 captures a voltage Voff as the PD monitor voltage 319 (steps S5 and S6). The CPU core 2 of the IC 20 refers to the partial magnification characteristic information stored in the memory 304, and temporarily stores a point a % of the highest magnification in the register of the CPU core 2 (step S7). Subsequently, the CPU core 2 calculates a target voltage Va of the PD monitor voltage 319 by using the following equation (step S8).

$$Va = Von + (Von - Voff) * a/100$$

For example, Va is 2.9 V under the following condition.

$$Von = 2.2V, \; Voff = 0.2V, \; a = 35\%$$

Subsequently, the image modulating unit 101 causes the VDO signal 110 to be in an ON-state (step S9). Subsequently, the CPU core 2 sets the input of the DA converter 21 to FFh (step S10). Subsequently, the CPU core 2 increments the reference voltage 23 represented by VrefH output from the regulator 22 from 0 V, and compares the reference voltage 23 with the target voltage Va with reference to the PD monitor voltage 319 (steps S11 and S12). The CPU core 2 stores, in the memory 304, the reference voltage 23 of the DA converter 21 when the PD monitor voltage 319 matches Va, that is, the set value of the regulator 22 (step S13). As illustrated in FIG. 15, after the light emitter 11 emits light, the laser current and the brightness have a proportional relationship. Thus, in a case where FFh is input to the DA converter 21 to increase the brightness by 35%, the brightness increases by 17.5% by inputting half of FFh, that is, 80h.

As described above, according to this exemplary embodiment, exposure can be performed while suppressing the occurrence of image failure without using a scanning lens having an fθ characteristic, by performing partial magnification correction and brightness correction as in the first exemplary embodiment.

Third Exemplary Embodiment

A third exemplary embodiment will be described with reference to FIGS. 18A to 23. In the third exemplary embodiment, a description will be given of a method for performing emission period correction and brightness correction in addition to the partial magnification correction described in the first exemplary embodiment, in order to further enhance image quality. FIG. 20 is a diagram illustrating an exposure control configuration. The third exemplary embodiment is different from the first exemplary embodiment in the configuration of an image modulating unit 160 of the image signal generating unit 100 illustrated in FIG. 20. The other elements are the same as in the first exemplary embodiment, and thus the elements are denoted by the same reference numerals and the description thereof is omitted.

In the first exemplary embodiment, as illustrated in FIG. 4C, the main scanning LSF profile can be corrected so that an image is not affected. In the third exemplary embodiment, an illumination (emission) period and brightness of the light source 401 controlled by using the VDO signal 110 are made more appropriate so as to achieve optimal image formation for a fine image constituted by lines (vertical lines) extending in the sub-scanning direction with a width of one pixel (dot), for example.

Figure 18C:
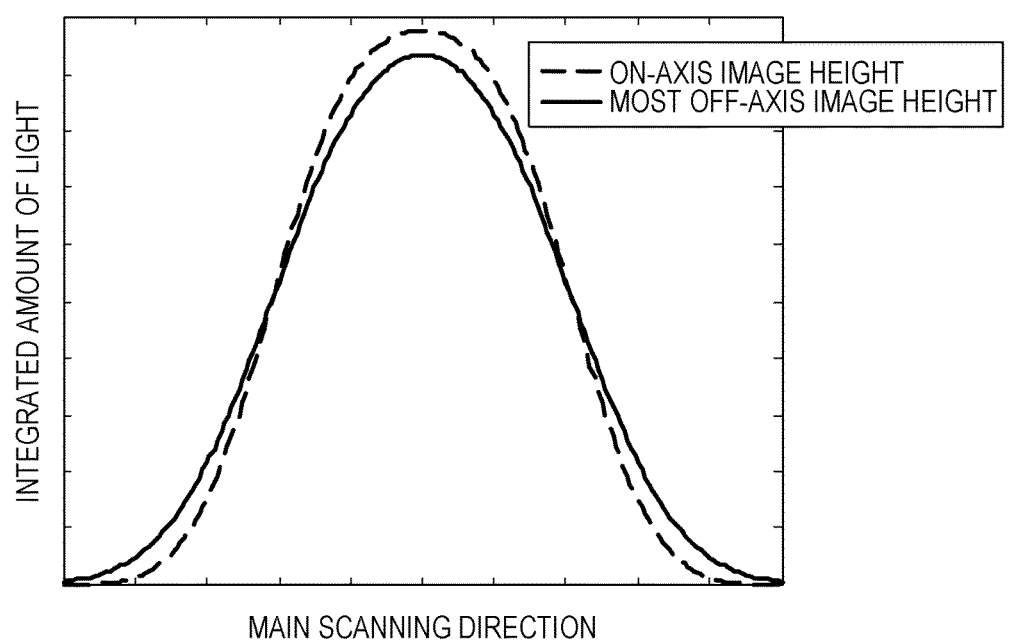

FIGS. 18A to 18C illustrate main scanning LSF profiles obtained as a result of performing laser scanning for one dot in a case where the same partial magnification correction and brightness correction as those in the first exemplary embodiment are performed. FIG. 18A illustrates a main scanning LSF profile of the on-axis image height, and FIG. 18B illustrates a main scanning LSF profile of the most off-axis image height. FIG. 18C illustrates the main scanning LSF profiles of one dot of the on-axis image height and the most off-axis image height illustrated in FIGS. 18A and 18B in an overlapped manner. Here, the resolution is 600 dpi, and the width in the main scanning direction of one dot (pixel) is 42.3 μm. At the most off-axis image height, the partial magnification is 35%. Thus, light is emitted with the brightness P3 for the period T3 at the on-axis image height, and light is emitted with a brightness 1.35*P3 for a period 0.74*T3 at the most off-axis image height. As illustrated in FIG. 18C, in the main scanning LSF profiles of one dot, the peak of the integrated amount of light is lower in the most off-axis image height than in the on-axis image height. Further, the lower portion of the profile of the most off-axis image height has a larger width, and the main scanning LSF profiles do not completely match each other. Also, from the on-axis image height to the most off-axis image height, the peak of the integrated amount of light gradually decreases and the width of the lower portion of the profile increases.

As described above, the main scanning LSF profile of one dot differs between the on-axis image height and the most off-axis image height. This is because the profiles of stationary spots represented by broken lines in FIGS. 18A and 18B differ between the on-axis image height and the most off-axis image height. The profile of a stationary spot is a main scanning LSF profile formed by a laser spot at a certain moment. As a result of summing up the profiles of stationary spots at individual main scanning positions, the main scanning LSF profiles of one dot represented by solid lines in FIGS. 18A and 18B are obtained.

Even if brightness correction is performed, it is impossible to make the profiles of stationary spots of the most off-axis image height and the on-axis image height completely the same, because the shape of the spot of the laser light 208 focused on the scanned surface 407 by the image formation lens 406 is not completely the same between the most off-axis image height and the on-axis image height.

Accordingly, in this exemplary embodiment, emission period correction and brightness correction for the light source 401 are performed on the basis of the VDO signal 110, in addition to the partial magnification correction according to the first exemplary embodiment, and thereby the reproducibility of a fine image is further enhanced.

Figure 19A:
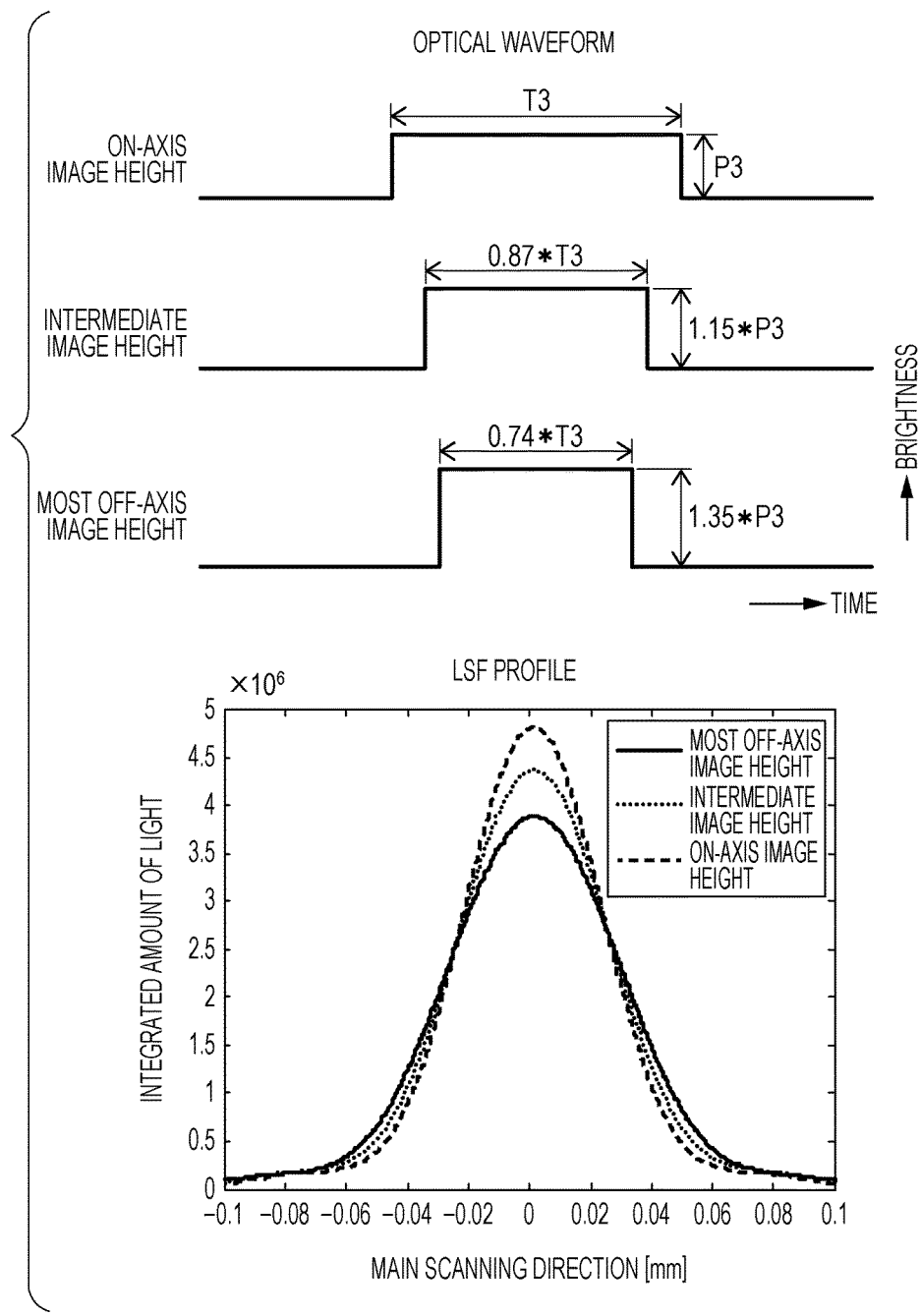
FIG. 19A is a diagram illustrating optical waveforms and a main scanning LSF profile according to the first exemplary embodiment.
Figure 20:
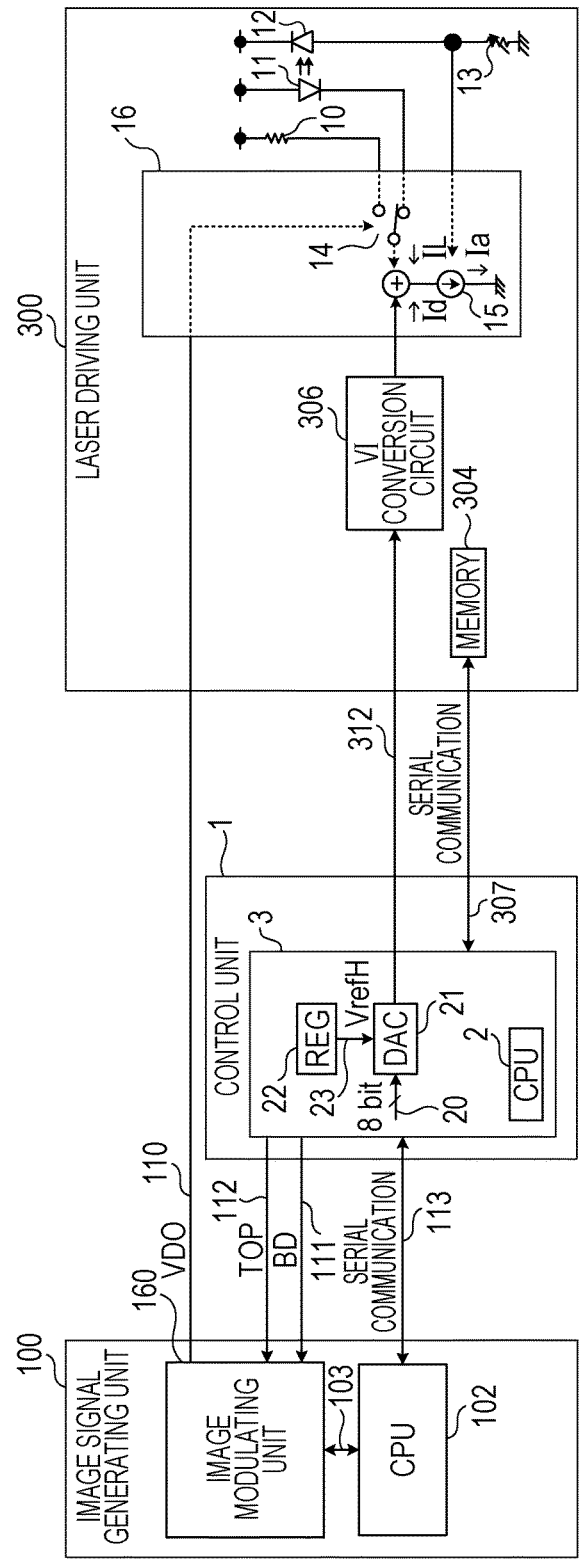
FIG. 20 is an electric block diagram illustrating an exposure control configuration.

FIGS. 19A and 19B are diagrams illustrating optical waveforms and main scanning LSF profiles. These optical waveforms and main scanning LSF profiles are obtained in a case where the light source 401 emits light with a certain brightness for a certain period at the on-axis image height, the intermediate image height, and the most off-axis image height. FIG. 19A illustrates a main scanning LSF profile in a case where the partial magnification correction and brightness correction according to the first exemplary embodiment are performed, and FIG. 19B illustrates a main scanning LSF profile in a case where correction according to this exemplary embodiment is performed. T3 represents a period that is necessary for main-scanning one pixel (42.3 μm) at the on-axis image height. FIG. 19A illustrates a case where the emission period of laser is T3 and the brightness is P3 at the on-axis image height, and the emission period for an amount of emitted laser light 170 is 0.74 times T3 and the emission brightness is 1.35 times P3 at the most off-axis image height. FIG. 19B illustrates a case where correction is performed through the processing described below so that the emission period is 0.22 times T3 and the emission brightness is 4.5 times P3 at the most off-axis image height. As a result of performing correction in this manner in this exemplary embodiment, the main scanning LSF profiles of laser scanning for one dot can be made more similar to each other between the on-axis image height and the most off-axis image height.

In this exemplary embodiment, even if an emission period is corrected, the interval between dots of adjacent pixels needs to be maintained in a state equivalent to a state where the partial magnification correction according to the first exemplary embodiment is performed. Thus, in this exemplary embodiment, the period corresponding to one dot (pixel) is 0.74*T3 at the most off-axis image height, and 0.87*T3 at the intermediate image height.

Therefore, in this exemplary embodiment, emission period correction is performed by using the halftone processing unit 122 serving as a screen processing unit, with the partial magnification correction according to the first exemplary embodiment being performed. In addition, a correction constant for the brightness correction described above in the first exemplary embodiment is set to a value in consideration of emission period correction.

Emission Period Correction

Figure 21:
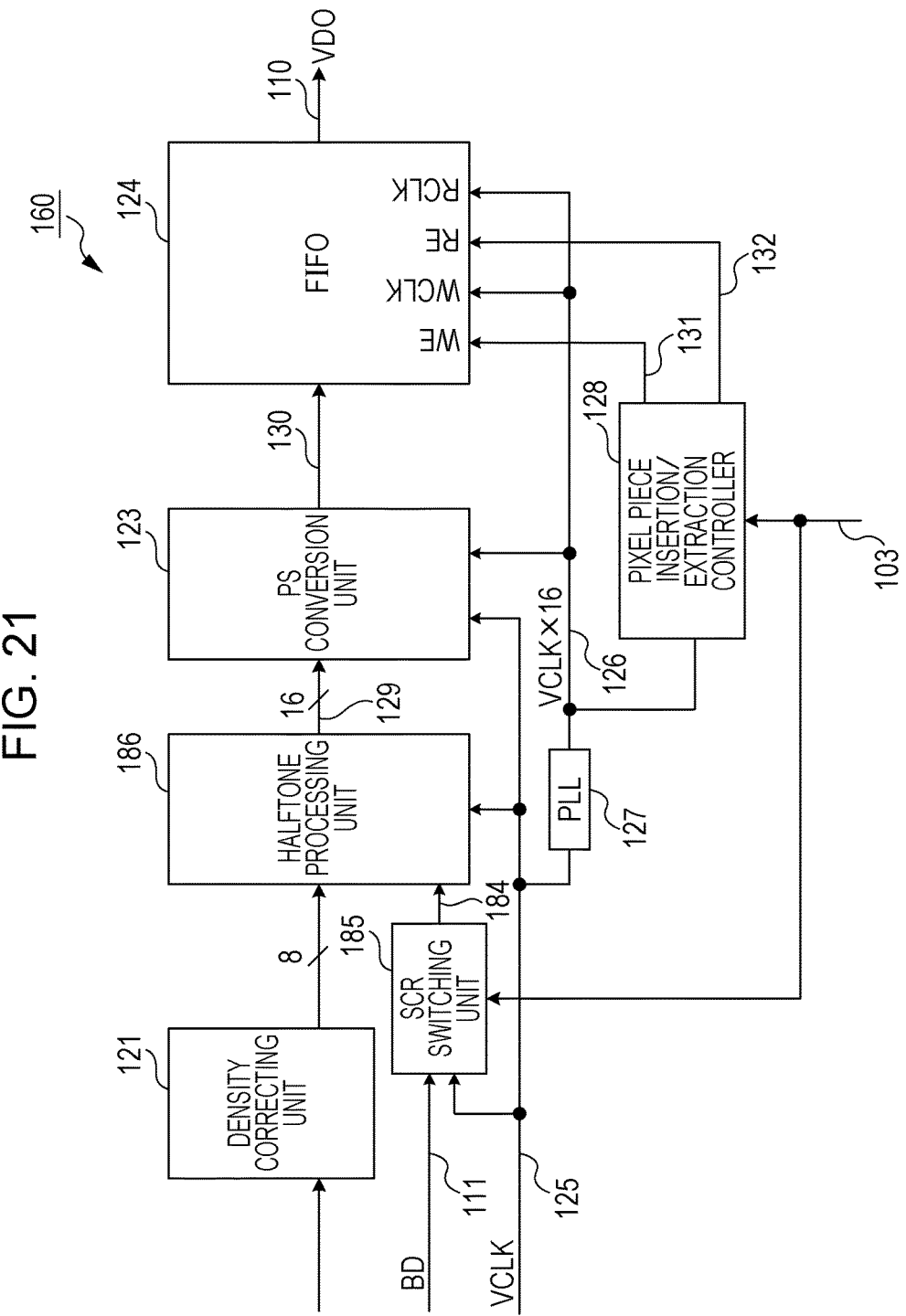
FIG. 21 is a block diagram illustrating an image modulating unit.

Emission period correction is performed by a halftone processing unit 186 of the image modulating unit 160 illustrated in FIG. 21. The halftone processing unit 186 stores screens corresponding to individual image heights, selects a screen on the basis of information output from a screen (SCR) switching unit 185, and performs halftone processing. The SCR switching unit 185 generates screen switching information 184 by using the BD signal 111 serving as a synchronization signal and the image clock signal 125. FIG. 22A is a diagram illustrating screens corresponding to individual image heights. The SCR switching unit 185 outputs the screen switching information 184 in accordance with an image height in the main scanning direction, as illustrated in FIG. 22A. The screen switching information 184 is a first screen SCR1 at the most off-axis image height, and is an n-th screen SCRn at the on-axis image height. The halftone processing unit 186 and the SCR switching unit 185 function as an emission period correcting unit.

Figure 22B:
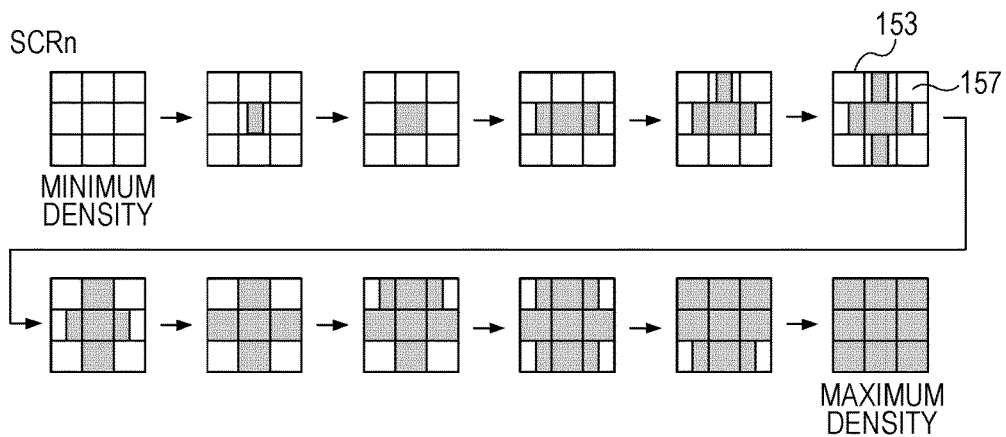
FIG. 22B is a diagram illustrating an example of a screen used at the vicinity of on-axis image height.
Figure 22C:
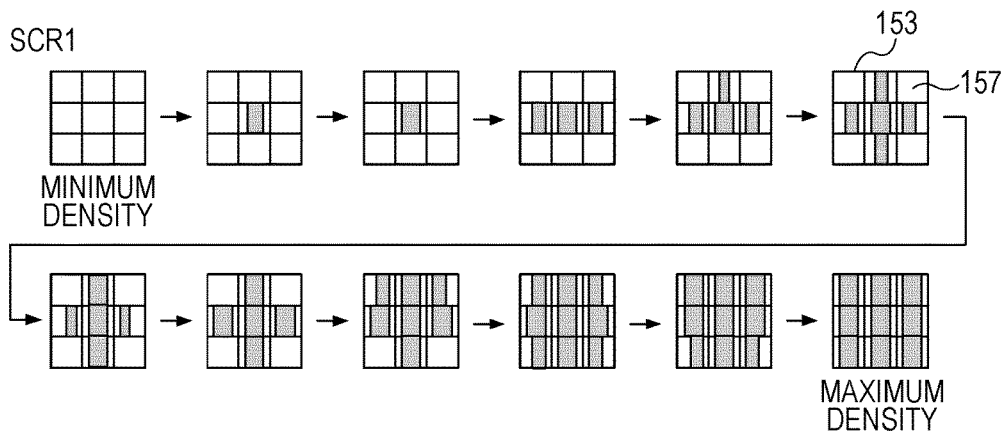
FIG. 22C is a diagram illustrating an example of a screen used at the vicinity of most off-axis image height.

FIG. 22B illustrates an example of the n-th screen that is used near the on-axis image height, and FIG. 22C illustrates an example of the first screen that is used near the most off-axis image height. Each of the screens is constituted by a matrix formed of two hundred lines, the gradation of each pixel can be expressed by sixteen pixel pieces that are obtained by dividing the pixel, and the area of the screen constituted by nine pixels grows in accordance with density information represented by 8-bit multivalued parallel data of the VDO signal 110. The matrix 153 is provided for each gradation level, and the gradation level increases (the density increases) in the order indicated by arrows. As illustrated in FIG. 22C, the first screen is set so that not all the sixteen pixel pieces are illuminated even in the matrix of the highest gradation level (maximum density).

As an example, a description will be given of a case where the maximum emission period at the most off-axis image height is set to 0.22*T3, with T3 at the on-axis image height being a reference. With partial magnification correction being performed, the emission period corresponding to one dot (pixel) is limited to 0.74*T3. Thus, to further limit the maximum emission period to 0.22*T3, a setting may be made so that light is emitted within pixel pieces corresponding to 0.22/0.74 among sixteen pixel pieces in one pixel, as expressed by the following equation.

$$16*(0.22/0.74)=4.75 \text{(pixel pieces)}$$

That is, up to about five pixel pieces may be illuminated in the screen.

Brightness Correction

Brightness correction can be performed by changing a correction constant. That is, the reference voltage 23 to be input to the DA converter 21 illustrated in the electric block diagram in FIG. 5 according to the first exemplary embodiment may be changed, and thus the description thereof is omitted. FIG. 23 is a timing chart of the processing according to this exemplary embodiment. An amount of correction at the off-axis image height for a brightness correction analog voltage 330, a VI conversion output current Id 331, and an amount of emitted laser light 332 is larger than in the first exemplary embodiment. The brightness at the on-axis image height is equivalent to that in the first exemplary embodiment, but the brightness at the most off-axis image height is 4.5 times in this exemplary embodiment, though it is 1.35 times in the first exemplary embodiment. That is, in a case where the brightness at the on-axis image height is P3 and the brightness at the most off-axis image height is P3', $$(P3'/P3)>(100+C)/100$$

is satisfied (C represents the rate of change in scanning velocity).

With the waveform of the amount of emitted laser light 332, in a case where the brightness P3' of 4.5 times at the most off-axis image height is regarded as a reference, the brightness P3 at the on-axis image height is 0.22 times the brightness P3' (100%/450%).

In the above-described third exemplary embodiment, the emission period and emission brightness of the light source 401 are corrected through partial magnification correction, emission period correction, and brightness correction. However, the following condition is necessary to make the density of an image constant in the main scanning direction. That is, as indicated by the optical waveforms illustrated in FIGS. 19A and 19B, the value obtained by integrating an emission brightness with an emission period is the same or substantially the same at the on-axis image height, intermediate image height, and most off-axis image height. In this exemplary embodiment, the integrals at the individual image heights are as follows. On-axis image height: T3*P3, intermediate image height: (0.50*T3)*(2.00*P3)=1.00*T3*P3, and most off-axis image height: (0.22*T3)*(4.50*P3) =0.99*T3*P3.

In this exemplary embodiment, the emission period of the light source 401 is shortened and the brightness thereof is increased compared to the first exemplary embodiment so that the main scanning LSF profiles of one dot match each other. Alternatively, in consideration of the responsivity of a developing system including the sensitivity of the photosensitive drum 4, a correction amount between the amount according to the first exemplary embodiment and the amount according to the third exemplary embodiment may be used. Further, the correction amount may be changed in accordance with the type of an image to be printed. For example, in the case of an ordinary image, partial magnification correction and brightness correction may be performed as in the first exemplary embodiment. In the case of an image using many thin lines, partial magnification correction, emission period correction, and brightness correction may be performed as in the third exemplary embodiment.

As described above, according to this exemplary embodiment, partial magnification correction and brightness correction are performed, and thus exposure can be performed while suppressing the occurrence of image failure without using a scanning lens having an fθ characteristic.

Further, according to this exemplary embodiment, emission period correction is performed in which the ratio of an emission period among periods assigned to individual pixels that have undergone partial magnification correction is decreased from the on-axis image height to the most off-axis image height. In accordance with the decrease in the emission period, emission brightness is increased by performing brightness correction. Accordingly, even a thin-line image constituted by vertical lines having a width of one dot can be printed with good image quality.

Fourth Exemplary Embodiment

In a fourth exemplary embodiment, a description will be given of a configuration for performing density correction instead of the brightness correction according to the first exemplary embodiment. The other parts, such as partial magnification correction, is the same as in the first exemplary embodiment. Thus, the same parts as those in the first exemplary embodiment are denoted by the same reference numerals, and the description thereof is omitted.

Exposure Control Configuration

Figure 24:
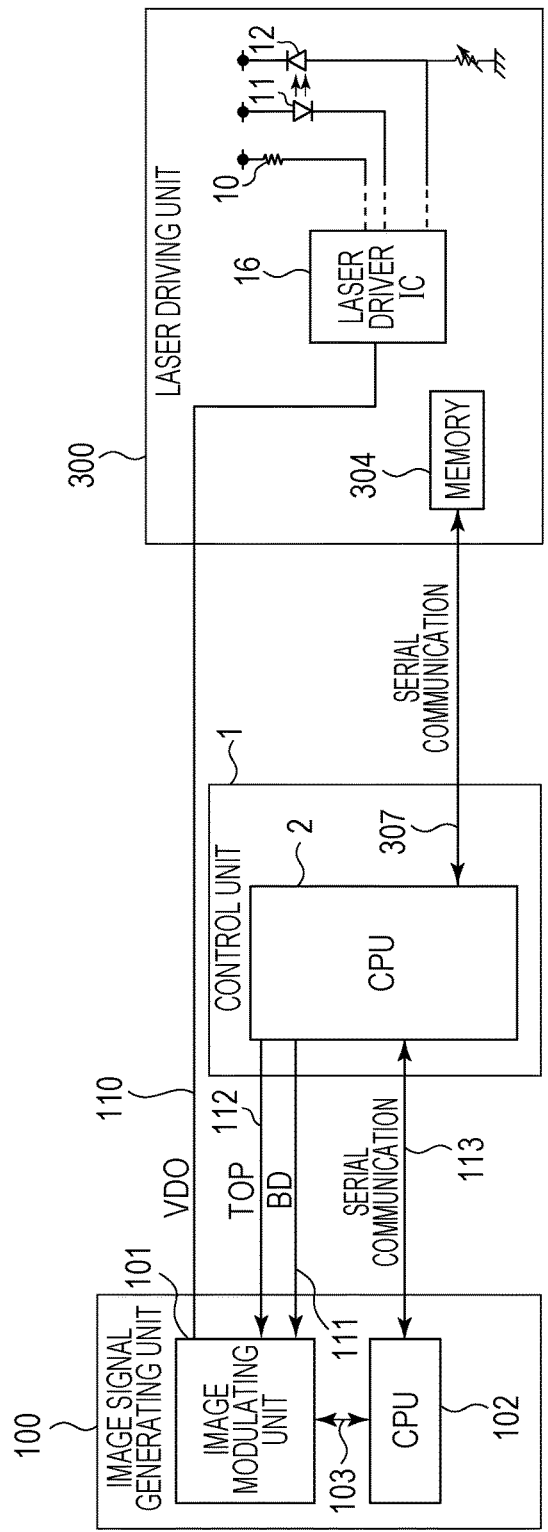
FIG. 24 is an electric block diagram illustrating an exposure control configuration.

FIG. 24 is an electric block diagram illustrating an exposure control configuration in the image-forming apparatus 9. The image signal generating unit 100 receives print information from the host computer (not illustrated) and generates the VDO signal 110 corresponding to image data (image signal). Also, the image signal generating unit 100 has a function of a pixel width correcting unit and a function as a density correcting unit for correcting image density. The control unit 1 controls the image-forming apparatus 9. The laser driving unit 300 includes the memory 304, the laser driver IC 16, and the light emitter 11 of the light source 401. The laser driver IC 16 switches, in accordance with the VDO signal 110, whether to supply the current IL to the light emitter 11 to cause the light emitter 11 to emit light or to supply a dummy resistance 10 to the light emitter 11 to turn off the light emitter 11, so as to control ON/OFF of light emission of the light source 401 on the basis of the VDO signal 110. The photodetector 12 detects the amount of light emitted by the light emitter 11.

After an image signal for forming an image has been prepared to be output, the image signal generating unit 100 instructs the control unit 1 to start printing through serial communication 113. The control unit 1 includes the CPU core 2. When preparation for printing is completed, the CPU core 2 transmits the TOP signal 112 serving as a sub-scanning synchronization signal and the BD signal 111 serving as a main scanning synchronization signal to the image signal generating unit 100. In response to receipt of the synchronization signals, the image signal generating unit 100 outputs the VDO signal 110 serving as an image signal to the laser driving unit 300 at a certain timing.

Partial Magnification Correction Method

Next, partial magnification correction will be described.

Figure 26:
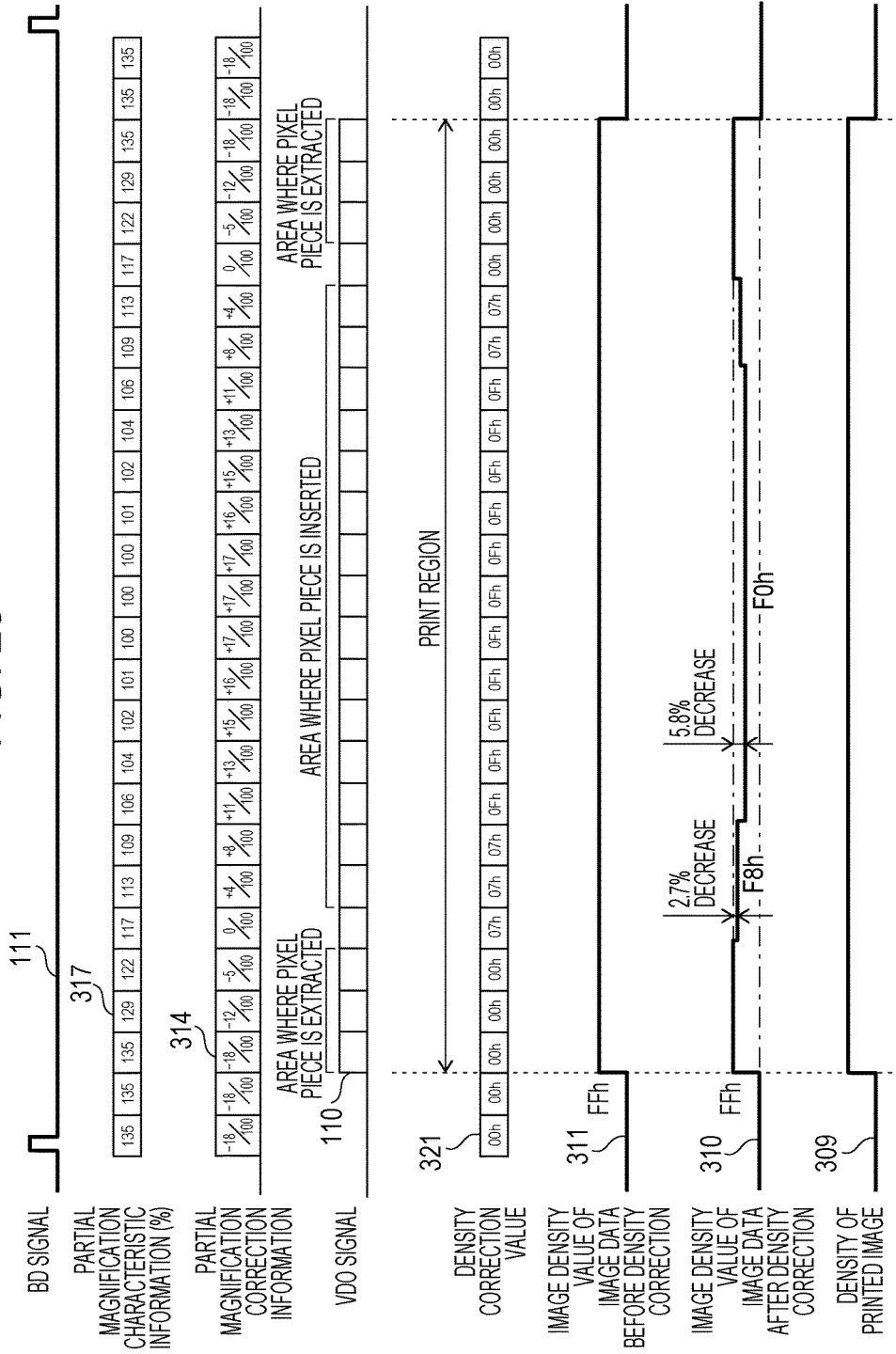
FIG. 26 is a timing chart for describing partial magnification correction and brightness correction.

FIG. 26 is a timing chart illustrating an example of the above-described partial magnification correction. The memory 304 illustrated in FIG. 24 stores the partial magnification characteristic information 317 about the optical scanning device 400. The partial magnification characteristic information may be measured and stored for each device after the optical scanning device 400 has been assembled. In a case where there is a small variation among the individual devices, a representative characteristic may be stored without measurement of information for the individual devices. The CPU core 2 reads the partial magnification characteristic information 317 from the memory 304 through serial communication 307, and transmits it to the CPU 102 in the image signal generating unit 100. On the basis of the information, the CPU core 2 generates the partial magnification correction information 314, and transmits it to the pixel piece insertion/extraction controller 128 in the image modulating unit 101 illustrated in FIG. 24. Partial magnification correction is the same as in the first exemplary embodiment. FIG. 26 illustrates an example in which the rate of change in scanning velocity C is 35% and thus partial magnification of 35% is generated at the most off-axis image height when the on-axis image height is a reference. In this example, the partial magnification correction information 314 indicates that the point of 17% corresponds to zero magnification correction, the most off-axis image height corresponds to −18% (−18/100), and the on-axis image height corresponds to +17% (+17/100). Thus, as illustrated in FIG. 26, in the main scanning direction, pixel pieces are extracted to decrease an image length near the end portion where the absolute value of the image height is large, and pixel pieces are inserted to increase an image length near the center portion where the absolute value of the image height is small. As described above with reference to FIGS. 11A and 11B, to perform correction of −18% at the most off-axis image height, eighteen pixel pieces are extracted from one hundred pixel pieces. To perform correction of +17% at the on-axis image height, seventeen pixel pieces are inserted into one hundred pixel pieces.

Accordingly, when the vicinity of the on-axis image height (center portion) is regarded as a reference, the state near the most off-axis image height (end portion) is substantially the same as a state where thirty-five pixel pieces are extracted from one hundred pixel pieces, and accordingly partial magnification of 35% can be corrected. That is, the time period over which the spot of the laser light 208 is moved a distance corresponding to the width of one pixel (42.3 µm (600 dpi)) on the scanned surface 407 at the most off-axis image height is 0.74 times that at the on-axis image height.

The ratio of a scanning period for the width of one pixel at the most off-axis image height relative to the on-axis image height can be expressed by the following expression by using the rate of change in scanning velocity C.

$$100\,[\%]/(100\,[\%] + C\,[\%]) = 100\,[\%]/(100\,[\%] + 35\,[\%])$$

$$= 0.74$$

With the insertion or extraction of pixel pieces having a width smaller than that of one pixel, the pixel width (pixel interval) can be corrected, and latent images corresponding to individual pixels can be formed with a substantially uniform interval in the main scanning direction. That is, if a pixel piece is extracted, a pixel interval decreases and an emission interval of laser light decreases. If a pixel piece is inserted, a pixel interval increases and an emission interval of laser light increases. Thus, more pixel pieces are extracted as the scanning velocity increases, and/or more pixel pieces are inserted as the scanning velocity decreases, and accordingly the emission timing of laser light can be corrected so that latent image dots of laser light can be formed with a substantially uniform interval in the main scanning direction. Accordingly, partial magnification can be corrected. In this way, the pixel piece insertion/extraction controller 128 functions as an emission timing correcting unit that corrects an emission timing.

Alternatively, the on-axis image height may be regarded as a reference, neither insertion nor extraction of a pixel piece may be performed near the on-axis image height, and the rate of extracting pixel pieces may be increased as the image height approaches the most off-axis image height. Conversely, the most off-axis image height may be regarded as a reference, neither insertion nor extraction of a pixel piece may be performed near the most off-axis image height, and the rate of inserting pixel pieces may be increased as the image height approaches the on-axis image height. Note that higher image quality can be obtained by inserting or extracting pixel pieces so that the pixel at the intermediate image height between the on-axis image height and the most off-axis image height has a reference pixel width (the width corresponding to sixteen pixel pieces). That is, as a result of decreasing the absolute value of an amount of change in the width of a pixel to/from which a pixel piece is inserted/extracted with respect to a reference width of a pixel to/from which a pixel piece is not inserted/extracted, an image that is more faithful to original image data can be obtained in terms of image density in the main scanning direction, and accordingly good image quality can be obtained.

Density Correction

Next, a description will be given of density correction processing for correcting, with image processing, variation of density caused by an integrated amount of light that is decreased by shortening an irradiation period of a light source from the on-axis image height to the most off-axis image height through partial magnification correction. With the density correction processing, the density of an image is corrected so that the density becomes uniform from the on-axis image height to the off-image image height in the main scanning direction.

Figure 27:
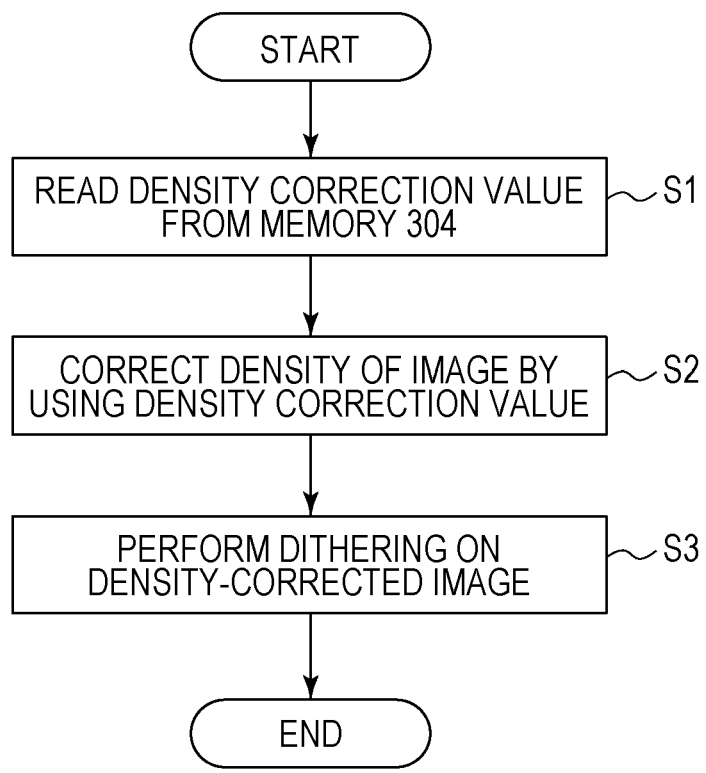
FIG. 27 is a flowchart of density correction processing.

First, the overview of the density correction processing will be described with reference to FIGS. 24, 27, and 28. FIG. 27 is a flowchart illustrating density correction processing according to the fourth exemplary embodiment. The density correction processing is performed by the image modulating unit 101. First, a density correction value stored in the memory 304 (see FIG. 24) is read (step S1). The density correction value stored in the memory 304 may be measured and stored in each device. Alternatively, a representative characteristic may be stored at the time of manufacturing without individually measuring values. The density correction value stored in the memory 304 is transmitted to the control unit 1 through serial communication 307, is further transmitted to the image modulating unit 101 of the image signal generating unit 100 through serial communication 113, and is stored in the density correcting unit 121 (see FIG. 7).

Subsequently, the density correcting unit 121 performs density correction processing on image data by using the stored density correction value (step S2). The density correcting unit 121 is an emission ratio correcting unit that corrects image density of a printed image by correcting the emission ratio of laser light emitted by the light source 401. The density correcting unit 121 reads the density correction value in synchronization with the BD signal 111, and performs correction to decrease an image gradation value from the off-axis image height to the on-axis image height so as to prevent a decrease in image density caused by a decrease in the total amount of exposure per unit length from the on-axis image height to the off-axis image height due to a decrease in the amount of exposure. With such density correction, the image density is made uniform at the on-axis image height and the off-axis image height. In this exemplary embodiment, image density is a value for each pixel that is obtained by measuring the toner density of a printed image.

The image data on which density correction processing has been performed is transmitted to the halftone processing unit 122 (see FIG. 7), and halftone processing is performed in the manner described above with reference to FIGS. 10A to 10C and so forth (step S3).

Description of Specific Example of Density Correction Processing

Next, a description will be given of a specific example of density correction performed in the density correction processing. FIG. 26 is a timing chart illustrating an example of the above-described density correction. A density correction value 321 is a value read from the memory 304. The density correction value 321 varies according to an image height, and is thus not constant in a print region. In this exemplary embodiment, a reference image density is the image density at the most off-axis image height. In a case where density correction is not performed, the image density increases from the most off-axis image height to the on-axis image height. Thus, the processing of decreasing image density from the most off-axis image height to the on-axis image height, so as to uniform the image density in the main scanning direction. In this exemplary embodiment, the density correction value 321 corresponds to a range of reduction (value) in density. Thus, the processing of gradually decreasing the density from the most off-axis image height to the on-axis image height is performed, and thus the density correction value gradually increases from the most off-axis image height to the on-axis image height. Changing of density is changing of a screen as illustrated in FIG. 8A, and is synonymous with changing of the emission ratio of laser light emitted by the light source 401.

The density correction value 321 is a value indicating the number of levels of density to be decreased from the image density value of 256 levels of gradation of image data. Thus, the density correction value 321 can be expressed by a hexadecimal number, like the density levels of image data. In this exemplary embodiment, a print region is divided into three regions in the main scanning direction, and the density correction value 321 is assigned to each region. The three regions include a region near the most off-axis image height, a region near the on-axis image height, and an intermediate image height region between the region near the most off-axis image height and the region near the on-axis image height. The region near the most off-axis image height is a region where the density is not changed, a density correction value "00h" is assigned thereto, and the amount of correction for decreasing density corresponds to zero levels of gradation. In the intermediate image height region, a density correction value "07h" is assigned to decrease the image density by 2.7%, and the density is corrected so as to be decreased by seven levels of gradation. In the region near the on-axis image height, a density correction value "0Fh" is assigned to decrease the image density by 5.8%, and the density is corrected so as to be decreased by sixteen levels of gradation. These density correction values are based on $$(07h \div FFh) \times 100 = (7 \div 255) \times 100 \approx 2.7\% \text{ and}$$
$$(0Fh \div FFh) \times 100 = (15 \div 255) \times 100 \approx 5.8\%.$$

In a case where the scanning velocity at the most off-axis image height is 135% of that at the on-axis image height, it does not simply mean that the image density at the on-axis image height when density correction is not performed is 135% of that at the most off-axis image height. This is because, due to the exposure sensitivity characteristic of the photosensitive drum 4 and the development characteristic of toner, the total amount of exposure per unit area of the photosensitive drum 4 and the toner density of the image that is finally formed do not have a linear relationship. In consideration of this, the density correction value 321 is set in the above-described manner.

In FIG. 26, an image density value before density correction 311 is performed is an image density value input to the density correcting unit 121 (see FIG. 7). An image density value in image data is a value corresponding to the density of a toner image formed on the photosensitive drum 4. FIG. 26 illustrates a case where the image density value input to the density correcting unit 121 is at the highest level "FFh" in all the regions (image heights) of the print region. The density correcting unit 121 performs density correction processing by using the density correction value 321 and the image density value 311. That is, in the region where the density correction value 321 is "07h", a value "F8h" obtained by subtracting the density correction value "07h"

from the image density value "FFh" is an image density value after density correction 310. In the region where the density correction value 321 is "0Fh", a value "F0h" obtained by subtracting the density correction value "0Fh" from the image density value "FFh" is the image density value after density correction 310. In this way, with the density correction value being gradually increased from the most off-axis image height to the on-axis image height, the density can be gradually decreased. In other words, the density correcting unit 121 performs correction so that the density of the image decreases as the scanning velocity decreases.

Figure 25A:
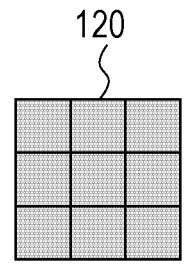
FIGS. 25A to 25C are diagrams illustrating an example of a screen on which halftone processing has been performed after density correction processing.
Figure 25B:
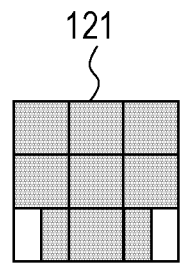
Figure 25C:
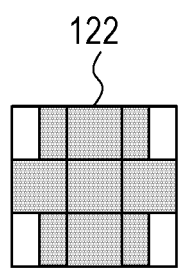

Next, a description will be given of a screen on which density correction is performed and then screen (dithering) processing is performed by the halftone processing unit 122. FIGS. 25A to 25C illustrate an example of a screen on which density correction processing is performed and then halftone processing is performed. Each screen is a matrix constituted by three pixels in the main scanning direction and three pixels in the sub-scanning direction and including two hundred lines. In a screen 120, the area ratio of a portion illuminated by the light source 401 (black portion) to the entire area is 100%. The area ratio is 93% in a screen 121, and the area ratio is 85% in a screen 122. The area ratio is a light emission ratio in the screen. Thus, after halftone processing has been performed, the screen 120 is assigned to the region where the image density value after density correction 310 is "FFh", the screen 121 is assigned to the region where the image density value after density correction 310 is "F8h", and the screen 122 is assigned to the region where the image density value after density correction 310 is "F0h".

As illustrated in FIG. 7, after halftone processing has been performed, PS conversion is performed by the PS conversion unit 123, the processing is performed by the FIFO 124, the VDO signal 110 is output to the laser driving unit 300, and the light source 401 emits light.

As a result of performing such density correction processing, an appropriate image density can be obtained. In particular, in a case where the image density value of image data is constant in the main scanning direction, the image density can be made constant in the main scanning direction as indicated by density of a printed image 309 in FIG. 26. The density correcting unit 121 functions as an emission ratio correcting unit that corrects the emission ratio of laser light emitted by the light source 401. The density correcting unit 121 performs correction so that the density of an image decreases as the scanning velocity decreases. Alternatively, the density correcting unit 121 may perform correction so that the density of an image increases as the scanning velocity increases. Further, the density correcting unit 121 may perform correction so that the density of an image increases as the scanning velocity increases while performing correction so that the density of an image decreases as the scanning velocity decreases.

As described above, according to the fourth exemplary embodiment, partial magnification correction and density correction for correcting image density of image data are performed, and accordingly exposure can be performed while suppressing the occurrence of image failure without using a scanning lens having an fθ characteristic.

In the fourth exemplary embodiment, partial magnification correction is performed by inserting or extracting pixel pieces. Alternatively, partial magnification correction may be performed by correcting the emission timing of laser light by changing a clock frequency in the main scanning direction, as disclosed in Japanese Patent Laid-Open No. 58-125064. However, in the case of correcting partial magnification by inserting or extracting pixel pieces, the following effect can be obtained compared to the method of changing a clock frequency in the main scanning direction disclosed in Japanese Patent Laid-Open No. 58-125064. That is, in the configuration disclosed in Japanese Patent Laid-Open No. 58-125064, a clock frequency is changed in the main scanning direction, and thus a clock generating unit capable of outputting clock signals of a plurality of different frequencies is necessary, which causes an increase in cost. However, in this exemplary embodiment, partial magnification correction can be performed only by providing one clock generating unit, and thus the cost for a clock generating unit can be reduced.

Fifth Exemplary Embodiment

Next, a fifth exemplary embodiment will be described. The fifth exemplary embodiment is different from the fourth exemplary embodiment in the density correction method, but is the same as the fourth exemplary embodiment regarding the partial magnification correction and so forth. Thus, the same parts as those in the fourth exemplary embodiment are denoted by the same reference numerals, and the description thereof is omitted.

In the fifth exemplary embodiment, unlike in the fourth exemplary embodiment, the image density value of image data is not corrected, but the density of an image is corrected by performing forced OFF processing, in which the light source 401 is forcibly turned off with high resolution in units of pixel pieces each having a width smaller than the width of one pixel.

Figure 28:
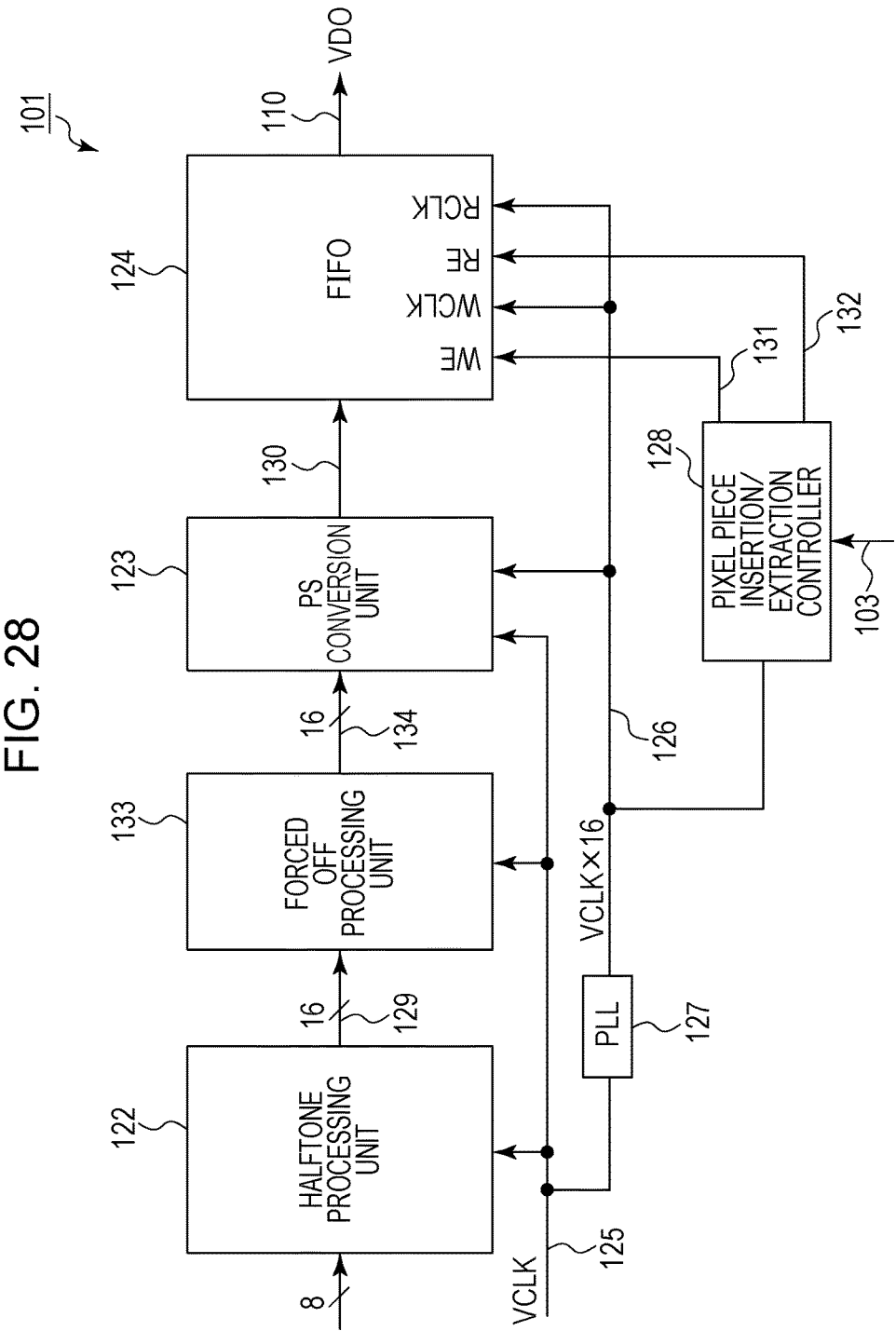
FIG. 28 is a block diagram illustrating an image modulating unit.

FIG. 28 is a block diagram illustrating an example of the image modulating unit 101 according to the fifth exemplary embodiment. In this exemplary embodiment, a forced OFF processing unit 133 is provided between the halftone processing unit 122 and the PS conversion unit 123. The forced OFF processing unit 133 performs processing of forcibly turning OFF the light source 401. The forced OFF processing unit 133 corresponds to a correcting unit that substantially corrects the image density of a printed image.

Figure 31:
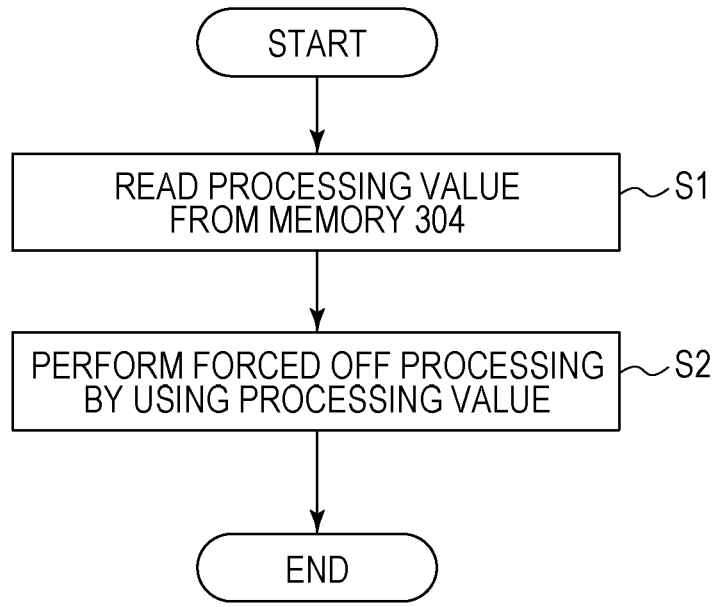
FIG. 31 is a flowchart of forced OFF processing.

Next, the forced OFF processing performed by the forced OFF processing unit 133 will be described with reference to the flowchart in FIG. 31. First, in step S1, a processing value for forced OFF processing is read from the memory 304, as in the case of the density correction value according to the fourth exemplary embodiment. The read processing value is stored in the forced OFF processing unit 133.

Subsequently, in step S2, the forced OFF processing unit 133 performs forced OFF processing in units of one-sixteenth of a pixel on the basis of the processing value. As illustrated in FIG. 8B, one pixel is constituted by sixteen pixel pieces formed by dividing one dot of 600 dpi into sixteen pieces. The above-described processing value is a value corresponding to the number of pixel pieces for which the light source 401 is forcibly turned off. The forced OFF processing is processing of forcibly turning off the sixteen pixel pieces, which are obtained by dividing one pixel into sixteen pieces in the main scanning direction, at a certain rate (frequency) in the main scanning direction.

Figure 30A:
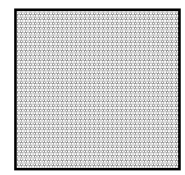
FIGS. 30A to 30C are diagrams illustrating an example of emission data of one pixel in a case where forced OFF processing has been performed.
Figure 30B:
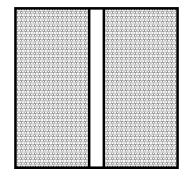
Figure 30C:
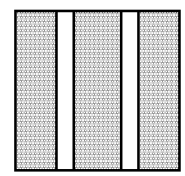

Each of FIGS. 30A to 30C is a diagram illustrating emission data of one pixel on which forced OFF processing has been performed in a case where the image density value of image data before forced OFF processing is FFh. FIG. 30A illustrates emission data of one pixel in a case where the number of pixel pieces as a target of forced OFF processing is zero. FIG. 30B illustrates emission data of one pixel in a case where the number of pixel pieces as a target of forced OFF processing is one. FIG. 30C illustrates emission data of one pixel in a case where the number of pixel pieces as a target of forced OFF processing is two. That is, if forced OFF processing is performed in a case where the image density value of image data before forced OFF processing is FFh, the emission data of one pixel illustrated in FIG. 30A is obtained in a case where the processing value is zero, the emission data of one pixel illustrated in FIG. 30B is obtained in a case where the processing value is one, and the emission data of one pixel illustrated in FIG. 30C is obtained in a case where the processing value is two. In this exemplary embodiment, the processing value of forced OFF processing is set so that the number of pixel pieces as a target of forced OFF processing increases from the most off-axis image height to the on-axis image height (from the end portion to the center portion of the print region).

After forced OFF processing has been performed by the forced OFF processing unit 133, a 16-bit parallel signal 134 is output to the PS conversion unit 123. After that, the same processing as in the fourth exemplary embodiment is performed.

FIG. 29 is a timing chart illustrating a case where partial magnification correction and forced OFF processing are performed. Here, an image density value 162 of image data is FFh. The number of pixel pieces in one pixel to be forcibly turned off by the forced OFF processing unit 133 is illustrated as a processing value 163. A density of a printed image 164 is an image density that is obtained by performing the above-described partial magnification correction and forced OFF processing, and is an image density obtained by measuring the image density after printing.

With the processing value 163 being set so as to be increased from the most off-axis image height to the on-axis image height (from the end portion to the center portion of the print region), the forced OFF processing unit 133 corrects emission data so that the density of an image decreases as the scanning velocity decreases. Accordingly, the image can be printed by substantially decreasing the image density, and finally an appropriate image density can be obtained from the most off-axis image height to the on-axis image height. In particular, in a case where the image density value of the image data is constant in the main scanning direction, the image density can be made constant in the main scanning direction, as can be seen in the density of the printed image 164 after correction illustrated in FIG. 29.

The pixel piece for which forced OFF processing is performed may be any pixel piece of one pixel. In a case where the processing value for forced OFF processing is 2 or more and a plurality of pixel pieces in one pixel are to be forcibly turned off, a more uniform image density can be obtained by disposing, between pixel pieces subjected to forced OFF processing, at least one pixel piece not subjected to forced OFF processing. The processing value for forced OFF processing may be a value smaller than 1. For example, in a case where the processing value is 0.5, one pixel piece in two pixels contiguous in the main scanning direction is forcibly turned off.

As described above, according to the fifth exemplary embodiment, partial magnification correction and forced OFF processing are performed, and thereby exposure can be performed while suppressing the occurrence of image failure without using a scanning lens having an fθ characteristic.

Sixth Exemplary Embodiment

In a sixth exemplary embodiment, both of the density correction processing according to the fourth exemplary embodiment and the forced OFF processing according to the fifth exemplary embodiment are performed to decrease image density from off-axis to on-axis so as to optimize the image density, in a situation where the image density is decreased from on-axis to off-axis due to a decrease in the amount of exposure. The same parts as those in the fourth and fifth exemplary embodiments are denoted by the same reference numerals, and the description thereof is omitted.

Using both of the density correction processing and the forced OFF processing as in this exemplary embodiment is appropriate in a case where only one of the density correction processing and the forced OFF processing is insufficient to cope with change in density caused by change in scanning velocity due to a high rate of change in scanning velocity or other reasons.

Figure 32:
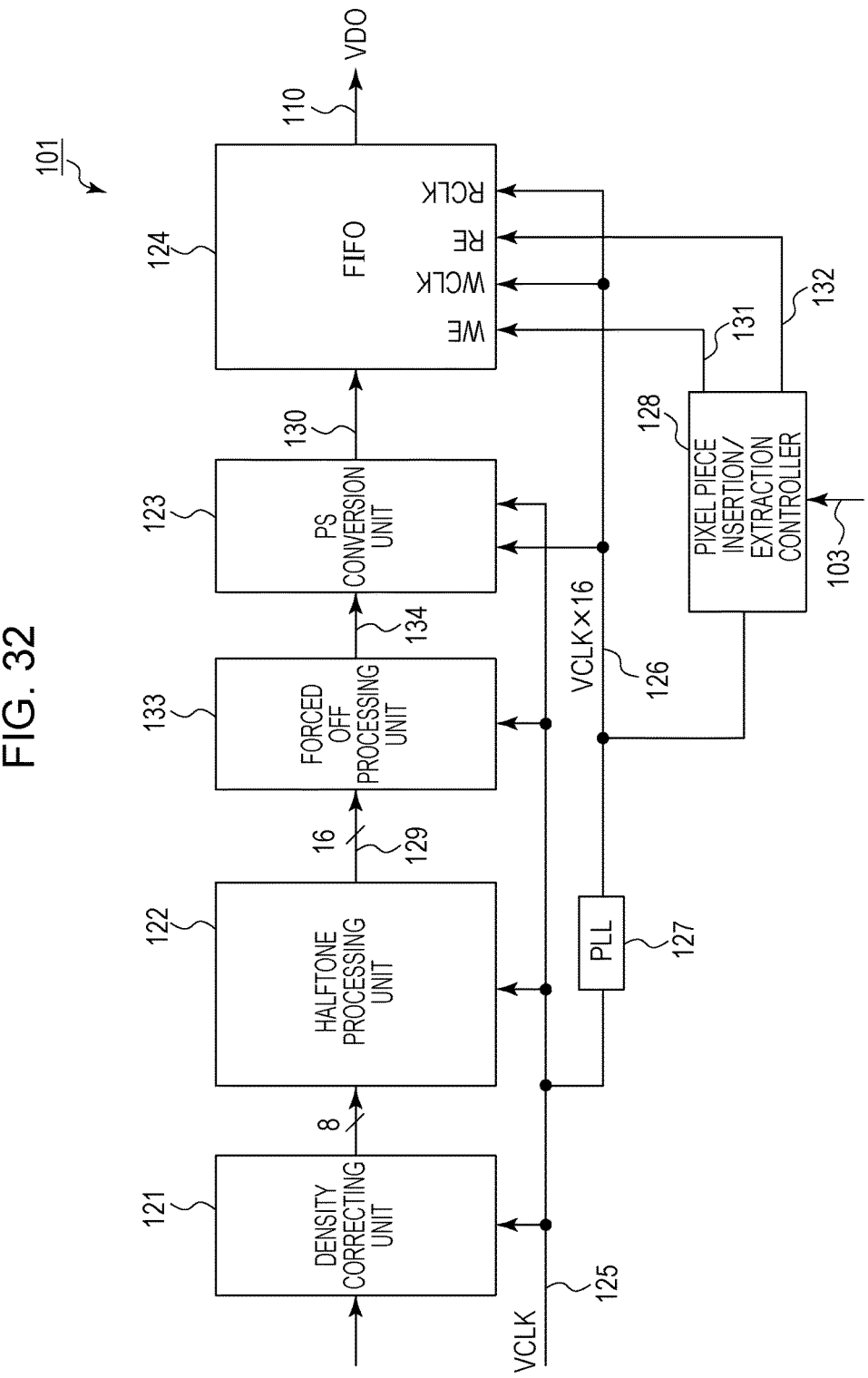
FIG. 32 is a block diagram illustrating an image modulating unit.

FIG. 32 is a block a block diagram illustrating an example of the image modulating unit 101 according to the sixth exemplary embodiment. In the sixth exemplary embodiment, the forced OFF processing unit 133 for forcibly turning OFF the light source 401 is provided between the halftone processing unit 122 and the PS conversion unit 123.

Figure 35:
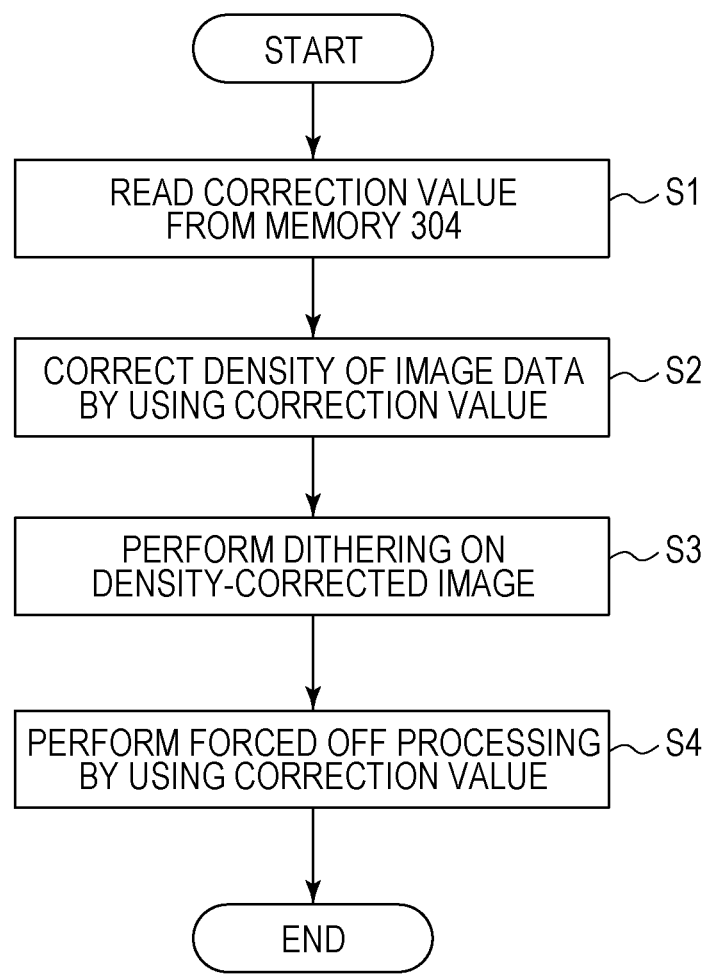
FIG. 35 is a flowchart of density correction processing and forced OFF processing.

Next, a description will be given of density correction performed by the density correcting unit 121 and forced OFF processing performed by the forced OFF processing unit 133 with reference to the flowchart illustrated in FIG. 35. First, in step S1, a correction value is read from the memory 304. The correction value is 16-bit data. The upper 8 bits of the correction value correspond to the density correction value according to the fourth exemplary embodiment used by the density correcting unit 121, and are stored in in the density correcting unit 121. On the other hand, the lower 8 bits correspond to the processing value according to the fifth exemplary embodiment used by the forced OFF processing unit 133, and are stored in the forced OFF processing unit 133.

In step S2, the same density correction processing as in the fourth exemplary embodiment is performed by using the stored upper 8 bits of the correction value. For example, in a case where the upper 8 bits of the correction value correspond to 07h, the image density value is corrected through density correction processing from FFh to F8h (=FFh–07h). In a case where the upper 8 bits of the correction value correspond to 0Fh, the image density value is corrected through density correction processing from FFh to F8h (=FFh–0Fh).

In step S3, halftone processing is performed by the same halftone processing unit 122 as that in the fourth exemplary embodiment.

In step S4, forced OFF processing is performed by the same forced OFF processing unit 133 as that in the fifth exemplary embodiment. The lower 8 bits of the correction value correspond to the number of pixel pieces for which forced OFF processing is performed by the forced OFF processing unit 133. Thus, in a case where the lower 8 bits of the correction value correspond to 01h, one pixel piece having a 1/16 width of each pixel is forcibly turned off in each pixel. In a case where the lower 8 bits of the correction value correspond to 02h, two pixel pieces in each pixel are forcibly turned off.

Figure 34A:
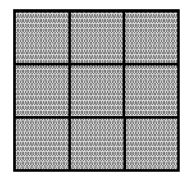
FIGS. 34A to 34C are diagrams illustrating an example of a screen on which halftone processing has been performed after density correction processing and forced OFF processing in a case where an image density value of image data is FFh.
Figure 34B:
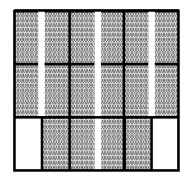
Figure 34C:
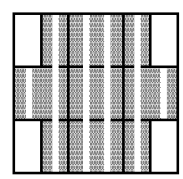

Each of FIGS. 34A to 34C is a diagram illustrating a screen (corresponding to emission data of a plurality of pixels) on which halftone processing is performed after density correction processing and forced OFF processing have been performed in a case where the image density value of image data before forced OFF processing is FFh. FIG. 34A illustrates a case where density correction processing and forced OFF processing are not performed, FIG.

34B illustrates a case where the correction value is 0701h, and FIG. 34C illustrates a case where the correction value is 0F02h.

After forced OFF processing has been performed by the forced OFF processing unit 133, the 16-bit parallel signal 134 is output to the PS conversion unit 123. After that, the same processing as in the fourth exemplary embodiment is performed.

FIG. 33 is a timing chart of a case where partial magnification correction, density correction processing, and forced OFF processing are performed. Here, the image density value 162 of image data is FFh. The image density value of the image data after the density correcting unit 12 has corrected the density is the image density value 202 of the image data. The number of pixel pieces in one pixel that are forcibly turned OFF by the forced OFF processing unit 133 is indicated as the processing value 203. The density of the printed image 164 is an image density of an image printed after the above-described partial magnification correction and forced OFF processing have been performed, and is an image density obtained through measurement after printing.

As described above, also in a case where both of the density correction processing and the forced OFF processing are performed, an image can be printed by substantially decreasing the image density, and finally an appropriate image density can be obtained from the most off-axis image height to the on-axis image height. In particular, in a case where the image density value of image data is constant in the main scanning direction, the image density can be made constant in the main scanning direction as indicated by the density of the printed image 164 after correction illustrated in FIG. 33.

The pixel piece to be forcibly turned off may be any pixel piece of one pixel. In a case where the processing value for forced OFF processing is 2 or more and a plurality of pixel pieces in one pixel are to be forcibly turned off, a more uniform image density can be obtained by disposing, between pixel pieces subjected to forced OFF processing, at least one pixel piece not subjected to forced OFF processing. The correspondence between the lower 8 bits of the correction value and the processing value for forced OFF processing is not limited to the one described above, and may be appropriately set. The processing value for forced OFF processing may be a value smaller than 1. For example, in a case where the processing value is 0.5, one pixel piece in two pixels contiguous in the main scanning direction is forcibly turned off.

The image height at which the density correction value changes need not be the same as the image height at which the processing value of forced OFF processing changes. The density correction value and processing value may be appropriately set in consideration of gradation of image data, density characteristic, and so forth.

As described above, according to the sixth exemplary embodiment, partial magnification correction, density correction processing, and forced OFF processing are performed, and thereby exposure can be performed while suppressing the occurrence of image failure without using a scanning lens having an fθ characteristic.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:
1. An image-forming apparatus comprising:
a light-irradiation unit, having a rotational polygon mirror configured to reflect laser light emitted based on image data, configured to perform scanning by moving reflected light, reflected by the rotational polygon mirror, at a non-constant scanning velocity in a main scanning direction of a photosensitive member being charged without the reflected light being reflected, to form a latent image on a surface of the photosensitive member,
an emission timing correcting unit configured to correct an emission timing of the laser light so that an emission interval of the laser light becomes shorter as the scanning velocity increases, and/or an emission interval of the laser light becomes longer as the scanning velocity decreases; and
a brightness correcting unit configured to correct a brightness of the laser light so that an emission brightness of the light source increases as the scanning velocity increases and/or the emission brightness of the light source decreases as the scanning velocity decreases.

2. The image-forming apparatus according to claim 1, configured so that the latent image is able to be formed in a certain region in the main scanning direction and a velocity at which the spot of the laser light moves in the main scanning direction increases from a center portion to an end portion of the certain region in the main scanning direction.

3. The image-forming apparatus according to claim 2, configured so that in a case where a lowest velocity among velocities at which the spot of the laser light moves in the main scanning direction is represented by Vmin, a highest velocity among the velocities is represented by Vmax, and a rate of change in the scanning velocity C is expressed by $$C(\%)=((V\text{max}-V\text{min})/V\text{min})*100,$$

the rate of change in the scanning velocity C is 20% or more.

4. The image-forming apparatus according to claim 2, wherein the emission timing correcting unit performs correction so that an image clock cycle becomes shorter as the scanning velocity increases, and/or an image clock cycle becomes longer as the scanning velocity decreases.

5. The image-forming apparatus according to claim 2, wherein the emission timing correcting unit is configured to insert one or more image data pieces near the center portion of the certain region in the main scanning direction and extracts one or more image data pieces near the end portion of the certain region in the main scanning direction.

6. The image-forming apparatus according to claim 5, configured so that a length in the main scanning direction of each of the one or more image data pieces is shorter than a length in the main scanning direction of one pixel of the image data.

7. The image-forming apparatus according to claim 6, configured so that the image data correcting unit corrects the length in the main scanning direction of the image data so that latent images corresponding to individual pixels of the image data are able to be formed on the surface of the photosensitive member with a substantially uniform interval in the main scanning direction.

8. The image-forming apparatus according to claim 2, further comprising:
an emission period correcting unit configured to perform correction so that an emission period is shorter in the end portion of the certain region in the main scanning direction than in the center portion of the certain region.

9. The image-forming apparatus according to claim 8, wherein the emission period correcting unit performs correction to satisfy the following condition: in a case where a lowest velocity among velocities at which the spot of the laser light moves in the main scanning direction is represented by Vmin, a highest velocity among the velocities is represented by Vmax, a brightness in the center portion is represented by P3, and a brightness in the end portion is represented by P3', $$C=((V\mathrm{max}-V\mathrm{min})/V\mathrm{min})*100$$

and $$(P3'/P3)>(100+C)/100.$$

10. The image-forming apparatus according to claim 1, further comprising an emission period correcting unit configured to perform correction so that an emission period of the laser light becomes shorter as the scanning velocity increases, and/or an emission period of the laser light becomes longer as the scanning velocity decreases.

11. The image-forming apparatus according to claim 1, wherein in a case of inserting one or more image data pieces, the emission timing correcting unit is configured to insert an image data piece having identical data to data in a portion that is next to a position at which the image data piece is to be inserted and that is on an upstream side in the main scanning direction.

12. The image-forming apparatus according to claim 1, further comprising:
a constant current circuit configured to output a first current, wherein
the light source emits light in response to receipt of a third current, the third current being obtained by subtracting, from the first current, a second current output from the brightness correcting unit, and
the brightness correcting unit being configured to change the second current in accordance with an irradiation position of the laser light on the surface of the photosensitive member.

13. The image-forming apparatus according to claim 1, further comprising:
a constant current circuit configured to output a first current, wherein
the light source emits light in response to receipt of a third current, the third current being obtained by subtracting, from the first current, a second current drawn by the brightness correcting unit, and
the brightness correcting unit being configured to change the second current in accordance with an irradiation position of the laser light on the surface of the photosensitive member.

14. The image-forming apparatus according to claim 1, wherein a frequency of a clock for synchronizing an output of the image data is constant.

15. The image-forming apparatus according to claim 1, wherein the laser light reflected by the rotational polygon mirror is applied onto the surface of the photosensitive member without being transmitted through a lens having an fθ characteristic.

* * * * *